US010524476B2

(12) United States Patent
Jabs et al.

(10) Patent No.: US 10,524,476 B2
(45) Date of Patent: Jan. 7, 2020

(54) SYNERGISTIC COMPOSITIONS COMPRISING A *BACILLUS SUBTILIS* STRAIN AND A BIOPESTICIDE

(71) Applicant: BASF Corporation, Florham Park, NJ (US)

(72) Inventors: Thorsten Jabs, Hassloch (DE); Kurt Seevers, Elkhorn, NE (US); Eda Reinot, Ames, IA (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/777,850

(22) PCT Filed: Mar. 13, 2014

(86) PCT No.: PCT/IB2014/059713
§ 371 (c)(1),
(2) Date: Sep. 17, 2015

(87) PCT Pub. No.: WO2014/147528
PCT Pub. Date: Sep. 25, 2014

(65) Prior Publication Data
US 2016/0278384 A1 Sep. 29, 2016

(30) Foreign Application Priority Data
Mar. 20, 2013 (EP) .................................... 13160196

(51) Int. Cl.
A01N 63/00 (2006.01)

(52) U.S. Cl.
CPC ............ *A01N 63/00* (2013.01); *Y02A 50/356* (2018.01)

(58) Field of Classification Search
CPC ........................... A01N 63/00; A01N 2300/00
USPC ........................................................ 504/100
See application file for complete search history.

(56) References Cited

U.S. PATENT DOCUMENTS

| 4,242,121 A | 12/1980 | Hawkins |
| 4,599,362 A | 7/1986 | Tachibana |
| 4,940,720 A | 7/1990 | Nevill |
| 4,940,721 A | 7/1990 | Nevill |
| 4,945,100 A | 7/1990 | Sturm |
| 4,992,458 A | 2/1991 | Riebli |
| 5,143,932 A | 9/1992 | Dutzmann |
| 5,162,358 A | 11/1992 | Dehne |
| 5,378,460 A | 1/1995 | Zuckerman |
| 5,501,852 A | 3/1996 | Meadows et al. |
| 5,631,276 A | 5/1997 | Kern |
| 5,747,025 A | 5/1998 | Meadows et al. |
| 5,885,598 A | 3/1999 | Knauf |
| 6,060,051 A | 5/2000 | Orjala |
| 6,871,446 B1 | 3/2005 | Yamashita |
| 8,445,255 B2 | 5/2013 | Nangle |
| 2002/0152503 A1* | 10/2002 | King .................. C12R 1/01 800/312 |
| 2003/0068303 A1 | 4/2003 | Selvig |
| 2003/0203131 A1 | 10/2003 | Lemay |
| 2003/0224936 A1 | 12/2003 | Kretzschmar |
| 2007/0244073 A1 | 10/2007 | Angst |
| 2008/0108686 A1 | 5/2008 | Strathmann |
| 2009/0036509 A1 | 2/2009 | Grammenos |
| 2009/0286768 A1 | 11/2009 | Jin |
| 2010/0209410 A1 | 8/2010 | Schoefl et al. |
| 2010/0240619 A1 | 9/2010 | Gregory |
| 2010/0260735 A1* | 10/2010 | Bais .................. A01N 35/02 424/93.462 |
| 2011/0212835 A1 | 9/2011 | Bais et al. |
| 2012/0076765 A1 | 3/2012 | Schisler |
| 2012/0094834 A1 | 4/2012 | Frank |
| 2012/0149571 A1 | 6/2012 | Nangle |
| 2014/0005047 A1 | 1/2014 | Hungenberg |
| 2014/0012855 A1 | 1/2014 | Bingham |
| 2014/0112899 A1 | 4/2014 | Jeschke |
| 2014/0127322 A1 | 5/2014 | Oberholzer |
| 2015/0250173 A1 | 9/2015 | Braun |
| 2016/0278384 A1 | 9/2016 | Jabs et al. |

FOREIGN PATENT DOCUMENTS

| AU | 611315 B2 | 6/1991 |
| CA | 1100976 A1 | 5/1981 |
| CA | 1187084 A1 | 5/1985 |
| CA | 1209152 A1 | 8/1986 |
| CA | 1210404 A1 | 8/1986 |
| CL | 201202419 | 7/2014 |
| CL | 201502622 | 9/2015 |
| CN | 1086664 A | 5/1994 |
| CN | 1475560 | 2/2004 |
| CN | 101028009 A | 9/2007 |
| CN | 101225074 A | 7/2008 |
| CN | 101697736 A | 4/2010 |
| CN | 101697737 A | 4/2010 |
| CS | 247200 B2 | 12/1986 |
| DE | 2325878 A1 | 12/1974 |
| DE | 3801233 A1 | 8/1988 |
| DE | 3733755 A1 | 4/1989 |
| DE | 4003180 A1 | 8/1991 |
| DE | 102009009240 A1 | 8/2010 |

(Continued)

OTHER PUBLICATIONS

International Search Report dated Jun. 5, 2014, prepared in International Application No. PCT/IB2014/059713.

(Continued)

Primary Examiner — Johann R Richter
Assistant Examiner — Courtney A Brown
(74) Attorney, Agent, or Firm — Brinks Gilson & Lione

(57) ABSTRACT

The present invention relates to synergistic mixtures, comprising *Bacillus subtilis* strain FB17, or a cell-free extract thereof or at least one metabolite thereof, and/or a mutant of *Bacillus subtilis* FB17 having all the identifying characteristics thereof or extract of the mutant, and at least one biopesticide as defined in the description, and to compositions comprising these mixtures.

13 Claims, No Drawings

(56) References Cited

FOREIGN PATENT DOCUMENTS

| | | |
|---|---|---|
| EP | 0000017 A1 | 12/1978 |
| EP | 0077479 A2 | 4/1983 |
| EP | 0113640 A2 | 7/1984 |
| EP | 0114567 A2 | 8/1984 |
| EP | 0126430 A2 | 11/1984 |
| EP | 0275955 A1 | 7/1988 |
| EP | 354183 A2 | 2/1990 |
| EP | 0440950 A2 | 8/1991 |
| EP | 0470466 A2 | 2/1992 |
| EP | 1431275 A1 | 6/2004 |
| EP | 1469122 A2 | 10/2004 |
| EP | 1700919 A1 | 9/2006 |
| EP | 2835052 A1 | 2/2015 |
| FR | 2491924 A1 | 4/1982 |
| GB | 2064520 A1 | 6/1981 |
| GB | 2132195 A1 | 7/1984 |
| GB | 2143815 A1 | 2/1985 |
| GB | 2481118 A1 | 12/2011 |
| JP | 59-222434 | 12/1984 |
| JP | 2-83304 | 3/1990 |
| NZ | 230176 A | 1/1992 |
| WO | 9410846 A1 | 5/1994 |
| WO | 9619112 A1 | 6/1996 |
| WO | 1996041804 | 12/1996 |
| WO | WO 2000029426 | 5/2000 |
| WO | 2002060250 A2 | 8/2002 |
| WO | 02085891 A1 | 10/2002 |
| WO | WO 2002091824 | 11/2002 |
| WO | 03064572 A1 | 8/2003 |
| WO | 2005123689 A1 | 12/2005 |
| WO | 2005123690 A1 | 12/2005 |
| WO | 2006015866 A1 | 2/2006 |
| WO | 2006087373 A1 | 8/2006 |
| WO | 2006109933 A1 | 10/2006 |
| WO | 2006119876 A1 | 11/2006 |
| WO | 2007031308 A2 | 3/2007 |
| WO | 2008082198 A1 | 7/2008 |
| WO | 2009037242 A2 | 3/2009 |
| WO | WO 2010/109436 | 9/2010 |
| WO | WO 2010109436 A1 * | 9/2010 ............ A01N 63/00 |
| WO | WO-2010/128003 | 11/2010 |
| WO | 2010139656 A2 | 12/2010 |
| WO | 2010146114 A1 | 12/2010 |
| WO | 2011099804 A2 | 8/2011 |
| WO | 2011117272 A2 | 9/2011 |
| WO | WO-2011/109395 | 9/2011 |
| WO | 2011147953 A1 | 12/2011 |
| WO | 2012037782 A1 | 3/2012 |
| WO | WO 2012/047608 | 4/2012 |
| WO | 2012072696 A1 | 6/2012 |
| WO | 2012076563 A1 | 6/2012 |
| WO | WO-2012/080415 | 6/2012 |
| WO | WO 2012079073 | 6/2012 |
| WO | 2013007767 A1 | 1/2013 |
| WO | 2013010862 A1 | 1/2013 |
| WO | 2013010885 A1 | 1/2013 |
| WO | 2013010894 A1 | 1/2013 |
| WO | 2013024075 A1 | 2/2013 |
| WO | 2013024076 A1 | 2/2013 |
| WO | 2013024077 A1 | 2/2013 |
| WO | 2013024080 A1 | 2/2013 |
| WO | 2013024081 A1 | 2/2013 |
| WO | 2013024082 A1 | 2/2013 |
| WO | WO 2014076663 | 1/2014 |
| WO | 2014029697 A1 | 2/2014 |
| WO | 2014053398 A1 | 4/2014 |
| WO | 2014079719 A1 | 5/2014 |
| WO | 2014079724 A1 | 5/2014 |
| WO | 2014079728 A1 | 5/2014 |
| WO | 2014079730 A1 | 5/2014 |
| WO | 2014079752 A1 | 5/2014 |
| WO | 2014079754 A1 | 5/2014 |
| WO | 2014079764 A1 | 5/2014 |
| WO | 2014079766 A1 | 5/2014 |
| WO | 2014079769 A1 | 5/2014 |
| WO | 2014079770 A1 | 5/2014 |
| WO | 2014079771 A1 | 5/2014 |
| WO | 2014079772 A1 | 5/2014 |
| WO | 2014079773 A1 | 5/2014 |
| WO | 2014079774 A1 | 5/2014 |
| WO | 2014079804 A1 | 5/2014 |
| WO | 2014079813 A1 | 5/2014 |
| WO | 2014079814 A1 | 5/2014 |
| WO | 2014079841 A1 | 5/2014 |
| WO | WO 2014079804 | 5/2014 |
| WO | 2014095932 A1 | 6/2014 |
| WO | 2014095994 A1 | 6/2014 |
| WO | WO 2014086848 | 6/2014 |
| WO | WO 2014086850 | 6/2014 |
| WO | WO 2014086851 | 6/2014 |
| WO | WO 2014086853 | 6/2014 |
| WO | WO 2014086854 | 6/2014 |
| WO | WO 2014086856 | 6/2014 |
| WO | WO 2014147528 | 9/2014 |
| WO | WO 2014147534 | 9/2014 |
| WO | 2015003908 A1 | 1/2015 |
| WO | 2015113860 A1 | 8/2015 |
| WO | 2015135701 A1 | 9/2015 |
| WO | 2015169711 A1 | 11/2015 |
| WO | WO 2015177021 | 11/2015 |
| WO | 2015197393 | 12/2015 |
| WO | WO 2015180983 | 12/2015 |
| WO | WO 2015180985 | 12/2015 |
| WO | WO 2015180987 | 12/2015 |
| WO | WO 2015180999 | 12/2015 |
| WO | WO 2015181008 | 12/2015 |
| WO | WO 2015181009 | 12/2015 |

OTHER PUBLICATIONS

International Preliminary Report on Patentability dated Sep. 22, 2015 prepared in International Application No. PCT/IB2014/059713.

European Search Report dated Jul. 3, 2013 prepared in European Application No. 13160196.

Schisler, D.A., et al. "Formulation of *Bacillus* spp. For biological control of plant diseases", Journal of Phytopathology, Jan. 1, 2004, p. 1267-1271, vol. 94.

Office Action dated Feb. 6, 2018 for co-pending U.S. Appl. No. 15/313,229.

Bartlett, D.W., "The strobilurin fungicides", Pest Management Science, 2002, pp. 649-662, vol. 58.

Stamina Supplemental label, BASF Corp, Research Triangle Park, NC pp. 1-3, 2011.

Facts on Friday Bulletin, Cotton Seed Distributors Extension and Development Team, Jul. 23, 2010 (one page).

Office Action dated Apr. 3, 2017 for co-pending U.S. Appl. No. 14/777,845.

Office Action dated Mar. 27, 2017 for Chilean Application No. 2015-002684.

Office Action dated Apr. 28, 2017 for Chinese Application No. 201480016765.2.

Wang, "Research Progress and Prospect of *Bacillus subtilis*," Journal of the Graduates, Sun Yat-Sen University (Natural Sciences, Medicine), 2012, vol. 33, Issue 3, pp. 14-22.

"Broadband" (Aug. 9, 2012), retrieved from Internet Jan. 29, 2014, url: http://beckerunderwood.com/media/products/resources/brouadband_instructions_B4D27D46613D6.pdf.

Afon'Kin, A.A. et al. "Synthesis of Some Electron-Rich Aryl(hetaryl)oxarines under Phase-Transfer and Homogenous Conditions," Russian Journal of Organic Chemistry, 2008, p. 1776-1779, vol. 44, No. 12.

Akama, Tsutomu, et al. "Discovery and structure-activity study of a novel benzoxaborole anti-inflammatory agent (AN2728) for the potential topical treatment of psoriasis and atopic dermatitis," Bioorganic & Medicinal Chemistry Letters, 2009, p. 2129-2132, vol. 19.

(56) References Cited

OTHER PUBLICATIONS

Bennett et al., "Survival of the Biocontrol Agents Coniothyrium minitans and Bacillus subtilis MBI 600 Introduced into Pasturised, Sterilised and Non-Sterile Soils," Soil Biology & Biochemistry, vol. 35, (2003), pp. 1565-1573.
Brandes, Bridget D., et al., "Synthesis of enantiopure 3-chlorostyrene oxide via an asymmetric epoxidation-hydrolytic kinetic resolution sequence," Tetrahedron; Asymmetry, 1997, p. 3927-3933, vol. 8, No. 23.
Echeveeri-Molina et al., "Toxicity of Synthetic and Biological Insecticides against Adults of the Eucalyptus Snout-Beetle *Gonipterus scutellatus* Gyllenhal (Coleoptera: Curculionidae)," Journal of Pest Science, vol. 83, (2010), pp. 297-305.
Enebak, S.A., et al., "Evidence for Induced Systemic Protection to Fusiform Rust in Loblolly Pine by Plant Growth-Promoting Rhizobacteria," The American Phytopathological Society, Plant Disease/Mar. 2000, vol. 84, No. 3, pp. 306-308.
Farenhorst, Marit, et al., "Synergy in Efficacy of Fungal Entomopathogens and Permethrin against West African Insecticide-Resistant Anopheles gambiae Mosquitoes," PloS One, Aug. 2010, vol. 5, Issue 8, 10p.
Final Office Action, issued in co-pending U.S. Appl. No. 14/443,844, dated Jun. 23, 2017.
Forrester, Julie, et al. "Generation of trimethylsulfonium cation from dimethyl sulfoxide and dimethyl sulfate: implication s for the synthesis of epoxides from aldehydes and ketones," J. Chem. Soc. Perkin Trans. 1, 1995, pp. 2289-2291, vol. 1995.
Koch, Thomas, et al., "Biosynthesis of cis-Jasmone: A Pathway for the Inactivation and the Disposal of the Plant Stress Hormone Jasmonic Acid to the Gas Phase?," Helvetica Chimica Acta, 1997, vol. 80, pp. 838-850, Switzerland.
Kuzenkov, A.V., "Synthesis of substituted 2-azoloyl-1-pyridylethan-1-ols," Chemistry of hererocyclic compounds, 2003, p. 1492-1495 vol. 39, No. 11.
Leisso et al., "The Influence of Biological and Fungicidal Seed Treatments on Chickpea (*Cicer arietinum*) Damping Off," Can J Plant Pathol., vol. 31, (2009), pp. 38-46.
Lima, Lidia Moreira et al., "Bioisosterism: A useful strategy for molecular Modification and drug design," Current Medicinal Chemistry, 2005, p. 23-49, vol. 12.
McKnight and Rossall, "Root Colonization of Cotton Seedlings by Bacillus subtilis MBI 600," 2nd International Vorkshop on Plant Growth-Promoting Rhizobacteria, (1991), pp. 365-369.
Mosset, Paul et al. "Trimethylsulfonium Methylsulfate, a simple and efficient epoxidizing agent," Synthetic Communications, 1985, p. 749-757, vol. 15, No. 8.
Office Action, issued in co-pending U.S. Appl. No. 14/443,206, dated Apr. 5, 2017.
Office Action, issued in co-pending U.S. Appl. No. 14/443,523, dated Sep. 19, 2016.
Office Action, issued in co-pending U.S. Appl. No. 14/443,844, dated Feb. 14, 2017.
Schmidt et al., "Influence of Soil Temperature and Matric Potential on Sugar Beet Seedling Colonization and Suppression of Pythium Damping-Off by the Antagonistic Bacteria *Pseudomonas fluorescens* and *Bacillus subtilis*," Phytopathology, vol. 94, No. 4, (2004), pp. 351-363.
Singh et al., "DuPont CyazypyrTM (DPX-HGW86, cyantraniliprole): A Cross-Spectrum Insecticide for Control of Major Pests of Rice," Abstract of Conference Paper, Entomological Society of America Annual, (2011), retrieved from the Internet on Feb. 9, 2017: https://www.researchgate.net/publication/267528306_DuPont_Cyazypyr_DPX-HGW86_c.
Wright et al., "Application of Beneficial Microorganisms to Seeds During Drum Priming," Biocontrol Science and Technology, (2003), pp. 599-614.
Yu et al., "Synthesis and Fungicidal Evaluation of 2-arylphenyl ether-3-(1H-1,2,4-triazol-1-yl)propan-2-ol Derivatives," Journal of Agricultural and Food Chemistry, vol. 57, No. 11, (2009), pp. 4854-4860.
Zhang, "Evaluation of Microbial Products for Management of Powdery Mildew on Summer Squash and Cantaloupe in Florida," Plant Disease, (2011), pp. 461-468.
Zhou, X. G., et al., "Field evaluation of a beneficial Bacillus strain for biocontrol of sheath blight in rice," Phytopathology, 2011, vol. 101, S204.
Office Action, issued in co-pending U.S. Appl. No. 14/653,578, dated Aug. 24, 2016.
Office Action, issued in co-pending U.S. Appl. No. 14/653,578, dated Apr. 28, 2017.
Office Action, issued in co-pending U.S. Appl. No. 15/319,963, dated Aug. 15, 2017.
Office Action, issued in co-pending U.S. Appl. No. 14/443,520, dated Oct. 14, 2016.
Office Action, issued in co-pending U.S. Appl. No. 14/777,845, dated Nov. 22, 2017.
Office Action dated May 25, 2018 in co-pending U.S. Appl. No. 14/443,206.
Office Action dated May 29, 2018 in co-pending U.S. Appl. No. 14/777,845.
Zitter, T.A. et al., "Control of Early Blight of Tomato with Genetic Resistance and Conventional and Biological Sprays", Acta Hort 2005, vol. 695, p. 181-189.
Office Action dated Jun. 14, 2018 in co-pending U.S. Appl. No. 15/313,229.
Final Office Action dated Jul. 11, 2018 in co-pending U.S. Appl. No. 14/443,844.
Final Office Action dated Nov. 13, 2018, from U.S. Appl. No. 14/777,845, filed Sep. 17, 2015.

\* cited by examiner

SYNERGISTIC COMPOSITIONS COMPRISING A *BACILLUS SUBTILIS* STRAIN AND A BIOPESTICIDE

This application is a National Stage application of International Application No. PCT/IB2014/059713, filed Mar. 13, 2014. This application also claims priority under 35 U.S.C. § 119 to European Patent Application No. 13160196.5 filed Mar. 20, 2013.

The present invention relates to mixtures comprising, as active components the *Bacillus subtilis* strain FB17, or a cell-free extract thereof or at least one metabolite thereof, and/or a mutant of *Bacillus subtilis* FB17 having all the identifying characteristics thereof or extract of the mutant and a biopesticide.

Several plant-associated strains of the genus *Bacillus* described as belonging to the species *Bacillus subtilis* are used commercially as biopesticides or to promote the growth and improve the health of crop plants (Phytopathology 96, 145-154, 2006).

*Bacillus subtilis* strain FB17 was originally isolated from red beet roots in North America (System Appl. Microbiol 27 (2004) 372-379, incorporated herein by reference). The strain was isolated from beet root on the basis of its ability to form surface biofilm and dendritic growth. This strain is known to be recruited by *Arabdopsis* roots by malic acid excretion (Plant Physiol. 148 (2008) 1547-1556). This *Bacillus subtilis* strain promotes plant health (US 2010/0260735 A1, incorporated herein by reference), induces growth response and protection against pathogenic organisms and drought through colonization and biofilm formation on the *Arabidopsis thaliana* root surface (Planta 226 (2007) 283-297). It is also known to induce the production of grater biomass in a plant, to increase the drought tolerance of a plant, to induce a reduction of lignin concentration in a plant, to increase the iron concentration in a plant or to inhibit fungal infection in a plant (WO 2011/109395 A2, incorporated herein by reference). *B. subtilis* FB17 has also been deposited at American Type Culture Collection (ATCC), Manassas, Va., USA, under accession number PTA-11857 on Apr. 26, 2011. In the abovementioned publications, *Bacillus subtilis* strain FB17 may also be referred to as UD1022 or UD10-22.

Biopesticides have been defined as a form of pesticides based on micro-organisms (bacteria, fungi, viruses, nematodes, etc.) or natural products (compounds, such as metabolites, proteins, or ectracts from biological or other natural sources) (U.S. Environmental Protection Agency: http://www.epa.gov/pesticides/biopesticides/).

Biopesticides are typically created by growing and concentrating naturally occurring organisms and/or their metabolites including bacteria and other microbes, fungi, viruses, nematodes, proteins, etc. They are often considered to be important components of integrated pest management (IPM) programmes, and have received much practical attention as substitutes to synthetic chemical plant protection products (PPPs).

Biopesticides fall into two major classes, microbial and biochemical pesticides:
(1) Microbial pesticides consist of bacteria, fungi or viruses (and often include the metabolites that bacteria and fungi produce). Entomopathogenic nematodes are also classified as microbial pesticides, even though they are multi-cellular.
(2) Biochemical pesticides are naturally occurring substances or structurally-similar and functionally identical to a naturally-occurring substance and extracts from biological sources that control pests or provide other crop protection uses as defined below, but have non-toxic mode of actions (such as growth or developmental regulation, attractants, repellents or defense activators (e.g. induced resistance) and are relatively non-toxic to mammals.

Examples for biochemical pesticides include, but are not limited to semiochemicals (insect pheromones and kairomones), natural plant and insect regulators, naturally-occurring repellents and attractants, and proteins (e.g. enzymes).

Biopesticides for use against crop diseases have already established themselves on a variety of crops. For example, biopesticides already play an important role in controlling downy mildew diseases. Their benefits include: a 0-Day Pre-Harvest Interval, the ability to use under moderate to severe disease pressure, and the ability to use in mixture or in a rotational program with other registered pesticides.

A major growth area for biopesticides is in the area of seed treatments and soil amendments. Biopesticidal seed treatments are e.g. used to control soil borne fungal pathogens that cause seed rots, damping-off, root rot and seedling blights. They can also be used to control internal seed borne fungal pathogens as well as fungal pathogens that are on the surface of the seed. Many biopesticidal products also show capacities to stimulate plant host defenses and other physiological processes that can make treated crops more resistant to a variety of biotic and abiotic stresses or can regulate plant growth. Many biopesticidal products also show capacities to stimulate plant health, plant growth and/or yield enhancing activity.

The term "plant health" is to be understood to denote a condition of the plant and/or its products which is determined by several indicators alone or in combination with each other such as yield (e. g. increased biomass and/or increased content of valuable ingredients), plant vigor (e. g. improved plant growth and/or greener leaves ("greening effect")), quality (e. g. improved content or composition of certain ingredients) and tolerance to abiotic and/or biotic stress. The above identified indicators for the health condition of a plant may be interdependent, or may result from each other.

However, biopesticides under certain conditions can also have disadvantages such as high specificity: which may require an exact identification of the pest/pathogen and the use of multiple products to be used, slow speed of action (thus making them unsuitable if a pest outbreak is an immediate threat to a crop), variable efficacy due to the influences of various biotic and abiotic factors (since biopesticides are usually living organisms, which bring about pest/pathogen control by multiplying within the target insect pest/pathogen) and resistance development.

Practical agricultural experience has shown that the repeated and exclusive application of an individual active component in the control of harmful fungi, insects or other pests leads in many cases to a rapid selection of those fungus strains or pest isolates which have developed natural or adapted resistance against the active component in question. Effective control of these fungi, insects or other pests with the active component in question is then no longer possible.

To reduce the risk of the selection of resistant fungus strains or insect isolates, mixtures of different active components are nowadays conventionally employed for controlling harmful fungi or insects or other pests. By combining active compounds and/or biopesticides having different mechanisms of action, it is possible to ensure successful control over a relatively long period of time.

Another typical problem arising in the field of pest control lies in the need to reduce the dosage rates of the active ingredient in order to reduce or avoid unfavorable environmental or toxicological effects whilst still allowing effective pest control.

It is an object of the present invention overcome the abovementioned disadvantages and to provide, with a view to effective resistance management and effective control of phytopathogenic harmful fungi, insects or other pests or to effective plant growth regulation, at application rates which are as low as possible, compositions which, at a reduced total amount of active compounds applied, have improved activity against the harmful fungi or pests or improved plant growth regulating activity (synergistic mixtures) and a broadened activity spectrum, in particular for certain indications.

One typical problem arising in the field of pest control lies in the need to reduce the dosage rates of the active ingredient in order to reduce or avoid unfavorable environmental or toxicological effects whilst still allowing effective pest control. In regard to the instant invention the term pests embrace animal pests, and harmful fungi.

Another problem encountered concerns the need to have available pest control agents which are effective against a broad spectrum of pests, e.g. both animal pests and harmful fungi.

There also exists the need for pest control agents that combine knock-down activity with prolonged control, that is, fast action with long lasting action.

Another difficulty in relation to the use of pesticides is that the repeated and exclusive application of an individual pesticidal compound leads in many cases to a rapid selection of pests, that means animal pests, and harmful fungi, which have developed natural or adapted resistance against the active compound in question. Therefore there is a need for pest control agents that help prevent or overcome resistance.

Another problem underlying the present invention is the desire for compositions that improve plants, a process which is commonly and hereinafter referred to as "plant health".

This is particularly visible if application rates for the beforementioned mixtures of pesticides are used where the individual components show no or virtually no activity. The invention can also result in an advantageous behavior during formulation or during use, for example during grinding, sieving, emulsifying, dissolving or dispensing; improved storage stability and light stability, advantageous residue formation, improved toxicological or ecotoxicological behaviour, improved properties of the plant, for example better growth, increased harvest yields, a better developed root system, a larger leaf area, greener leaves, stronger shoots, less seed required, lower phytotoxicity, mobilization of the defense system of the plant, good compatibility with plants. Moreover, even an enhanced systemic action of *B. subtilis* FB17 and the biopesticides as defined herein and/or a persistency of the fungicidal, insecticidal, acaricidal and/or nematicidal action is expected.

It was therefore also an object of the present invention to provide pesticidal mixtures which solve the problems of reducing the dosage rate and/or enhancing the spectrum of activity and/or combining knock-down activity with prolonged control and/or to resistance management and/or promoting (increasing) the health of plants.

We have accordingly found that this object is achieved by the mixtures and compositions defined herein, comprising the *Bacillus subtilis* strain FB17, or a cell-free extract thereof or at least one metabolite thereof, and/or a mutant of *Bacillus subtilis* FB17 having all the identifying characteristics of respective *Bacillus subtilis* FB17 or extract of the mutant and a biopesticide.

Thus, the present invention relates to mixtures comprising, as active components 1) *Bacillus subtilis* strain FB17, or a cell-free extract thereof or at least one metabolite thereof, and/or a mutant of *Bacillus subtilis* FB17 having all the identifying characteristics thereof or extract of the mutant; and 2) at least one biopesticide II selected from the groups A') to F'):

A') Microbial pesticides with fungicidal, bactericidal, viricidal and/or plant defense activator activity: *Ampelomyces quisqualis, Aspergillus flavus, Aureobasidium pullulans, Bacillus amyloliquefaciens, B. mojavensis, B. pumilus, B. simplex, B. solisalsi, B. subtilis, B. subtilis* var. *amyloliquefaciens, Candida oleophila, C. saitoana, Clavibacter michiganensis* (bacteriophages), *Coniothyrium minitans, Cryphonectria parasitica, Cryptococcus albidus, Dilophosphora alopecuri, Fusarium oxysporum, Clonostachys rosea* f. *catenulate* (also named *Gliocladium catenulatum*), *Gliocladium roseum, Metschnikowia fructicola, Lysobacter antibioticus, L. enzymogenes, Microdochium dimerum, Microsphaeropsis ochracea, Muscodor albus, Paenibacillus polymyxa, Pantoea agglomerans, Pantoea vagans, Phlebiopsis gigantea, Pseudozyma flocculosa, Pythium oligandrum, Sphaerodes mycoparasitica, Streptomyces griseoviridis, S. lydicus, S. violaceusniger, Talaromyces flavus, Trichoderma asperellum, T. atroviride, T. fertile, T. gamsii, T. harmatum;* mixture of *T. harzianum* and *T. viride;* mixture of *T. polysporum* and *T. harzianum, T. stromaticum, T. virens* (also named *Gliocladium virens*), *T. viride, Typhula phacorrhiza, Ulocladium oudema, U. oudemansii, Verticillium dahlia,* zucchini yellow mosaic virus (avirulent strain);

B') Biochemical pesticides with fungicidal, bactericidal, viricidal and/or plant defense activator activity: chitosan (hydrolysate), jasmonic acid or salts or derivatives thereof, laminarin, Menhaden fish oil, natamycin, Plum pox virus coat protein, *Reynoutria sachlinensis* extract, salicylic acid, tea tree oil;

C') Microbial pesticides with insecticidal, acaricidal, molluscidal and/or nematicidal activity: *Agrobacterium radiobacter, Bacillus cereus, B. firmus, B. thuringiensis, B. thuringiensis* ssp. *aizawai, B. thuringiensis* ssp. *israelensis, B. t.* ssp. *galleriae, B. t.* ssp. *kurstaki, t.* ssp. *tenebrionis, Beauveria bassiana, Burkholderia* spp., *Chromobacterium subtsugae, Cydia pomonella* granulosis virus, *Cryptophlebia leucotreta* granulovirus (CrleGV), *Flavobacterium* spp., *Helicoverpa armigera* nucleopolyhedrovirus (HearNPV), *Heterorhabditis* bacteriophora, *Isaria fumosorosea, Lecanicillium longisporum, L. muscarium* (formerly *Verticillium lecanii*) *Metarhizium anisopliae, M anisopliae* var. *acridum, Nomuraea rileyi, Paecilomyces fumosoroseus, P. lilacinus, Paenibacillus poppiliae, Pasteuria* spp., *P. nishizawae, P. penetrans, P. ramose, P. reneformis, P. usgae, Pseudomonas fluorescens, Spodoptera littoralis* nucleopolyhedrovirus (SpliNPV), *Steinernema carpocapsae, S. feltiae, S. kraussei, Streptomces galbus, S. microflavus;*

D') Biochemical pesticides with insecticidal, acaricidal, molluscidal, pheromone and/or nematicidal activity: L-carvone, citral, (E,Z)-7,9-dodecadien-1-ylacetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, 2-methyl 1-butanol, methyl eugenol, methyl jasmonate, (E,Z)-2,13-octadecadien-1-ol, (E,Z)-2,13-octadecadien-1-ol acetate, (E,Z)-3,13-octadecadien-1-ol, R-1-octen-3-ol, pentatermanone, potassium silicate, sorbitol actanoate, (E,Z,Z)-3,8,11-tetradecatrienyl acetate, (Z,E)-9,12-tetradecadien-1-yl acetate, Z-7-tetradecen-2-one, Z-9-tetradecen-1-yl acetate, Z-11-tetradecenal, Z-11-tetradecen-1-ol, *Acacia negra* extract, extract of grapefruit seeds and pulp, extract of *Chenopodium ambrosiodae*, Catnip oil, Neem oil, Quillay extract, Tagetes oil;

E') Microbial pesticides with plant stress reducing, plant growth regulator, plant growth promoting and/or yield enhancing activity: *Azospirillum amazonense A. brasilense, A. lipoferum, A. irakense, A. halopraeferens, Bradyrhizobium* spp., *B. japonicum, B. liaoningense, B. lupini, Delftia acidovorans, Glomus intraradices, Mesorhizobium* spp., *Paenibacillus alvei, Penicillium bilaiae, Rhizobium leguminosarum* bv. *phaseoli, R. l.* bv. *trifolii, R. l.* bv. *viciae, Sinorhizobium meliloti,*

F') Biochemical pesticides with plant stress reducing, plant growth regulator and/or plant yield enhancing activity: abscisic acid, aluminium silicate (kaolin), 3-decen-2-one, formononetin, genistein, hesperetin, homobrassinolide, humates, indole-3-acetic acid, jasmonic acid or salts or derivatives thereof, lysophosphatidyl ethanlamine, naringenin, polymeric polyhydroxy acid, *Ascophyllum nodosum* (Norwegian kelp, Brown kelp) extract and *Ecklonia maxima* (kelp) extract.

According to another embodiment of the inventive mixtures, the at least one biopesticide II is selected from the groups A') to F') as follows:

A') Microbial pesticides with fungicidal, bactericidal, viricidal and/or plant defense activator activity: *Ampelomyces quisqualis, Aspergillus flavus, Aureobasidium pullulans, Bacillus amyloliquefaciens, B. mojavensis, B. pumilus, B. simplex, B. solisalsi, B. subtilis, B. subtilis* var. *amyloliquefaciens, Candida oleophila, C. saitoana, Clavibacter michiganensis* (bacteriophages), *Coniothyrium minitans, Cryphonectria parasitica, Cryptococcus albidus, Fusarium oxysporum, Clonostachys rosea* f. *catenulate* (also named *Gliocladium catenulatum*), *Gliocladium roseum, Metschnikowia fructicola, Microdochium dimerum, Paenibacillus polymyxa, Pantoea agglomerans, Phlebiopsis gigantea, Pseudozyma floccolosa, Pythium oligandrum, Sphaerodes mycoparasitica, Streptomyces lydicus, S. violaceusniger, Talaromyces flavus, Trichoderma asperellum, T. atroviride, T. fertile, T. gamsii, T. harmatum*; mixture of *T. harzianum* and *T. viride*; mixture of *T. polysporum* and *T. harzianum; T. stromaticum, T. virens* (also named *Gliocladium virens*), *T. viride, Typhula phacorrhiza, Ulocladium oudema, U. oudemansii, Verticillium dahlia*, zucchini yellow mosaic virus (avirulent strain);

B') Biochemical pesticides with fungicidal, bactericidal, viricidal and/or plant defense activator activity: chitosan (hydrolysate), jasmonic acid or salts or derivatives thereof, laminarin, Menhaden fish oil, natamycin, Plum pox virus coat protein, *Reynoutria sachlinensis* extract, salicylic acid, tea tree oil;

C') Microbial pesticides with insecticidal, acaricidal, molluscidal and/or nematicidal activity: *Bacillus firmus, B. thuringiensis* ssp. *israelensis, B. t.* ssp. *galleriae, B. t.* ssp. *kurstaki, Beauveria bassiana, Burkholderia* sp., *Chromobacterium subtsugae, Cydia pomonella* granulosis virus, *Isaria fumosorosea, Lecanicillium longisporum, L. muscarium* (formerly *Verticillium lecanii*), *Metarhizium anisopliae, M. anisopliae* var. *acridum, Paecilomyces fumosoroseus, P. lilacinus, Paenibacillus poppiliae, Pasteuria* spp., *P. nishizawae, P. reneformis, P. usagae, Pseudomonas fluorescens, Steinernema feltiae, Streptomces galbus;*

D') Biochemical pesticides with insecticidal, acaricidal, molluscidal, pheromone and/or nematicidal activity: L-carvone, citral, (E,Z)-7,9-dodecadien-1-yl acetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, 2-methyl 1-butanol, methyl eugenol, methyl jasmonate, (E,Z)-2,13-octadecadien-1-ol, (E,Z)-2,13-octadecadien-1-ol acetate, (E,Z)-3,13-octadecadien-1-ol, R-1-octen-3-ol, pentatermanone, potassium silicate, sorbitol actanoate, (E,Z,Z)-3,8,11-tetradecatrienyl acetate, (Z,E)-9,12-tetradecadien-1-yl acetate, Z-7-tetradecen-2-one, Z-9-tetradecen-1-yl acetate, Z-11-tetradecenal, Z-11-tetradecen-1-ol, *Acacia negra* extract, extract of grapefruit seeds and pulp, extract of *Chenopodium ambrosiodae*, Catnip oil, Neem oil, Quillay extract, Tagetes oil;

E') Microbial pesticides with plant stress reducing, plant growth regulator, plant growth promoting and/or yield enhancing activity: *Azospirillum amazonense A. brasilense, A. lipoferum, A. irakense, A. halopraeferens, Bradyrhizobium* sp., *B. japonicum, Glomus intraradices, Mesorhizobium* sp., *Paenibacillus alvei, Penicillium bilaiae, Rhizobium leguminosarum* bv. *phaseoli, R. l. trifolii, R. l.* bv. *viciae, Sinorhizobium meliloti;*

F') Biochemical pesticides with plant stress reducing, plant growth regulator and/or plant yield enhancing activity: abscisic acid, aluminium silicate (kaolin), 3-decen-2-one, homobrassinolide, humates, indole-3-acetic acid, lysophosphatidyl ethanlamine, polymeric polyhydroxy acid, *Ascophyllum nodosum* (Norwegian kelp, Brown kelp) extract and *Ecklonia maxima* (kelp) extract.

Component 1) in the mixtures embraces not only the isolated, pure cultures of the *Bacillus subtilis* strain FB17 as defined herein, but also its cell-free extract, its suspensions in a whole broth culture or as a metabolite-containing supernatant or a purified metabolite obtained from a whole broth culture of the microorganism or microorganism strain.

"Whole broth culture" refers to a liquid culture containing both cells and media.

"Supernatant" refers to the liquid broth remaining when cells grown in broth are removed by centrifugation, filtration, sedimentation, or other means well known in the art.

As used herein, the term "metabolite" refers to any component, compound, substance or byproduct (including but not limited to small molecule secondary metabolites, polyketides, fatty acid synthase products, non-ribosomal peptides, ribosomal peptides, proteins and enzymes) produced by a microorganism (such as fungi and bacteria, in particular the strains of the invention) that has any beneficial effect as described herein such as pesticidal activity or improvement of plant growth, water use efficiency of the plant, plant health, plant appearance, or the population of beneficial microorganisms in the soil around the plant activity herein.

As used herein, "cell-free extract" refers to an extract of the vegetative cells, spores and/or the whole culture broth of a microorganism comprising cellular metabolites produced by the respective microorganism obtainable by cell disruption methods known in the art such as solvent-based (e. g. organic solvents such as alcohols sometimes in combination with suitable salts), temperature-based, application of shear forces, cell disruption with an ultrasonicator. The desired extract may be concentrated by conventional concentration techniques such as drying, evaporation, centrifugation or alike. Certain washing steps using organic solvents and/or water-based media may also be applied to the crude extract preferably prior to use.

According to a further embodiment, component 1) embraces the *Bacillus subtilis* strain FB17, and a cell-free extract thereof.

As used herein, "strain" refers to isolate or a group of isolates exhibiting phenotypic and/or genotypic traits belonging to the same lineage, distinct from those of other isolates or strains of the same species.

As used herein, "isolate" refers to a pure microbial culture separated from its natural origin, such an isolate obtained by culturing a single microbial colony. An isolate is a pure culture derived from a heterogeneous, wild population of microorganisms.

The term "mutant" refers a microorganism obtained by direct mutant selection but also includes microorganisms that have been further mutagenized or otherwise manipulated (e.g., via the introduction of a plasmid). Accordingly, embodiments include mutants, variants, and or derivatives of the respective microorganism, both naturally occurring and artificially induced mutants. For example, mutants may be induced by subjecting the microorganism to known mutagens, such as N-methyl-nitrosoguanidine, using conventional methods.

Mutant strains may be obtained by any methods known in the art such as direct mutant selection, chemical mutagenesis or genetic manipulation (e. g., via the introduction of a plasmid). For example, such mutants are obtainable by applying a known mutagen, such as X-ray, UV radiation or N-methyl-nitrosoguanidine. Subsequent to said treatments a screening for mutant strains showing the desired characteristics may be performed.

*Bacillus subtilis* FB17 may be cultivated using media and fermentation techniques known in the art, e.g. in Tryptic Soy Broth (TSB) at 27° C. for 24-72 hrs. The bacterial cells (vegatitive cells and spores) were washed and concentrated (e.g. by centrifugation at room temperature for 15 min at 7000×g). To produce a dry formulation, bacterial cells, preferably spores were suspended in a suitable dry carrier (e.g. clay). To produce a liquid formulation, cells, preferably spores, were re-suspended in a suitable liquid carrier (e.g. water-based) to the desired spore density. The spore density number of spores per mL was determined by identifying the number of heat-resistant colony-forming units (70° C. for 10 min) on Trypticase Soy Agar after incubation for 18-24 hrs at 37° C. *Bacillus subtilis* FB17 is generally active in temperatures between 7° C. and 52° C. (Holtmann, G. & Bremer, E. (2004), J. Bacteriol. 186, 1683-1693).

According to the invention, component 2) in the mixtures may not be *Bacillus subtilis* strain FB17.

According to one embodiment, component 2) in the mixtures is at least one biopesticide from group E').

According to another embodiment, component 2) in the mixtures is at least one biopesticide from group E'), which belong to the group of *rhizobia*. *Rhizobia* are soil bacteria that fix nitrogen (diazotrophs) after becoming established inside root nodules of legumes (Fabaceae). *Rhizobia* require a plant host; they cannot independently fix nitrogen. In general, they are Gram-negative, motile, non-sporulating rods. For this application, *rhizobia* are understood to comprise the genera *Rhizobium*, *Sinorhizobium*, *Mesorhizobium* and *Bradyrhizobium*. Thus, according to another embodiment, component 2) in the mixtures is at least one biopesticide selected from *Bradyrhizobium* spp., *B. japonicum*, *B. liaoningense*, *B. lupini*, *Mesorhizobium* spp., *Rhizobium leguminosarum* bv. *phaseoli*, *R. l.* bv. *trifolii*, *R. l.* bv. *viciae* and *Sinorhizobium meliloti*; even more preferably from *Rhizobium leguminosarum* bv. *phaseoli*, *R. l.* bv. *trifolii* and *R. l.* bv. *viciae*.

The biopesticides from group A') and/or B') may also have insecticidal, acaricidal, molluscidal, pheromone, nematicidal, plant stress reducing, plant growth regulator, plant growth promoting and/or yield enhancing activity.

The biopesticides from group C') and/or D') may also have fungicidal, bactericidal, viricidal, plant defense activator, plant stress reducing, plant growth regulator, plant growth promoting and/or yield enhancing activity.

The biopesticides from group E') and/or F') may also have fungicidal, bactericidal, viricidal, plant defense activator, insecticidal, acaricidal, molluscidal, pheromone and/or nematicidal activity.

The biopesticides, their preparation and their biological activity e.g. against harmful fungi, pests is known (e-Pesticide Manual V 5.2 (ISBN 978 1 901396 85 0) (2008-2011); http://www.epa.gov/opp00001/biopesticides/, see product lists therein; http://www.omri.org/omrilists, see lists therein; Bio-Pesticides Database BPDB http://sitem.herts.ac.uk/aeru/bpdb/, see A to Z link therein).

Many of these biopesticides are registered and/or are commercially available: aluminium silicate (Screen™ Duo from Certis LLC, USA), *Agrobacterium radiobacter* K1026 (e. g. NoGall® from BASF Agricultural Specialties Pty Ltd, Australia), *A. radiobacter* K84 (Nature 280, 697-699, 1979; e. g. GallTroll® from AG Biochem, Inc., C, USA), *Ampelomyces quisqualis* M-10 (e. g. AQ 10® from Intrachem Bio GmbH & Co. KG, Germany), *Ascophyllum nodosum* (Norwegian kelp, Brown kelp) extract or filtrate (e. g. ORKA GOLD from BASF Agricultural Specialities (Pty) Ltd., South Africa; or Goemar® from Laboratoires Goemar, France), *Aspergillus flavus* NRRL 21882 isolated from a peanut in Georgia in 1991 by USDA, National Peanut Research Laboratory (e. g. in Afla-Guard® from Syngenta, CH), mixtures of *Aureobasidium pullulans* DSM 14940 and DSM 14941 (e. g. blastospores in BlossomProtect® from bio-ferm GmbH, Germany), *Azospirillum amazonense* BR 11140 (SpY2$^T$) (Proc. 9$^{th}$ Int. and 1$^{st}$ Latin American PGPR meeting, Quimara, Medellín, Colombia 2012, p. 60, ISBN 978-958-46-0908-3), *A. brasilense* AZ39 (Eur. J. Soil Biol 45(1), 28-35, 2009), *A. brasilense* XOH (e. g. AZOS from Xtreme Gardening, USA or RTI Reforestation Technologies International; USA), *A. brasilense* BR 11002 (Proc. 9$^{th}$ Int. and 1$^{st}$ Latin American PGPR meeting, Quimara, Medellín, Colombia 2012, p. 60, ISBN 978-958-46-0908-3), *A. brasilense* BR 11005 (SP245; e. g. in GELFIX Gramíneas from BASF Agricultural Specialties Ltd., Brazil), *A. brasilense* strains Ab-V5 and Ab-V6 (e. g. in AzoMax from Novozymes BioAg Produtos papra Agricultura Ltda., Quattro Barras, Brazil or SimbioseMaíz® from Simbiose-Agro, Cruz Alta, RS, Brazil; Plant Soil 331, 413-425, 2010), *A. lipoferum* BR 11646 (Sp31) (Proc. 9$^{th}$ Int. and 1$^{st}$ Latin American PGPR meeting, Quimara, Medellín, Colombia 2012, p. 60), *Bacillus amyloliquefaciens* FZB42 (e. g. in RhizoVital® 42 from AbiTEP GmbH, Berlin, Germany), *B. amyloliquefaciens* IN937a (J. Microbiol. Biotechnol. 17(2), 280-286, 2007; e. g. in BioYield® from Gustafson LLC, TX, USA), *B. amyloliquefaciens* IT-45 (CNCM I-3800) (e. g. Rhizocell C from ITHEC, France), *B. amyloliquefaciens*

TJ1000 (also called 1BE; ATCC BAA-390; e.g. Quick-Roots™ from TJ Technologies, Watertown, S. Dak., USA; CA 2471555 A1), *B. amyloliquefaciens* ssp. *plantarum* MBI600 (NRRL B50595, deposited at USDA) (e. g. Integral®, Subtilex® NG from BASF Corp., USA), *B. cereus* CNCM I-1562 (U.S. Pat. No. 6,406,690), *B. firmus* CNCM I-1582 (WO 2009/126473, WO 2009/124707, U.S. Pat. No. 6,406,690; Votivo® from Bayer Crop Science LP, USA), *B. pumilus* GB34 (ATCC 700814; e. g. in YieldShield® from Gustafson LLC, TX, USA), *B. pumilus* GHA 180 (IDAC 260707-01; isolated from apple tree rhizosphere in Mexico; e. g. in PRO-MIX® BX from Premier Horticulture, 1, avenue Premier, Rivie're-du-Loup, Quebec, Canada G5R6C1), *B. pumilus* KFP9F (NRRL B50754) (e. g. in BAC-UP or FUSION-P from BASF Agricultural Specialities (Pty) Ltd., South Africa), *B. pumilus* QST 2808 (NRRL B-30087) (e. g. Sonata® and Ballad® Plus from AgraQuest Inc., USA), *B. subtilis* CX-9060 (Federeal Register 77(7), 1633-1637; Certis U.S.A., L.L.C.), *B. subtilis* GB03 (e. g. Kodiak® or BioYield® from Gustafson, Inc., USA; or Companion® from Growth Products, Ltd., White Plains, N.Y. 10603, USA), *B. subtilis* GB07 (Epic® from Gustafson, Inc., USA), *B. subtilis* QST-713 (NRRL B-21661 in Rhapsody®, Serenade® MAX and Serenade® ASO from AgraQuest Inc., USA), *B. subtilis* var. *amyloliquefaciens* FZB24 (e. g. Taegro® from Novozyme Biologicals, Inc., USA), *B. subtilis* var. *amyloliquefaciens* D747 (FERM BP-8234; KR 100903253; e. g. Double Nickel™ 55 WDG or Double Nickel™ LC from Certis LLC, USA), *B. thuringiensis* ssp. *aizawai* ABTS-1857 (e. g. in XenTari® from BioFa AG, Münsingen, Germany), *B. t.* ssp. *aizawai* SAN 401 I, ABG-6305 and ABG-6346, *Bacillus t.* ssp. *israelensis* AM65-52 (e. g. in VectoBac® from Valent BioSciences, IL, USA), *Bacillus thuringiensis* ssp. *kurstaki* SB4 (NRRL B-50753; e. g. Beta Pro® from BASF Agricultural Specialities (Pty) Ltd., South Africa), *B. t.* ssp. *kurstaki* ABTS-351 identical to HD-1 (ATCC SD-1275; e. g. in Dipel® DF from Valent BioSciences, IL, USA), *B. t.* ssp. *kurstaki* EG 2348 (e. g. in Lepinox® or Rapax® from CBC (Europe) S.r.I., Italy), *B. t.* ssp. *tenebrionis* DSM 2803 (EP 0 585 215 B1; identical to NRRL B-15939; Mycogen Corp.), *B. t.* ssp. *tenebrionis* NB-125 (DSM 5526; EP 0 585 215 B1; also referred to as SAN 418 I or ABG-6479; former production strain of Novo-Nordisk), *B. t.* ssp. *tenebrionis* NB-176 (or NB-176-1; a gamma-irridated, induced high-yielding mutant of strain NB-125; DSM 5480; EP 585 215 B1; Novodor® from Valent BioSciences, Switzerland), *Beauveria bassiana* ATCC 74040 (e. g. in Naturalis® from CBC (Europe) S.r.I., Italy), *B. bassiana* DSM 12256 (US 200020031495; e. g. BioExpert® SC from Live Systems Technology S.A., Colombia), *B. bassiana* GHA (BotaniGard® 22WGP from Laverlam Int. Corp., USA), *B. bassiana* PPRI 5339 (ARSEF number 5339 in the USDA ARS collection of entomopathogenic fungal cultures; NRRL 50757) (e. g. BroadBand® from BASF Agricultural Specialities (Pty) Ltd., South Africa), *B. brongniartii* (e. g. in Melocont® from Agrifutur, Agrianello, Italy, for control of cockchafer; J. Appl. Microbiol. 100(5), 1063-72, 2006), *Bradyrhizobium* sp. (e. g. Vault® from BASF Corp., USA), *B. japonicum* (e. g. VAULT® from BASF Corp., USA), *Burkholderia* sp. A396 (NRRL B-50319; WO 2013/032693; Marrone Bio Innovations, Inc., USA), *Candida oleophila* I-182 (NRRL Y-18846; e. g. Aspire® from Ecogen Inc., USA, Phytoparasitica 23(3), 231-234, 1995), *C. oleophila* strain 0 (NRRL Y-2317; Biological Control 51, 403-408, 2009), *Candida saitoana* (e. g. Biocure® (in mixture with lysozyme) and BioCoat® from Micro Flo Company, USA (BASF SE) and Arysta), chitosan (e. g. Armour-Zen® from BotriZen Ltd., NZ), *Clonostachys rosea* f. *catenulata*, also named *Gliocladium catenulatum* (e. g. isolate J 1446: Prestop® from Verdera Oy, Finland), *Chromobacterium subtsugae* PRAA4-1 isolated from soil under an eastern hemlock (*Tsuga canadensis*) in the Catoctin Mountain region of central Maryland (e. g. in GRANDEVO from Marrone Bio Innovations, USA), *Coniothyrium minutans* CON/M/91-08 (DSM 9660; e. g. Contans® WG, Intercept® WG from Prophyta Biologischer Pflanzenschutz GmbH, Germany; WO 1996/021358), *Cryphonectria parasitica* (e. g. product *Endothia parasitica* from CNICM, France), *Cryptococcus albidus* (e. g. YIELD PLUS® from Anchor Bio-Technologies, South Africa), *Cryptophlebia leucotreta* granulovirus (CrleGV) (e. g. in CRYPTEX from Adermatt Biocontrol, Switzerland), *Cydia pomonella* granulovirus (CpGV) V03 (DSM GV-0006; e. g. in MADEX Max from Andermatt Biocontrol, Switzerland), CpGV V22 (DSM GV-0014; e. g. in MADEX Twin from Adermatt Biocontrol, Switzerland), *Delftia acidovorans* RAY209 (ATCC PTA-4249; WO 2003/57861; e. g. in BIOBOOST from Brett Young, Winnipeg, Canada), *Dilophosphora alopecuri* (Twist Fungus from BASF Agricultural Specialties Pty Ltd, Australia), *Ecklonia maxima* (kelp) extract (e. g. KELPAK SL from Kelp Products Ltd, South Africa), *Flavobacterium* sp. H492 (ATCC B-505584, WO 2013/138398), formononetin (e. g. in MYCONATE from Plant Health Care plc, U.K.), *Fusarium oxysporum* (e. g. BIOFOX® from S.I.A.P.A., Italy, FUSACLEAN® from Natural Plant Protection, France), *Glomus intraradices* (e. g. MYC 4000 from ITHEC, France), *Glomus intraradices* RTI-801 (e. g. MYKOS from Xtreme Gardening, USA or RTI Reforestation Technologies International; USA), grapefruit seeds and pulp extract (e. g. BC-1000 from Chemie S.A., Chile), harpin (alpha-beta) protein (e. g. MESSENGER or HARP-N-Tek from Plant Health Care plc, U.K.; Science 257, 1-132, 1992), *Helicoverpa armigera* nucleopolyhedrovirus (HearNPV) (e.g. in HELICOVEX from Adermatt Biocontrol, Switzerland), *Heterorhabditis* bacteriophaga (e. g. Nemasys® G from BASF Agricultural Specialities Limited, UK), *Isaria fumosorosea* Apopka-97 (ATCC 20874) (PFR-97™ from Certis LLC, USA), cis-jasmone (U.S. Pat. No. 8,221,736), laminarin (e. g. in VACCIPLANT from Laboratoires Goemar, St. Malo, France or Stähler SA, Switzerland), *Lecanicillium longisporum* KV42 and KV71 (e. g. VERTALEC® from Koppert BV, Netherlands), *L. muscarium* KV01 (formerly *Verticillium lecanii*) (e. g. MYCOTAL from Koppert BV, Netherlands), *Lysobacter antibioticus* 13-1 (Biological Control 45, 288-296, 2008), *L. antibioticus* HS124 (Curr. Microbiol. 59(6), 608-615, 2009), *L. enzymogenes* 3.1T8 (Microbiol. Res. 158, 107-115; Biological Control 31(2), 145-154, 2004), *Metarhizium anisopliae* var. *acridum* IMI 330189 (isolated from *Ornithacris cavroisi* in *Niger*; NRRL 50758) (e. g. GREEN MUSCLE® from BASF Agricultural Specialities (Pty) Ltd., South Africa), *M. a.* var. *acridum* FI-985 (e. g. GREEN GUARD® SC from BASF Agricultural Specialties Pty Ltd, Australia), *M. anisopliae* FI-1045 (e. g. BIOCANE® from BASF Agricultural Specialties Pty Ltd, Australia), *M. anisopliae* F52 (DSM 3884, ATCC 90448; e. g. MET52® Novozymes Biologicals BioAg Group, Canada), *M. anisopliae* ICIPE 69 (e. g. METATHRIPOL from ICIPE, Nairobe, Kenya), *Metschnikowia fructicola* (NRRL Y-30752; e. g. SHEMER® from Agrogreen, Israel, now distributed by Bayer CropSciences, Germany; U.S. Pat. No. 6,994,849), *Microdochium dimerum* (e. g. ANTIBOT® from Agrauxine, France), *Microsphaeropsis ochracea* P130A (ATCC 74412 isolated from apple leaves from an abandoned orchard, St-Joseph-du-Lac, Quebec, Canada in 1993; Mycologia 94(2), 297-301, 2002), *Muscodor albus* QST 20799 originally isolated from the bark of a cinnamon tree in Honduras (e. g. in development products Muscudor™ or QRD300 from AgraQuest, USA), Neem oil (e. g. TRILOGY®, TRI-ACT® 70 EC from Certis LLC, USA), *Nomuraea rileyi* strains SA86101, GU87401, SR86151, CG128 and VA9101, *Paecilomyces fumosoroseus* FE 9901 (e. g. NO FLY™ from Natural Industries, Inc., USA), *P. lilacinus* 251 (AGAL 89/030550) (WO1991/02051; e. g. in BioAct®/MeloCon® from Prophyta, Germany; Crop Protection 27, 352-361, 2008; originally isolated from infected nematode eggs in the Philippines), *P. lilacinus* DSM 15169 (e. g. NEMATA® SC from Live Systems Technology S.A., Colombia), *P. lilacinus* BCP2 (NRRL 50756; e. g. PL GOLD from BASF Agricultural Specialities (Pty) Ltd., South Africa), mixture of *Paenibacillus alvei* NAS6G6 (NRRL B-50755) and *Bacillus pumilus* (e.g. BAC-UP from BASF Agricultural Specialities (Pty) Ltd., South Africa), *Pantoea vagans* (formerly *agglomerans*) C9-1 (originally isolated in 1994 from apple stem tissue; BlightBan C9-1® from NuFrams America Inc., USA, for control of fire blight in apple; J. Bacteriol. 192(24) 6486-6487, 2010), *Pasteuria* sp. ATCC PTA-9643 (WO 2010/085795), *P. nishizawae* Pn1 (ATCC SD-5833) (e.g. CLARIVA PN from Syngenta Crop Protection, LLC, Greenborom; C, USA), *Pasteuria* sp. ATCC SD-5832 (WO 2012/064527), *P. nishizawae* (WO 2010/80169), *P. penetrans* (U.S. Pat. No. 5,248,500), *P. ramose* (WO 2010/80619), *P. thornea* (WO 2010/80169), *P. usgae* (WO 2010/80169), *Penicillium bilaiae* strains ATCC 18309 (=ATCC 74319), ATCC 20851 and ATCC 22348 (=ATCC 74318) (also called *P. bilaii*; e. g. in Jump Start®, Provide® from Novozymes Biologicals BioAg Group, Canada, originally isolated from soil in southern Alberta; Fertilizer Res. 39, 97-103, 1994; Can. J. Plant Sci. 78(1): 91-102, 1998; U.S. Pat. No. 5,026,417, WO1995/017806), *P. bilaiae* NRRL 50162 and NRRL 50169 (WO 2010/037228), *Phlebiopsis gigantea* (e. g. RotStop® from Verdera Oy, Finland), *Pichia anomala* WRL-076 (NRRL Y-30842; U.S. Pat. No. 8,206,972), potassium bicarbonate (e. g. Amicarb® from Stähler SA, Switzerland), potassium silicate (e. g. Sil-MATRIX™ from Certis LLC, USA), *Pseudozyma flocculosa* PF-A22 UL (e. g. Sporodex® from Plant Products Co. Ltd., Canada), *Pseudomonas* sp. DSM 13134 (WO 2001/40441, e. g. in PRORADIX from Sourcon Padena GmbH & Co. KG, Hechinger Str. 262, 72072 Tübingen, Germany), *P. chloraphis* MA 342 (e. g. in CERALL or CEDEMON from BioAgri AB, Uppsala, Sweden), *P. fluorescens* (e.g. in Bio Cure-B from T. Stanes & Company Limited, India; or in Blight-End from Agri Naturals, Mumbai, India), *P. fluorescens* CL 145A (e. g. in ZEQUANOX from Marrone Bio-Innovations, Davis, Calif., USA; J. Invertebr. Pathol. 113 (1):104-14, 2013), *P. fluorescens* A506 (ATCC 31948) (e. g. in BlightBan® from NuFarm Americas, Inc., Morrisville, N.C., USA; Phytopathol 97(2), 244-249, 2007), *Pythium oligandrum* DV 74 (ATCC 38472; e. g. POLYVERSUM® from Remeslo SSRO, Biopreparaty, Czech Rep. and GOWAN, USA; US 2013/0035230), *Reynoutria sachlinensis* extract (e. g. REGALIA® SC from Marrone BioInnovations, Davis, Calif., USA), *Rhizobium leguminosarum* bv. *phaseoli* (e. g. RHIZO-STICK from BASF Corp., USA), *R. l.* bv. *trifolii* RP113-7 (e. g. DORMAL from BASF Corp., USA; Appl. Environ. Microbiol. 44(5), 1096-1101), *R. l.* bv. *viciae* P1NP3Cst (also referred to as 1435; New Phytol. 179(1), 224-235, 2008; e. g. in NODULATOR PL Peat Granule from BASF Corp., USA; or in NODULATOR XL PL from BASF Agricultural Specialties Ltd., Canada), *R. l.* bv. *viciae* SU303 (e. g. NODULAID Group E from BASF Agricultural Specialties Pty Ltd, Australia), *R. l.* bv. *viciae* WSM1455 (e. g. NODULAID Group F from BASF Agricultural Specialties Pty Ltd, Australia), *R. tropici* SEMIA 4080 (identical to PRF 81; Soil Biology & Biochemistry 39, 867-876, 2007), *Sinorhizobium meliloti* MSDJ0848 (INRA, France) also referred to as strain 2011 or RCR2011 (Mol. Gen. Genomics 272, 1-17, 2004; e. g. DORMAL ALFALFA from BASF Corp., USA; NITRAGIN® Gold from Novozymes Biologicals BioAg Group, Canada), *Sphaerodes mycoparasitica* IDAC 301008-01 (WO 2011/022809), *Spodoptera littoralis* nucleopolyhedrovirus (SpliNPV) (e.g. in LITTOVIR from Adermatt Biocontrol, Switzerland), *Steinernema carpocapsae* (e. g. MILLENIUM® from BASF Agricultural Specialities Limited, UK), *S. feltiae* (NEMASHIELD® from BioWorks, Inc., USA; NEMASYS® from BASF Agricultural Specialities Limited, UK), *S. kraussei* L137 (NEMASYS® L from BASF Agricultural Specialities Limited, UK), *Streptomyces galbus* AQ6047 (NRRL 30232; U.S. Pat. No. 6,682,925); *S. galbus* M1064 (NRRL 50334; WO 2012/135763); *S. griseovindis* K61 (e. g. MYCOSTOP® from Verdera Oy, Espoo, Finland; Crop Protection 25, 468-475, 2006), *S. lydicus* WYEC 108 (e. g. Actinovate® from Natural Industries, Inc., USA, U.S. Pat. No. 5,403,584), *S. violaceusniger* YCED-9 (e. g. DT-9® from Natural Industries, Inc., USA, U.S. Pat. No. 5,968, 503), *Talaromyces flavus* V117b (e. g. PROTUS® from Prophyta, Germany), *Trichoderma asperellum* SKT-1 (e. g. ECO-HOPE® from Kumiai Chemical Industry Co., Ltd., Japan), *T. asperellum* ICC 012 (e. g. in TENET WP, REMDIER WP, BIOTEN WP from Isagro N.C., USA, BIO-TAM from AgraQuest, USA), *T. atroviride* LC52 (e. g. SENTINEL® from Agrimm Technologies Ltd, NZ), *T. atroviride* CNCM I-1237 (e. g. in Esquive WG from Agrauxine S.A., France, e. g. against pruning wound diseases on vine and plant root pathogens), *T. fertile* JM41R (NRRL 50759; e. g. TRICHOPLUS™ from BASF Agricultural Specialities (Pty) Ltd., South Africa), *T. gamsii* ICC 080 (e. g. in TENET WP, REMDIER WP, BIOTEN WP from Isagro N.C., USA, BIO-TAM from AgraQuest, USA), *T. harzianum* T-22 (also called KRL-AG2; ATCC 20847; e. g. PLANTSHIELD® from BioWorks Inc., USA or SabrEx™ from Advanced Biological Marketing Inc., Van Wert, Ohio, USA; BioControl 57, 687-696, 2012), *T. harzianum* TH 35 (e. g. ROOT PRO® from Mycontrol Ltd., Israel), *T. harzianum* T-39 (e. g. TRICHODEX® and *TRICHODERMA* 2000® from Mycontrol Ltd., Israel and Makhteshim Ltd., Israel), mixture of *T. harzianum* and *T. viride* (e. g. TRICHOPEL from Agrimm Technologies Ltd, NZ), *T. harzianum* ICC012 and *T. viride* ICC080 (e. g. REMEDIER® WP from Isagro Ricerca, Italy), *T. polysporum* and *T. harzianum* (e. g. BINAB® from BINAB Bio-Innovation AB, Sweden), *T. stromaticum* (e. g. TRICOVAB® from C.E.P.L.A.C., Brazil), *T. virens* G1-3 (also called G1-3; ATCC 58678; e.g. QuickRoots™ from TJ Technologies, Watertown, S. Dak., USA; CA 2471555 A1), *T. virens* GL-21 (also called G1-21; U.S. Pat. No. 7,429,477 B2; e. g. SOILGARD® 12G from Certis LLC, USA; EPA Registration Number: 70051-3 and EPA Establishment Number: 067250-IL-001), *T. virens* G-41 (also called 041, #41X or ABM 127; isolated from soil samples taken from *Aphanomyces*-suppressive bean fields in Livingston County, N.Y.; U.S. Pat. No. 4,996,157; e. g. ROOTSHIELD® PLUS from BioWorks, Inc., USA), *T. viride* (e. g. TRIECO® from Ecosense Labs. (India) Pvt. Ltd., Indien, BIO-CURE® F from T. Stanes & Co. Ltd., Indien), *T. viride* TV1 (e. g. *T. viride* TV1 from Agribiotec srl, Italy) and *Ulocladium oudemansii* HRU3 (e. g. in BOTRY-ZEN® from Botry-Zen Ltd, NZ).

Strains can be sourced from genetic resource and deposition centers: Australian Government Analytical Laboratories at 1 Suakin Street, Pymble, New South Wales, 2073, Australia (strains with prefix AGAL); American Type Culture Collection, 10801 University Blvd., Manassas, Va. 20110-2209, USA (strains with ATCC prefix); CABI Europe—International Mycological Institute, Bakeham Lane, Egham, Surrey, TW20 9TYNRRL, UK (strains with prefices CABI and IMI); Centraalbureau voor Schimmelcultures, Fungal Biodiversity Centre, Uppsalaan 8, PO Box 85167, 3508 AD Utrecht, Netherlands (strains with prefix CBS); Division of Plant Industry, CSIRO, Canberra, Australia (strains with prefix CC); Collection Nationale de Cultures de Microorganismes, Institut Pasteur, 25 rue du Docteur Roux, F-75724 PARIS Cedex 15 (strains with prefix CNCM); Leibniz-lnstitut DSMZ-Deutsche Sammlung von Mikroorganismen and Zellkulturen GmbH, Inhoffenstraβe 7 B, 38124 Braunschweig, Germany (strains with prefix DSM); International Depositary Authority of Canada Collection, Canada (strains with prefix IDAC); International Collection of Micro-organisms from Plants, Landcare Research, Private Bag 92170, Auckland Mail Centre, Auckland 1142, New Zealand (strans with prefix ICMP); IITA, PMB 5320, Ibadan, Nigeria (strains with prefix IITA); The National Collections of Industrial and Marine Bacteria Ltd., Torry Research Station, P.O. Box 31, 135 Abbey Road, Aberdeen, AB9 8DG, Scotland (strains with prefix NCIMB); ARS Culture Collection of the National Center for Agricultural Utilization Research, Agricultural Research Service, U.S. Department of Agriculture, 1815 North University Street, Peoria, Ill. 61604, USA (strains with prefix NRRL); Department of Scientific and Industrial Research Culture Collection, Applied Biochemistry Division, Palmerston North, New Zealand (strains with prefix NZP); FEPAGRO-Fundação Estadual de Pesquisa Agropecuária, Rua Gonçalves Dias, 570, Bairro Menino Deus, Porto Alegre/RS, Brazil (strains with prefix SEMIA); SARDI, Adelaide, South Australia (strains with prefix SRDI); U.S. Department of Agriculture, Agricultural Research Service, Soybean and Alfalfa Research Laboratory, BARC-West, 10300 Baltimore Boulevard, Building 011, Beltsville, Md. 20705, USA (strains with prefix USDA: Beltsville Rhizob. Culture Coll. Catalog March 1987 USDA-ARS ARS-30: http://pdf.usaid. gov/pdf_docs/PNAAW891.pdf); and Murdoch University, Perth, Western Australia (strains with prefix WSM). Further strains may be found at the Global catalogue of Microorganisms: http://gcm.wfcc.info/ and http://www.landcareresearch.co.nz/resources/collections/icmp and further references to strain collections and their prefixes at http://refs.wdcm.org/collections.htm.

*Bacillus amyloliquefaciens* ssp. *plantarum* MBI600 (NRRL B-50595) is deposited under accession number NRRL B-50595 with the strain designation *Bacillus subtilis* 1430 (and identical to NCIMB 1237). Recently, MBI 600 has been re-classified as *Bacillus amyloliquefaciens* ssp. *plantarum* based on polyphasic testing which combines classical microbiological methods relying on a mixture of traditional tools (such as culture-based methods) and molecular tools (such as genotyping and fatty acids analysis). Thus, *Bacillus subtilis* MBI600 (or MBI 600 or MBI-600) is identical to *Bacillus amyloliquefaciens* ssp. *plantarum* MBI600, formerly *Bacillus subtilis* MBI600. MBI600 is known as plant growth-promoting rice seed treatment from Int. J. Microbiol. Res. 3(2) (2011), 120-130 and further described e. g. in US 2012/0149571 A1. The strain MBI600 is e. g. commercially available as liquid formulation product INTEGRAL® (BASF Corp., USA).

According to one embodiment of the inventive mixtures, the at least one biopesticide II is *Bacillus amyloliquefaciens* ssp. *plantarum* MBI600. These mixtures are particularly suitable in soybean.

*Bacillus amyloliquefaciens* AP-136 (NRRL B-50614), *B. amyloliquefaciens* AP-188 (NRRL B-50615), *B. amyloliquefaciens* AP-218 (NRRL B-50618), *B. amyloliquefaciens* AP-219 (NRRL B-50619), *B. amyloliquefaciens* AP-295 (NRRL B-50620), *B. japonicum* SEMIA 5079 (e. g. GELFIX 5 or ADHERE 60 from BASF Agricultural Specialties Ltd., Brazil), *B. japonicum* SEMIA 5080 (e. g. GELFIX 5 or ADHERE 60 from BASF Agricultural Specialties Ltd., Brazil), *B. mojavensis* AP-209 (NRRL B-50616), *B. solisalsi* AP-217(NRRL B-50617), *B. pumilus* INR-7 (otherwise referred to as BU-F22 (NRRL B-50153) and BU-F33 (NRRL B-50185)), *B. simplex* ABU 288 (NRRL B-50340) and *B. amyloliquefaciens* ssp. *plantarum* MBI600 (NRRL B-50595) have been mentioned i. a. in US 2012/0149571, U.S. Pat. No. 8,445,255, WO 2012/079073.

According to another embodiment of the inventive mixtures, the at least one biopesticide II is *B. pumilus* strain INR-7 (otherwise referred to as BU-F22 (NRRL B-50153) and BU-F33 (NRRL B-50185). These mixtures are particularly suitable in soybean and corn.

According to another embodiment of the inventive mixtures, the at least one biopesticide II is *Bacillus pumilus*, preferably *B. pumilis* strain INR-7 (otherwise referred to as BU-F22 (NRRL B50153) and BU-F33 (NRRL B-50185). These mixtures are particularly suitable in soybean and corn.

According to another embodiment of the inventive mixtures, the at least one biopesticide II is *Bacillus simplex*, preferably *B. simplex* strain ABU 288 (NRRL B-50340). These mixtures are particularly suitable in soybean and corn.

According to another embodiment of the inventive mixtures, the at least one biopesticide II is selected from *Trichoderma asperellum, T. atroviride, T. fertile, T. gamsii, T. harmatum*, mixture of *T. harzianum* and *T. viride*; mixture of *T. polysporum* and *T. harzianum; T. stromaticum, T. virens* (also named *Gliocladium virens*) and *T. viride*; preferably *Trichoderma fertile*, in particular *T. fertile* strain JM41R. These mixtures are particularly suitable in soybean and corn.

According to another embodiment of the inventive mixtures, the at least one biopesticide II is *Sphaerodes mycoparasitica*, preferably *Sphaerodes mycoparasitica* strain IDAC 301008-01 (also referred to as strain SMCD2220-01). These mixtures are particularly suitable in soybean and corn.

According to another embodiment of the inventive mixtures, the at least one biopesticide II is *Beauveria bassiana*, preferably *Beauveria bassiana* strain PPRI5339. These mixtures are particularly suitable in soybean and corn.

According to another embodiment of the inventive mixtures, the at least one biopesticide II is *Metarhizium anisopliae* or *M. anisopliae* var. *acridium*, preferably *M. anisopliae* var. *acridium* strain IMI 330189. These mixtures are particularly suitable in soybean and corn.

According to another embodiment of the inventive mixtures, *Bradyrhizobium* spp. (meaning any *Bradyrhizobium* species and/or strain) as biopesticide II is *Bradyrhizobium japonicum* (*B. japonicum*). These mixtures are particularly suitable in soybean. Preferably, *B. japonicum* is not one of the strains TA-11 or 532c. *B. japonicum* strains were cultivated using media and fermentation techniques known in the art, e.g. in yeast extract-mannitol broth (YEM) at 27° C. for about 5 days.

The present invention also relates to mixtures, wherein the at least one biopesticide II is selected from *B. japonicum* and further comprises a compound III, wherein compound III is selected from jasmonic acid or salts or derivatives thereof including cis-jasmone, preferably methyl-jasmonate or cis-jasmone.

References for various *B. japonicum* strains are given e.g. in U.S. Pat. No. 7,262,151 (*B. japonicum* strains USDA 110 (=IITA 2121, SEMIA 5032, RCR 3427, ARS I-110, Nitragin 61A89; isolated from *Glycine max* in Florida in 1959, Serogroup 110; Appl Environ Microbiol 60, 940-94, 1994), USDA 31 (=Nitragin 61A164; isolated from *Glycine max* in Wisconsin in 1941, USA, Serogroup 31), USDA 76 (plant passage of strain USDA 74 which has been isolated from *Glycine max* in California, USA, in 1956, Serogroup 76), USDA 121 (isolated from *Glycine max* in Ohio, USA, in 1965), USDA 3 (isolated from *Glycine max* in Virginia, USA, in 1914, Serogroup 6) and USDA 136 (=CB 1809, SEMIA 586, Nitragin 61A136, RCR 3407; isolated from *Glycine max* in Beltsville, Md. in 1961; Appl Environ Microbiol 60, 940-94, 1994). USDA refers to United States Department of Agriculture Culture Collection, Beltsville, Md., USA (see e.g. Beltsville *Rhizobium* Culture Collection Catalog March 1987 ARS-30). Further suitable *B. japonicum* strain G49 (INRA, Angers, France) is described in Fernandez-Flouret, D. & Cleyet-Marel, J. C. (1987) C R Acad Agric Fr 73, 163-171), especially for soybean grown in Europe, in particular in France. Further suitable *B. japonicum* strain TA-11 (TA11 NOD$^+$) (NRRL B-18466) is i.a. described in U.S. Pat. No. 5,021,076; Appl Environ Microbiol (1990) 56, 2399-2403 and commercially available as liquid inoculant for soybean (VAULT® NP, Becker Underwood, USA). Further *B. japonicum* strains as example for compound III are described in US2012/0252672A. Further suitable and especially in Canada commercially available strain 532c (The Nitragin Company, Milwaukee, Wis., USA, field isolate from Wisconsin; Nitragin strain collection No. 61A152; Can J Plant Sci 70 (1990), 661-666).

Other suitable and commercially available *B. japonicum* strains (see e.g. Appl Environ Microbiol 2007, 73(8), 2635) are SEMIA 566 (isolated from North American inoculant in 1966 and used in Brazilian commercial inoculants from 1966 to 1978), SEMIA 586 (=CB 1809; originally isolated in Maryland, USA but received from Australia in 1966 and used in Brazilian inoculants in 1977), CPAC 15 (=SEMIA 5079; a natural variant of SEMIA 566 used in commercial inoculants since 1992) and CPAC 7 (=SEMIA 5080; a natural variant of SEMIA 586 used in commercial inoculants since 1992). These strains are especially suitable for soybean grown in Australia or South America, in particular in Brazil. Some of the abovementioned strains have been re-classified as a novel species *Bradyrhizobium elkanii*, e.g. strain USDA 76 (Can. J. Microbiol., 1992, 38, 501-505).

Another suitable and commercially available *B. japonicum* strain is E-109 (variant of strain USDA 138, see e.g. Eur. J. Soil Biol. 45 (2009) 28-35; Biol Fertil Soils (2011) 47:81-89, deposited at Agriculture Collection Laboratory of the Instituto de Microbiologia y Zoologia Agricola (IMYZA), Instituto Nacional de Tecnologiá Agropecuaria (INTA), Castelar, Argentina). This strain is especially suitable for soybean grown in South America, in particular in Argentina.

According to a further embodiment, *B. japonicum* is selected from strains E-109, SEMIA 5079, SEMIA 5080, TA-11 and 532c, more preferably a mixture of *B. japonicum* strains TA-11 and 532c or a mixture of strains SEMIA 5079 and SEMIA 5080 is used.

The present invention also relates to mixtures, wherein the at least one biopesticide II is selected from *Bradyrhizobium elkanii* and *Bradyrhizobium liaoningense* (*B. elkanii* and *B. liaoningense*), more preferably from *B. elkanii*. These mixtures are particularly suitable in soybean. *B. elkanii* and *B. liaoningense* were cultivated using media and fermentation techniques known in the art, e.g. in yeast extract-mannitol broth (YEM) at 27° C. for about 5 days.

The present invention also relates to mixtures wherein the at least one biopesticide II is selected from selected from *B. elkanii* and *B. liaoningense* and further comprises a compound III, wherein compound III is selected from jasmonic acid or salts or derivatives thereof including cis-jasmone, preferably methyl-jasmonate or cis-jasmone.

Suitable and commercially available *B. elkanii* strains are SEMIA 587 and SEMIA 5019 (=29W) (see e.g. Appl Environ Microbiol 2007, 73(8), 2635) and USDA 3254 and USDA 76 and USDA 94 Preferably, mixtures of *B. elkanii* strains SEMIA 587 and SEMIA 5019 are useful (e. g. in GELFIX 5 from BASF Agricultural Specialties Ltd., Brazil). Further commercially available *B. elkanii* strains are U-1301 and U-1302 (e.g. product Nitroagin® Optimize from Novozymes Bio As S.A., Brazil or NITRASEC for soybean from LAGE y Cia, Brazil). These strains are especially suitable for soybean grown in Australia or South America, in particular in Brazil.

According to a further embodiment, *B. elkanii* is selected from strains SEMIA 587 and SEMIA5019, more preferably a mixture of *B. elkanii* strains SEMIA 587 and SEMIA 5019.

The present invention also relates to mixtures, wherein biopesticide II is selected from *Bradyrhizobium* sp. (*Arachis*) (*B.* sp. *Arachis*) which shall describe the cowpea miscellany cross-inoculation group which includes inter alia indigenous cowpea bradyrhizobia on cowpea (*Vigna unguiculata*), siratro (*Macroptilium atropurpureum*), lima bean (*Phaseolus lunatus*), and peanut (*Arachis hypogaea*). This mixture comprising *B.* sp. *Arachis* is especially suitable for use in peanut, Cowpea, Mung bean, Moth bean, Dune bean, Rice bean, Snake bean and Creeping *Vigna*, in particular peanut.

Suitable and commercially available *B.* sp. (*Arachis*) strain is CB1015 (=IITA 1006, USDA 3446 presumably originally collected in India; from Australian Inoculants Research Group; see e.g. http://www.qaseeds.com.au/inoculant_applic.php; Beltsville *Rhizobium* Culture Collection Catalog March 1987 USDA-ARS ARS-30). These strains are especially suitable for peanut grown in Australia, North America or South America, in particular in Brazil. Further suitable strain is *Bradyrhizobium* sp. PNL01 (Becker Underwood; ISO Rep Marita McCreary, QC Manager Padma Somasageran; IDENTIFICATION OF *RHIZOBIA* SPECIES THAT CAN ESTABLISH NITROGEN-FIXING NODULES IN *CROTALARIA LONGIROSTRATA*. Apr. 29, 2010, University of Massachusetts Amherst: http://www.wpi.edu/Pubs/E-project/Available/E-project-042810-163614/unrestricted/Bisson.Mason._Identification_of_Rhizobia_Species_That_can_Establish_Nitrogen-Fixing_Nodulesin_Crotalia_Longirostrata.pdf).

Suitable and commercially available *Bradyrhizobium* sp. (*Arachis*) strains especially for cowpea and peanut but also for soybean are strains SEMIA 6144, SEMIA 6462 (=BR 3267) and SEMIA 6464 (=BR 3262) (deposited at FEPAGRO-MIRCEN, R. Gonçalves Dias, 570 Porto Alegre-RS, 90130-060, Brazil; see e.g. FEMS Microbiology Letters (2010) 303(2), 123-131; Revista Brasileira de Ciencia do Solo (2011) 35(3); 739-742, ISSN 0100-0683).

The present invention also relates to mixtures wherein the at least one biopesticide II is selected from *Bradyrhizobium* sp. (*Arachis*) and further comprises a compound III, wherein compound III is selected from jasmonic acid or salts or derivatives thereof including cis-jasmone, preferably methyl-jasmonate or cis-jasmone.

The present invention also relates to mixtures, wherein biopesticide II is selected from *Bradyrhizobium* sp. (Lupine) (also called *B. lupini, B. lupines* or *Rhizobium lupini*). These mixtures are especially suitable for use in dry beans and lupins.

Suitable and commercially available *B. lupini* strain is LL13 (isolated from *Lupinus iuteus* nodules from French soils; deposited at INRA, Dijon and Angers, France; http://agriculture.gouv.fr/IMG/pdf/ch20060216.pdf). This strain is especially suitable for lupins grown in Australia, North America or Europe, in particular in Europe.

Further suitable and commercially available *B. lupini* strains WU425 (isolated in Esperance, Western Australia from a non-Australian legume *Ornthopus compressus*), WSM4024 (isolated from lupins in Australia by CRS during a 2005 survey) and WSM471 (isolated from *Ornithopus pinnatus* in Oyster Harbour, Western Australia) are described e.g. in Palta J. A. and Berger J. B. (eds), 2008, Proceedings 12$^{th}$ International Lupin Conference, 14-18 Sep. 2008, Fremantle, Western Australia. International Lupin Association, Canterbury, New Zealand, 47-50, ISBN 0-86476-153-8: http://www.lupins.org/pdf/conference/2008/Agronomy%20and%20Production/John%20Howieson%20and%20G%20OHara.pdf; Appl Environ Microbiol (2005) 71, 7041-7052 and Australian J. Exp. Agricult. (1996) 36(1), 63-70.

The present invention also relates to mixtures wherein the at least one biopesticide II is selected from *Bradyrhizobium* sp. (Lupine) (*B. lupini*) and further comprises a compound III, wherein compound III is selected from jasmonic acid or salts or derivatives thereof including cis-jasmone, preferably methyl-jasmonate or cis-jasmone.

The present invention also relates to mixtures, wherein the at least one biopesticide II is selected from *Mesorhizobium* spp. (meaning any *Mesorhizobium* species and/or strain), more preferably *Mesorhizobium ciceri*. These mixtures are particularly suitable in cowpea.

Suitable and commercially available *M.* sp. strains are e.g. *M. ciceri* CC1192 (=UPM 848, CECT 5549; from Horticultural Research Station, Gosford, Australia; collected in Israel from *Cicer arietinum* nodules; Can J Microbial (2002) 48, 279-284) and *Mesorhizobium* sp. strains WSM1271 (collected in Sardinia, Italy, from plant host *Biserrula pelecinus*), WSM 1497 (collected in Mykonos, Greece, from plant host *Biserrula pelecinus*), *M. loti* strains CC829 (commercial inoculant for *Lotus pedunculatus* and *L. ulginosus* in Australia, isolated from *L. ulginosus* nodules in USA) and SU343 (commercial inoculant for *Lotus corniculatus* in Australia; isolated from host nodules in USA) all of which are deposited at Western Australian Soil Microbiology (WSM) culture collection, Australia and/or CSIRO collection (CC), Canberra, Australian Capirtal Territory (see e.g. Soil Biol Biochem (2004) 36(8), 1309-1317; Plant and Soil (2011) 348(1-2), 231-243).

Suitable and commercially available *M. loti* strains are e.g. *M. loti* CC829 for *Lotus pedunculatus*.

The present invention also relates to mixtures wherein the at least one biopesticide II is selected from *Mesorhizobium ciceri* and further comprises a compound III, wherein compound III is selected from jasmonic acid or salts or derivatives thereof including cis-jasmone, preferably methyl-jasmonate or cis-jasmone.

The present invention also relates to mixtures comprising biopesticide II and comprising compound III, wherein compound III is selected from *Mesorhizobium huakuii*, also referred to as *Rhizobium huakuii* (see e.g. Appl Environ Microbiol (2011) 77(15), 5513-5516). These mixtures are particularly suitable in *Astralagus*, e.g. *Astalagus sinicus* (Chinese milkwetch), *Thermopsis*, e.g. *Thermopsis luinoides* (Goldenbanner) and alike.

Suitable and commercially available *M. huakuii* strain is HN3015 which was isolated from *Astralagus sinicus* in a rice-growing field of Southern China (see e.g. World J. Microbiol. Biotechn. (2007) 23(6), 845-851, ISSN 0959-3993).

The present invention also relates to mixtures wherein the at least one biopesticide II is selected from *Mesorhizobium huakuii* and further comprises a compound III, wherein compound III is selected from jasmonic acid or salts or derivatives thereof including cis-jasmone, preferably methyl-jasmonate or cis-jasmone.

The present invention also relates to mixtures, wherein the at least one biopesticide II is selected from *Azospirillum amazonense, A. brasilense, A. lipoferum, A. irakense, A. halopraeferens*, more preferably from *A. brasilense*, in particular selected from *A. brasilense* strains BR 11005 (SP 245) and AZ39 which are both commercially used in Brazil and are obtainable from EMBRAPA, Brazil. These mixtures are particularly suitable in soybean.

Humates are humic and fulvic acids extracted from a form of lignite coal and clay, known as leonardite. Humic acids are organic acids that occur in humus and other organically derived materials such as peat and certain soft coal. They have been shown to increase fertilizer efficiency in phosphate and micro-nutrient uptake by plants as well as aiding in the development of plant root systems.

Salts of jasmonic acid (jasmonate) or derivatives include without limitation the jasmonate salts potassium jasmonate, sodium jasmonate, lithium jasmonate, ammonium jasmonate, dimethylammonium jasmonate, isopropylammonium jasmonate, diolammonium jasmonate, diethtriethanolammonium jasmonate, jasmonic acid methyl ester, jasmonic acid amide, jasmonic acid methylamide, jasmonic acid-L-amino acid (amide-linked) conjugates (e.g., conjugates with Lisoleucine, L-valine, L-leucine, or L-phenylalanine), 12-oxo-phytodienoic acid, coronatine, coronafacoyl-L-serine, coronafacoyl-L-threonine, methyl esters of 1-oxo-indanoyl-isoleucine, methyl esters of 1-oxo-indanoyl-leucine, coronalon (2-[(6-ethyl-1-oxo-indane-4-carbonyl)-amino]-3-methyl-pentanoic acid methyl ester), linoleic acid or derivatives thereof and cis-jasmone, or combinations of any of the above.

Moreover, the invention also relates to a method for controlling phytopathogenic harmful fungi, insects or other pests or to a method for regulating plant growth or to a method for improving the health of the plants using mixtures of *Bacillus subtilis* strain FB17, or a cell-free extract thereof or at least one metabolite thereof, and/or a mutant of *Bacillus subtilis* FB17 having all the identifying characteristics thereof or extract of the mutant, and a biopesticide II and to the use of the components 1) and 2) as defined herein for preparing such mixtures, and to compositions and seed comprising these mixtures.

Moreover, we have found that simultaneous, that is joint or separate, application of *Bacillus subtilis* strain FB17, or a cell-free extract thereof or at least one metabolite thereof, and/or a mutant of *Bacillus subtilis* FB17 having all the identifying characteristics thereof or extract of the mutant, and a biopesticide II or successive application of *Bacillus subtilis* strain FB17, or a cell-free extract thereof or at least one metabolite thereof, and/or a mutant of *Bacillus subtilis* FB17 having all the identifying characteristics thereof or extract of the mutant, and a biopesticide II allows better control of harmful fungi than is possible with the individual compounds alone (synergistic mixtures). Furthermore, synergistic effects in relation with the insecticidal, pesticidal, herbicidal, plant growth regulating and/or plant health improving action have been found with the inventive mixtures.

According to one embodiment, the mixtures comprise component 1) and component 2) in a synergistically effective amount.

According to a further embodiment, the present invention relates to mixtures comprising, as active components 1) *Bacillus subtilis* strain FB17, or a cell-free extract thereof or at least one metabolite thereof, and/or a mutant of *Bacillus subtilis* FB17 having all the identifying characteristics thereof or extract of the mutant;
and
2) at least one biopesticide II selected from the groups A') to F'):

A') Microbial pesticides with fungicidal, bactericidal, viricidal and/or plant defense activator activity: *Ampelomyces quisqualis* M-10 (L.1.1), *Aspergillus flavus* NRRL 21882 (L1.2), *Aureobasidium pullulans* DSM 14940 (L1.3), *A. pullulans* DSM 14941 (L.1.4), *Bacillus amyloliquefaciens* AP-136 (NRRL B-50614) (L.1.5), *B. amyloliquefaciens* AP-188 (NRRL B-50615) (L.1.6), *B. amyloliquefaciens* AP-218 (NRRL B-50618) (L.1.7), *B. amyloliquefaciens* AP-219 (NRRL B-50619) (L.1.8), *B. amyloliquefaciens* AP-295 (NRRL B-50620) (L.1.9), *B. amyloliquefaciens* FZB42 (L.1.10), *B. amyloliquefaciens* IN937a (L.1.11), *B. amyloliquefaciens* IT-45 (CNCM I-3800) (L.1.12), *B. amyloliquefaciens* TJ1000 (L.1.75), *B. amyloliquefaciens* ssp. *plantarum* MB 1600 (NRRL B-50595) (L.1.13), *B. mojavensis* AP-209 (NRRL B-50616) (L.1.15), *B. pumilus* INR-7 (NRRL B-50153; NRRL B-50185) (L.1.14), *B. pumilus* KFP9F (L.1.15), *B. pumilus* QST 2808 (NRRL B-30087) (L.1.16), *B. pumilus* GHA 180 (L.1.17), *B. simplex* ABU 288 (NRRL B-50340) (L.1.18), *B. solisalsi* AP-217 (NRRL B-50617) (L.1.19), *B. subtilis* CX-9060 (L.1.20), *B. subtilis* FB17 (L.1.74), *B. subtilis* GB03 (L.1.21), *B. subtilis* GB07 (L.1.22), *B. subtilis* QST-713 (NRRL B-21661) (L.1.23), *B. subtilis* var. *amyloliquefaciens* FZB24 (L.1.24), *B. subtilis* var. *amyloliquefaciens* D747 (L.1.25), *Candida oleophila* I-82 (L.1.26), *C. oleophila* O (L.1.27), *C. saitoana* (L.1.28), *Clavibacter michiganensis* (bacteriophages) (L.1.29), *Coniothyrium minitans* CON/M/91-08 (L.1.30), *Cryphonectria parasitica* (L.1.31), *Cryptococcus albidus* (L.1.32), *Dilophosphora alopecuri* (L.1.33), *Fusarium oxysporum* (L.1.34), *Clonostachys rosea* f. *catenulata* J1446 (L.1.35), *Gliocladium roseum* 321 U (L.1.36), *Metschnikowia fructicola* NRRL Y-30752 (L.1.37), *Microdochium dimerum* (L.1.38), *Microsphaeropsis ochracea* P130A (L.1.39), *Muscodor albus* QST 20799 (L.1.40), *Paenibacillus polymyxa* PKB1 (ATCC 202127) (L.1.41), *Pantoea vagans* C9-1 (L.1.42), *Phlebiopsis gigantea* (L.1.43), *Pichia anomala* WRL-76 (L.1.44), *Pseudozyma flocculosa* PF-A22 UL (L.1.45), *Pythium oligandrum* DV 74 (L.1.46), *Sphaerodes mycoparasitica* IDAC 301008-01 (L.1.47), *Streptomyces griseoviridis* K61 (L.1.48), *S. lydicus* WYEC 108 (L.1.49), *S. violaceusniger* XL-2 (L.1.50), *S. violaceusniger* YCED-9 (L.1.51), *Talaromyces flavus* V117b (L.1.52), *Trichoderma asperellum* T34 (L.1.53), *T. asperellum* SKT-1 (L.1.54), *T. asperellum* ICC 012 (L.1.55), *T. atroviride* LC52 (L.1.56), *T. atroviride* CNCM I-1237 (L.1.57), *T. fertile* JM41R (L.1.58), *T. gamsii* ICC080 (L.1.59), *T. harmatum* TH 382 (L.1.60), *T. harzianum* TH-35 (L.1.61), *T. harzianum* T-22 (L.1.62), *T. harzianum* T-39 (L.1.63); mixture of *T. harzianum* ICC012 and *T. viride* ICC080 (L.1.64); mixture of *T. polysporum* and *T. harzianum* (L.1.65); *T. stromaticum* (L.1.66), *T. virens* G1-3 (L.1.76), *T. virens* G-41 (L.1.77), *T. virens* GL-21 (L.1.67), *T. virens* G41 (L.1.68), *T. viride* TV1 (L.1.69), *Typhula phacorrhiza* 94671 (L.1.70), *Ulocladium oudemansii* HRU3 (L.1.71), *Verticillium dahlia* (L.1.72), zucchini yellow mosaic virus (avirulent strain) (L.1.73);

B') Biochemical pesticides with fungicidal, bactericidal, viricidal and/or plant defense activator activity: chitosan (hydrolysate) (L.2.1), harpin protein (L.2.2), laminarin (L.2.3), Menhaden fish oil (L.2.4), natamycin (L.2.5), Plum pox virus coat protein (L.2.6), potassium bicarbonate (L.2.7), *Reynoutria sachlinensis* extract (L.2.8), salicylic acid (L.2.9), potassium or sodium bicarbonate (L.2.10), tea tree oil (L.2.11);

C') Microbial pesticides with insecticidal, acaricidal, molluscidal and/or nematicidal activity: *Agrobacterium radiobacter* K1026 (L.3.1), *A. radiobacter* K84 (L.3.2), *Bacillus firmus* I-1582 (L.3.3); *B. thuringiensis* ssp. *aizawai* strains: ABTS-1857 (L.3.4), SAN 401 I (L.3.5), ABG-6305 (L.3.6) and ABG-6346 (L.3.7); *B. t.* ssp. *israelensis* AM65-52 (L.3.8), *B. t.* ssp. *israelensis* SUM-6218 (L.3.9), *B. t.* ssp. *galleriae* SDS-502 (L.3.10), *B. t.* ssp. *kurstaki* EG 2348 (L.3.11), *B. t.* ssp. *kurstaki* SB4 (L.3.12), *B. t.* ssp. *kurstaki* ABTS-351 (HD-1) (L.3.13), *Beauveria bassiana* ATCC 74040 (L.3.14), *B. bassiana* GHA (L.3.15), *B. bassiana* H123 (L.3.16), *B. bassiana* DSM 12256 (L.3.17), *B. bassiana* PPRI 5339 (L.3.18), *B. brongniartii* (L.3.19), *Burkholderia* sp. A396 (L.3.20), *Chromobacterium subtsugae* PRAA4-1 (L.3.21), *Cydia pomonella* granulosis virus V22 (L.3.22), *Cydia pomonella* granulosis virus V1 (L.3.23), *Cryptophlebia leucotreta* granulovirus (CrleGV) (L.3.57), *Flavobacterium* sp. H492 (L.3.60), *Helicoverpa armigera* nucleopolyhedrovirus (HearNPV) (L.3.58), *Isaria fumosorosea* Apopka-97 (L.3.24), *Lecanicillium longisporum* KV42 (L.3.25), *L. longisporum* KV71 (L.3.26), *L. muscarium* KV01 (L.3.27), *Metarhizium anisopliae* FI-985 (L.3.28), *M. anisopliae* FI-1045 (L.3.29), *M. anisopliae* F52 (L.3.30), *M. anisopliae* ICIPE 69 (L.3.31), *M. anisopliae* var. *acridum* IMI 330189 (L.3.32); *Nomuraea rileyi* strains: SA86101 (L.3.33), GU87401 (L.3.34), SR86151 (L.3.35), CG128 (L.3.36) and VA9101 (L.3.37); *Paecilomyces fumosoroseus* FE 9901 (L.3.38), *P. lilacinus* 251 (L.3.39), *P. lilacinus* DSM 15169 (L.3.40), *P. lilacinus* BCP2 (L.3.41), *Paenibacillus popilliae* Dutky-1940 (NRRL B-2309=ATCC 14706) (L.3.42), *P. popilliae* Dutky 1 (L.3.43), *P. popilliae* KLN 3 (L.3.56), *Pasteuria* sp. Ph3 (L.3.44), *Pasteuria* sp. ATCC PTA-9643 (L.3.45), *Pasteuria* sp. ATCC SD-5832 (L.3.46), *P. nishizawae* Pn1 (L.3.46), *P. penetrans* (L.3.47), *P. ramose* (L.3.48), *P. reneformis* Pr-3 (L.3.49), *P. thornea* (L.3.50), *P. usgae* (L.3.51),

*Pseudomonas fluorescens* CL 145A (L.3.52), *Spodoptera littoralis* nucleopolyhedrovirus (SpliNPV) (L.3.59), *Steinernema carpocapsae* (L.3.53), *S. feltiae* (L.3.54), *S. kraussei* L137 (L.3.55);

D') Biochemical pesticides with insecticidal, acaricidal, molluscidal, pheromone and/or nematicidal activity: L-carvone (L.4.1), citral (L.4.2), (E,Z)-7,9-dodecadien-1-yl acetate (L.4.3), ethyl formate (L.4.4), (E,Z)-2,4-ethyl decadienoate (pear ester) (L.4.5), (Z,Z,E)-7,11,13-hexadecatrienal (L.4.6), heptyl butyrate (L.4.7), isopropyl myristate (L.4.8), cis-jasmone (L.4.9), lavanulyl senecioate (L.4.10), 2-methyl 1-butanol (L.4.11), methyl eugenol (L.4.12), methyl jasmonate (L.4.13), (E,Z)-2,13-octadecadien-1-ol (L.4.14), (E,Z)-2,13-octadecadien-1-ol acetate (L.4.15), (E,Z)-3,13-octadecadien-1-ol (L.4.16), R-1-octen-3-ol (L.4.17), pentatermanone (L.4.18), potassium silicate (L.4.19), sorbitol actanoate (L.4.20), (E,Z,Z)-3,8,11-tetradecatrienyl acetate (L.4.21), (Z,E)-9,12-tetradecadien-1-yl acetate (L.4.22), Z-7-tetradecen-2-one (L.4.23), Z-9-tetradecen-1-yl acetate (L.4.24), Z-11-tetradecenal (L.4.25), Z-11-tetradecen-1-ol (L.4.26), *Acacia negra* extract (L.4.27), extract of grapefruit seeds and pulp (L.4.28), extract of *Chenopodium ambrosiodes* (L.4.29), Catnip oil (L.4.30), Neem oil (L.4.31), Quillay extract (L.4.32), Tagetes oil (L.4.33);

E') Microbial pesticides with plant stress reducing, plant growth regulator, plant growth promoting and/or yield enhancing activity: *Azospirillum amazonense* BR 11140 (SpY2$^T$) (L.5.1), *A. brasilense* strains Ab-V5 and Ab-V6 (L.5.73), *A. brasilense* AZ39 (L.5.2), *A. brasilense* XOH (L.5.3), *A. brasilense* BR 11005 (Sp245) (L.5.4), *A. brasilense* BR 11002 (L.5.5), *A. lipoferum* BR 11646 (Sp31) (L.5.6), *A. irakense* (L.5.7), *A. halopraeferens* (L.5.8), *Bradyrhizobium* sp. PNL01 (L.5.9), *B.* sp. (*Arachis*) CB1015 (L.5.10), *B.* sp. (*Arachis*) USDA 3446 (L.5.11), *B.* sp. (*Arachis*) SEMIA 6144 (L.5.12), *B.* sp. (*Arachis*) SEMIA 6462 (L.5.13), *B.* sp. (*Arachis*) SEMIA 6464 (L.5.14), *B.* sp. (*Vigna*) (L.5.15), *B. elkanii* SEMIA 587 (L.5.16), *B. elkanii* SEMIA 5019 (L.5.17), *B. elkanii* U-1301 (L.5.18), *B. elkanii* U-1302 (L.5.19), *B. elkanii* USDA 74 (L.5.20), *B. elkanii* USDA 76 (L.5.21), *B. elkanii* USDA 94 (L.5.22), *B. elkanii* USDA 3254 (L.5.23), *B. japonicum* 532c (L.5.24), *B. japonicum* CPAC 15 (L.5.25), *B. japonicum* E-109 (L.5.26), *B. japonicum* G49 (L.5.27), *B. japonicum* TA11 (L.5.28), *B. japonicum* USDA 3 (L.5.29), *B. japonicum* USDA 31 (L.5.30), *B. japonicum* USDA 76 (L.5.31), *B. japonicum* USDA 110 (L.5.32), *B. japonicum* USDA 121 (L.5.33), *B. japonicum* USDA 123 (L.5.34), *B. japonicum* USDA 136 (L.5.35), *B. japonicum* SEMIA 566 (L.5.36), *B. japonicum* SEMIA 5079 (L.5.37), *B. japonicum* SEMIA 5080 (L.5.38), *B. japonicum* WB74 (L.5.39), *B. liaoningense* (L.5.40), *B. lupini* LL13 (L.5.41), *B. lupini* WU425 (L.5.42), *B. lupini* WSM471 (L.5.43), *B. lupini* WSM4024 (L.5.44), *Glomus intraradices* RTI-801 (L.5.45), *Mesorhizobium* sp. WSM1271 (L.5.46), *M.* sp. WSM1497 (L.5.47), *M. ciceri* CC1192 (L.5.48), *M. huakii* (L.5.49), *M. loti* CC829 (L.5.50), *M. loti* SU343 (L.5.51), *Paenibacillus alvei* NAS6G6 (L.5.52), *Penicillium bilaiae* ATCC 22348 (L.5.53), *Rhizobium leguminosarum* bv. *phaseoli* RG-B10 (L.5.54), *R. l.* bv. *trifolii* RP113-7 (L.5.55), *R. l.* bv. *trifolii* 095 (L.5.63), *R. l.* bv. *trifolii* TA1 (L.5.64), *R. l.* bv. *trifolii* CC283b (L.5.65), *R. l.* bv. *trifolii* CC275e (L.5.66), *R. l.* bv. *trifolii* CB782 (L.5.67), *R. l.* bv. *trifolii* CC1099 (L.5.68), *R. l.* bv. *trifolii* WSM1325 (L.5.69), *R. l.* bv. *viciae* SU303 (L.5.56), *R. l.* bv. *viciae* WSM1455 (L.5.57), *R. l.* bv. *viciae* P1NP3Cst (L.5.58), *R. l.* bv. *viciae* RG-P2 (L.5.70), *R. tropici* SEMIA 4080 (L.5.59), *R. tropici* SEMIA 4077 (L.5.71), *R. tropici* CC511 (L.5.72), *Sinorhizobium meliloti* MSDJ0848 (L.5.60), *S. meliloti* NRG185 (L.5.61), *S. meliloti* RRI128 (L.5.62);

F') Biochemical pesticides with plant stress reducing, plant growth regulator and/or plant yield enhancing activity: abscisic acid (L.6.1), aluminium silicate (kaolin) (L.6.2), 3-decen-2-one (L.6.3), formononectin (L.6.4), genistein (L.6.5), hesperetin (L.6.6), homobrassinolide (L.6.7), humates (L.6.8), methyl jasmonate (L.6.9), cis-jasmone (L.6.10), lysophosphatidyl ethanlamine (L.6.11), naringenin (L.6.12), polymeric polyhydroxy acid (L.6.13), salicylic acid (L.6.14), *Ascophyllum nodosum* (Norwegian kelp, Brown kelp) extract (L.6.15) and *Ecklonia maxima* (kelp) extract (L.6.16).

According to another embodiment of the inventive mixtures, the at least one biopesticide II is selected from the groups A') to F') as follows:

A') Microbial pesticides with fungicidal, bactericidal, viricidal and/or plant defense activator activity: *Ampelomyces quisqualis* M-10, *Aspergillus flavus* NRRL Accession No. 21882, *Aureobasidium pullulans* DSM 14940, *A. pullulans* DSM 14941, *Bacillus amyloliquefaciens* AP-136 (NRRL B-50614), *B. amyloliquefaciens* AP-188 (NRRL B-50615), *B. amyloliquefaciens* AP-218 (NRRL B-50618), *B. amyloliquefaciens* AP-219 (NRRL B-50619), *B. amyloliquefaciens* AP-295 (NRRL B-50620), *B. amyloliquefaciens* IT-45 (CNCM I-3800, NCBI 1091041), *B. mojavensis* AP-209 (No. NRRL B-50616), *B. pumilus* INR-7 (otherwise referred to as BU-F22 (NRRL B-50153) and BU-F33 (NRRL B-50185)), *B. pumilus* KFP9F, *B. pumilus* QST 2808 (NRRL B-30087), *B. pumilus* GHA 181, *B. simplex* ABU 288 (NRRL B-50340), *B. solisalsi* AP-217 (NRRL B-50617), *B. subtilis* CX-9060, *B. subtilis* GB03, *B. subtilis* GB07, *B. subtilis* QST-713 (NRRL B-21661), *B. subtilis* MBI600 (NRRL B-50595), *B. subtilis* var. *amyloliquefaciens* FZB23, *B. subtilis* var. *amyloliquefaciens* D747, *Candida oleophila* I-82, *C. oleophila* O, *C. saitoana*, *Clavibacter michiganensis* (bacteriophages), *Coniothyrium minitans* CON/M/91-08, *Cryphonectria parasitica*, *Cryptococcus albidus*, *Fusarium oxysporum*, *Clonostachys rosea* f. *catenulata* J1446 (also named *Gliocladium catenulatum*), *Gliocladium roseum* 321U, *Metschnikowia fructicola*, *Microdochium dimerum*, *Paenibacillus polymyxa* PKB1 (ATCC No. 202127), *Pantoea agglomerans* c91, *Phlebiopsis gigantea*, *Pseudozyma flocculosa*, *Pythium oligandrum* DV74, *Sphaerodes mycoparasitica* IDAC 301008-01, *Streptomyces lydicus* WYEC 108, *S. violaceusniger* XL-2, *S. violaceusniger* YCED-9, *Talaromyces flavus* V117b, *Trichoderma asperellum* T34, *T. asperellum* SKT-1, *T. atroviride* LC52, *T. fertile* JM41R, *T. gamsii*, *T. harmatum* TH 382, *T. harzianum* TH-35, *T. harzianum* T-22, *T. harzianum* T-39; mixture of *T. harzianum* ICC012 and *T. viride* ICC080; mixture of *T. polysporum* and *T. harzianum*; *T. stromaticum*, *T. virens* (also named *Gliocladium virens*) GL-21, *T. virens* G41, *T. viride* TV1, *Typhula phacorrhiza* 94671, *Ulocladium oudema*, *U. oudemansii* HRU3, *Verticillium dahlia*, zucchini yellow mosaic virus (avirulent strain);

B') Biochemical pesticides with fungicidal, bactericidal, viricidal and/or plant defense activator activity: chitosan (hydrolysate), laminarin, Menhaden fish oil, natamycin, Plum pox virus coat protein, *Reynoutria sachlinensis* extract, salicylic acid, tea tree oil;

C') Microbial pesticides with insecticidal, acaricidal, molluscidal and/or nematicidal activity: *Bacillus firmus* St 1582, *B. thuringiensis* ssp. *israelensis* SUM-6218, *B. t.* ssp. *galleriae* SDS-502, *B. t.* ssp. *kurstaki*, *Beauveria bassiana* GHA, *B. bassiana* H123, *B. bassiana* DSM 12256, *B. bassiana* PRPI 5339, *Burkholderia* sp. A396, *Chromobacterium subtsugae* PRAA4-1T, *Cydia pomonella* granulosis virus isolate V22, *Isaria fumosorosea* Apopka-97, *Lecanicillium longisporum* KV42, *L. longisporum* KV71, *L. muscarium* (for-merly *Verticillium lecanii*), *Metarhizium anisopliae* FI-985, *M. anisopliae* FI-1045, *M. anisopliae* F52, *M. anisopliae* ICIPE 69, *M. anisopliae* var. *acridum* IMI 330189, *Paecilomyces fumosoroseus* FE 9901, *P. lilacinus* DSM 15169, *P. lilacinus* BCP2, *Paenibacillus poppiliae* Dutky-1940 (NRRL B-2309=ATCC 14706), *P. poppiliae* KLN 3, *P. poppiliae* Dutky 1, *Pasteuria* spp. Ph3, *P. nishizawae* PN-1, *P. reneformis* Pr-3, *P. usagae*, *Pseudomonas fluorescens* CL 145A, *Steinernema feltiae*, *Streptomces galbus*;

D') Biochemical pesticides with insecticidal, acaricidal, molluscidal, pheromone and/or nematicidal activity: L-carvone, citral, (E,Z)-7,9-dodecadien-1-ylacetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, 2-methyl 1-butanol, methyl eugenol, methyl jasmonate, (E,Z)-2,13-octadecadien-1-ol, (E,Z)-2,13-octadecadien-1-ol acetate, (E,Z)-3,13-octadecadien-1-ol, R-1-octen-3-ol, pentatermanone, potassium silicate, sorbitol actanoate, (E,Z,Z)-3,8,11-tetradecatrienyl acetate, (Z,E)-9,12-tetradecadien-1-yl acetate, Z-7-tetradecen-2-one, Z-9-tetradecen-1-ylacetate, Z-11-tetradecenal, Z-11-tetradecen-1-ol, extract of grapefruit seeds and pulp, extract of *Chenopodium ambrosiodae*, Catnip oil, Neem oil, Tagetes oil;

E') Microbial pesticides with plant stress reducing, plant growth regulator, plant growth promoting and/or yield enhancing activity: *Azospirillum amazonense* BR 11140 (SpY2T), *A. brasilense* XOH, *A. brasilense* BR 11005 (Sp245), *A. brasilense* BR 11002, *A. lipoferum* BR 11646 (Sp31), *A. irakense*, *A. halopraeferens*, *Bradyrhizobium* sp. (*Vigna*), *B. japonicum* USDA 3, *B. japonicum* USDA 31, *B. japonicum* USDA 76, *B. japonicum* USDA 110, *B. japonicum* USDA 121, *Glomus intraradices* RTI-801, *Paenibacillus alvei* NAS6G6, *Penicillium bilaiae*, *Rhizobium leguminosarum* bv. *phaseolii*, *R. l. trifolii*, *R. l.* bv. *viciae*, *Sinorhizobium meliloti*;

F') Biochemical pesticides with plant stress reducing, plant growth regulator and/or plant yield enhancing activity: abscisic acid, aluminium silicate (kaolin), 3-decen-2-one, homobrassinolide, humates, indole-3-acetic acid, lysophosphatidyl ethanlamine, polymeric polyhydroxy acid, salicylic acid, *Ascophyllum nodosum* (Norwegian kelp, Brown kelp) extract and *Ecklonia maxima* (kelp) extract.

The present invention furthermore relates to agrochemical compositions comprising a mixture of *B. subtilis* FB17 and at least one fungicidal biopesticide selected from the groups A') and B'), as described above, and if desired at least one suitable auxiliary.

Preference is also given to mixtures comprising as biopesticide II (component 2) a biopesticide from group A'), preferably selected from *Bacillus amyloliquefaciens* AP-136 (NRRL B-50614 and B-50330), *B. amyloliquefaciens* AP-188 (NRRL B-50615 and B-50331), *B. amyloliquefaciens* AP-218 (NRRL B-50618), *B. amyloliquefaciens* AP-219 (NRRL B-50619 and B-50332), *B. amyloliquefaciens* AP-295 (NRRL B-50620 and B-50333), *B. amyloliquefaciens* IT-45 (CNCM I-3800), *B. amyloliquefaciens* ssp. *plantarum* MBI600 (NRRL B-50595), *B. mojavensis* AP-209 (NRRL B-50616), *B. pumilus* INR-7 (NRRL B-50153; NRRL B-50185), *B. pumilus* KFP9F, *B. pumilus* QST 2808 (NRRL B-30087), *B. pumilus* GHA 180, *B. simplex* ABU 288 (NRRL B-50340), *B. solisalsi* AP-217 (NRRL B-50617), *B. subtilis* CX-9060, *B. subtilis* FB17, *B. subtilis* GB03, *B. subtilis* GB07, *B. subtilis* QST-713 (NRRL B-21661), *B. subtilis* var. *amyloliquefaciens* FZB24, *B. subtilis* var. *amyloliquefaciens* D747, *Paenibacillus alvei* NAS6G6, *Paenibacillus polymyxa* PKB1 (ATCC 202127), *Sphaerodes mycoparasitica* IDAC 301008-01 and *Trichoderma fertile* JM41R; even more preferably from *Bacillus amyloliquefaciens* AP-136 (NRRL B-50614), *B. amyloliquefaciens* AP-188 (NRRL B-50615), *B. amyloliquefaciens* AP-218 (NRRL B-50618), *B. amyloliquefaciens* AP-219 (NRRL B-50619), *B. amyloliquefaciens* AP-295 (NRRL B-50620), *B. amyloliquefaciens* IT-45 (CNCM I-3800), *B. amyloliquefaciens* ssp. *plantarum* MBI600 (NRRL B-50595), *B. mojavensis* AP-209 (NRRL B-50616), *B. pumilus* INR-7 (NRRL B-50153; NRRL B-50185), *B. pumilus* QST 2808 (NRRL B-30087), *B. simplex* ABU 288 (NRRL B-50340), *B. subtilis* FB17, *B. subtilis* QST-713 (NRRL B-21661), *Paenibacillus alvei* NAS6G6, *Sphaerodes mycoparasitica* IDAC 301008-01 and *Trichoderma fertile* JM41R.

According to one embodiment of the inventive mixtures, the at least one biopesticide II is selected from *Bacillus amyloliquefaciens* AP-136, *B. amyloliquefaciens* AP-188, *B. amyloliquefaciens* AP-218, *B. amyloliquefaciens* AP-219, *B. amyloliquefaciens* AP-295, *B. amyloliquefaciens* FZB42, *B. amyloliquefaciens* IN937a, *B. amyloliquefaciens* IT-45, *B. amyloliquefaciens* ssp. *plantarum* MBI600, *B. mojavensis* AP-209, *B. pumilus* GB34, *B. pumilus* INR-7, *B. pumilus* KFP9F, *B. pumilus* QST 2808, *B. pumilus* GHA 180, *B. simplex* ABU 288, *B. solisalsi* AP-217, *B. subtilis* CX-9060, *B. subtilis* FB17, *B. subtilis* GB03, *B. subtilis* GB07, *B. subtilis* QST-713, *B. subtilis* var. *amyloliquefaciens* FZB24, *B. subtilis* var. *amyloliquefaciens* TJ1000 and *B. subtilis* var. *amyloliquefaciens* D747. These mixtures are particularly suitable in soybean and corn, in particular for seed treatment.

According to a further embodiment, the at least one biopesticide II is selected from *Streptomyces* spp., preferably from *S. griseoviridis*, *S. lydicus* and *S. violaceusniger*, in particular from strains *S. griseoviridis* K61, *S. lydicus* WYEC 108, *S. violaceusniger* XL-2 and *S. violaceusniger* YCED-9.

According to a further embodiment, the at least one biopesticide II is *Sphaerodes mycoparasitica*, preferably *S. mycoparasitica* IDAC 301008-01 (also referred to as strain SMCD2220-01). These mixtures are particularly suitable in soybean, cereals and corn, in particular corn especially to combat *Fusarium* head blight.

According to one embodiment of the inventive mixtures, the at least one biopesticide II is selected from *Coniothyrium minitans* CON/M/91-08 (DSM 9660), *Trichoderma fertile* JM41R (NRRL 50759), *T. harzianum* T-22 (ATCC20847), *T. virens* GI-3 (ATCC 58678), *T. virens* G-41 (ATCC 20906). These mixtures are particularly suitable for seed and/or soil treatment.

The present invention also relates to mixtures wherein the at least one biopesticide II is selected from the following yests and fungi: *Ampelomyces quisqualis*, in particular strain AQ 10; *Aureobasidium pullulans*, in particular blastospores of strain DSM14940 or blastospores of strain DSM 14941 or mixtures thereof; *Candida oleophila*, in particular strains I-182 and O; *Coniothyrium minitans*, in particular strain CON/M/91-8; *Dilophosphora alopecuri* which reduces annual ryegrass toxicity (ARGT), a disease of livestock resulting from the ingestion of annual ryegrass seed-heads that have been infected by the toxin producing bacterium *Rathayibacter toxicus*; *Gliocladium catenulatum*, in particular strain J 1446; *Metschnikovia fructicola*, in particular strain NRRL Y-30752, *Microsphaeropsis ochracea*, in particular strain P130A for control of apple scab; *Muscodor albus*, in particular strain QST 20799, *Pichia anomala*, in particular strain WRL-076, *Pseudozyma flocculosa*, in particular strain PF-A22 UL; *Pythium oligandrum*, in particular strain DV74.

The present invention also relates to mixtures wherein the at least one biopesticide II is selected from the fungal genus *Trichoderma*, preferably from the strains *T. asperellum* T34, *T. asperellum* SKT-1, *T. asperellum* ICC 012, *T. atroviride* LC52, *T. atroviride* CNCM I-1237, *T. fertile* JM41R, *T. gamsii* ICC 080, *T. harmatum* TH 382, *T. harzianum* TH-35, *T. harzianum* T-22, *T. harzianum* T-39; mixture of *T. harzianum* ICC012 and *T. viride* ICC080; mixture of *T. polysporum* and *T. harzianum*; *T. stromaticum*, *T. virens* GL-21, *T. virens* G41 and *T. viride* TV1; in particular *T. fertile* JM41R.

The present invention also relates to mixtures wherein the at least one biopesticide II is selected from the fungal genus *Ulocladium*, in particular *U. oudemansii* HRU3.

According to a further embodiment, the mixture comprise as component 2) a biopesticide from group B'), preferably selected from chitosan (hydrolysate), methyl-jasmonate, cis-jasmone, laminarin, *Reynoutria sachlinensis* extract and tea tree oil.

According to a further embodiment, the mixture comprise as component 2) a biopesticide from group C'), preferably selected from *Agrobacterium radiobacter* K1026, *Bacillus firmus* I-1582, *Bacillus thuringiensis* ssp. *kurstaki* SB4, *Beauveria bassiana* GHA, *B. bassiana* H123, *B. bassiana* DSM 12256, *B. bassiana* PPRI 5339, *Metarhizium anisopliae* var. *acridum* IMI 330189, *M. anisopliae* FI-985, *M. anisopliae* FI-1045, *M. anisopliae* F52, *M. anisopliae* ICIPE 69, *Paecilomyces lilacinus* DSM 15169, *P. lilacinus* BCP2, *Paenibacillus popilliae* Dutky-1940 (NRRL B-2309=ATCC 14706), *P. popilliae* KLN 3 and *P. popilliae* Dutky 1; even more preferably from *Bacillus thuringiensis* ssp. *kurstaki* SB4, *B. bassiana* DSM 12256, *B. bassiana* PPRI 5339, *Metarhizium anisopliae* var. *acridum* IMI 330189, *M. anisopliae* FI-985, *M. anisopliae* FI-1045, *Paecilomyces lilacinus* DSM 15169, *P. lilacinus* BCP2, *Paenibacillus popilliae* Dutky-1940, *P. popilliae* KLN 3 and *P. popilliae* Dutky 1.

According to a further embodiment, the at least one biopesticide II is *Beauveria bassiana*, preferably selected from *B. bassiana* ATCC 74040, *B. bassiana* GHA, *B. bassiana* H123, *B. bassiana* DSM 12256 and *B. bassiana* PPRI 5339, in particular *B. bassiana* PPRI 5339. These mixtures are particularly suitable for wide range of arthropod pests, such as white flies, *Thrips*, mites, aphids, tingids and all their developmental stages (eggs, immature stages, and adults) infesting numerous crops (vegetables, cucurbits, solanaceous fruits, strawberry, flowers and ornamentals, grapevine, citrus, pome, stone fruits, etc.). Recent studies have shown that these antagonistic fungal strains can effectively control also nut-weevils, wireworms (*Agriotes* spp.), and Tephritid flies, such as the Mediterranean fruit fly, *Ceratitis capitata*, the cherry fruit fly, *Rhagoletis cerasi*, and the olive fly, *Bactrocera oleae*. They are also useful in soybean and corn.

According to a further embodiment, the at least one biopesticide II is *Beauveria brongniartii*.

According to a further embodiment, the at least one biopesticide II is *Metarhizium anisopliae* or *M. anisopliae* var. *acridium*, preferably selected from *M. anisopliae* FI-1045, *M. anisopliae* F52, *M. anisopliae* var. *acridum* strains FI-985 and IMI 330189; in particular strain IMI 330189. These mixtures are particularly suitable for control of arthropod pests in soybean and corn.

According to a further embodiment, the at least one biopesticide II is *Lecanicillium* sp., preferably selected from *Lecanicillium longisporum* KV42, *L. longisporum* KV71 and *L. muscarium* KV01.

According to a further embodiment, the at least one biopesticide II is *Paecilomyces fumosoroseus*, preferably strain FE 9901 especially for white fly control.

According to a further embodiment, the at least one biopesticide II is selected from *Nomuraea rileyi*, preferably strains SA86101, GU87401, SR86151, CG128 and VA9101; and *P. lilacinus*, preferably strains 251, DSM 15169 or BCP2, in particular BCP2, which strains especially control the growth of plant-pathogenic nematodes.

According to a further embodiment, the at least one biopesticide II is *Bacillus firmus*, preferably spores of strain CNCM I-1582, preferably useful for seed treatment of soybean and corn against nematodes and insects.

According to a further embodiment, the at least one biopesticide II is *Bacillus cereus*, preferably spores of CNCM I-1562, preferably useful for seed treatment of soybean and corn against nematodes and insects.

According to a further embodiment, the at least one biopesticide II is a mixture of spores of *B. firmus* and *B. cereus*, preferably mixtures spores of above mentioned strains CNCM I-1582 and CNCM I-1562, preferably useful for seed treatment of soybean and corn against nematodes and insects.

According to a further embodiment, the at least one biopesticide II is selected from *Bacillus thuringiensis*, preferably *B. thuringiensis* ssp. *aizawai*, even more preferably selected from *B. t.* ssp. *aizawai* strains ABTS-18, SAN 401 I, ABG-6305 and ABG-6346, which are effective against different lepidopteran species including also noctuidae.

According to a further embodiment, the at least one biopesticide II is selected from *Bacillus t.* ssp. *israelensis*, preferably AM65-52, SAN 402 I and ABG-6164, which are applied against larvae of various dipteran pests, e. g. mosquitoes and nematoceres.

According to a further embodiment, the at least one biopesticide II is selected from *Bacillus t.* ssp. *kurstaki* preferably from strains EG 2348, SB4 and ABTS-351 (HD-1), in particular *B. t.* ssp. *kurstaki* SB4. These strains are used for control of lepidopteran larvae, but without noctuidae.

According to a further embodiment, the at least one biopesticide II is selected from *Bacillus t.* ssp. *tenebrionis*, preferably the strains DSM 2803, NB-125 and NB-176, in particular NB-176, which all protect plants e. g. against leaf beetle larvae.

According to one embodiment of the inventive mixtures, the at least one biopesticide II is selected from *Bacillus firmus* CNCM I-1582, *Paecilomyces lilcinus* 251, *Pasteuria nishizawa* Pn1 and *Burkholderia* sp. A396 having nematicidal, acaricidal and/or insecticidal activity. These mixtures are particularly suitable in soybean and corn, in particular for seed treatment.

According to a further embodiment, the mixture comprise as component 2) a biopesticide from group D'), preferably selected from methyl jasmonate, *Acacia negra* extract, extract of grapefruit seeds and pulp, Catnip oil, Neem oil, Quillay extract and Tagetes oil, in particular methyl jasmonate or water-based Quillay extract.

According to a further embodiment, the mixture comprise as component 2) a biopesticide from group E'), preferably selected from *Azospirillum amazonense* BR 11140 (SpY2$^T$), *A. brasilense* XOH, *A. brasilense* BR 11005 (Sp245), *A. brasilense* BR 11002, *A. lipoferum* BR 11646 (Sp31), *A. irakense, A. halopraeferens, Bradyrhizobium* sp. (*Vigna*), *B. japonicum* USDA 3, *B. japonicum* USDA 31, *B. japonicum* USDA 76, *B. japonicum* USDA 110, *B. japonicum* USDA 121, *B. japonicum* TA-11, *B. japonicum* 532c, *Glomus intraradices* RTI-801, *Paenibacillus alvei* NAS6G6, *Penicillium bilaiae*, more preferably selected from *P. bilaiae* strain ATCC 18309, ATCC 20851 and ATCC 22348, *Rhizobium leguminosarum* bv. *phaseoli; R. l.* bv. *trifolii, R. l.* bv. *viciae*, and *Sinorhizobium meliloti*, more preferably selected from *Azospirillum brasilense* BR 11005 (Sp245), *Bradyrhizobium* sp. (*Vigna*), *B. japonicum* USDA 3, *B. japonicum* USDA 31, *B. japonicum* USDA 76, *B. japonicum* USDA 110, *B. japonicum* USDA 121, *B. japonicum* TA-11, *B. japonicum* 532c, *Rhizobium leguminosarum* bv. *phaseoli* RG-B10, *R. l.* bv. *trifolii* RP113-7, *R. l.* bv. *viciae* P1NP3Cst, *R. l.* bv. *viciae* SU303, *R. l.* bv. *viciae* WSM1455, *R. tropici* SEMIA 4077, *R. tropici* SEMIA 4080 and *Sinorhizobium meliloti*.

The present invention also relates to mixtures wherein the at least one biopesticide II is selected from *Rhizobium leguminosarum* bv. *phaseoli*, especially strain RG-B10 thereof; *R. l.* bv. *trifolii*, especially strain RP113-7 thereof, *R. l.* bv. *viciae*, in particular strains SU303, WSM1455 and P1NP3Cst thereof; *R. tropici*; especially strains CC511, SEMIA 4077 and SEMIA 4080 thereof; and *Sinorhizobium meliloti*; especially strain MSDJ0848 thereof.

According to a further embodiment, in the inventive mixtures biopesticide II is selected from *Sinorhizobium meliloti* MSDJ0848, *S. meliloti* NRG185, *S. meliloti* RRI128, *S. meliloti* SU277, *Rhizobium leguminosarum* bv. *phaseoli* RG-B10, *R. leguminosarum* bv. *viciae* P1NP3Cst, *R. l.* bv. *viciae* RG-P2, *R. l.* bv. *viciae* SU303, *R. l.* bv. *viciae* WSM1455, *R. leguminosarum* bv. *trifolii* RP113-7, *R. l.* bv. *trifolii* 095, *R. l.* bv. *trifolii* TA1, *R. l.* bv. *trifolii* CC283b, *R. l.* bv. *trifolii* CB782, *R. l.* bv. *trifolii* CC1099, *R. l.* bv. *trifolii* CC275e, *R. l.* bv. *trifolii* WSM1325, *R. tropici* CC511, *R. tropici* SEMIA 4077, and *R. tropici* SEMIA 4080.

*Sinorhizobium meliloti* is commercially available from BASF Corp., USA, as product Dormal® Alfalfa & Luzerne. *Rhizobium leguminosarum* bv. *phaseoli* is commercially available from BASF Corp., USA, as product RhizoStick. These strains are particularly suitable as inoculants for various legumes such as alfalfa, clover, peas, beans, lentils, soybeans, peanuts and others.

*Rhizobium leguminosarum* bv. *phaseoli*, also called *R. phaseoli* and recently the type I isolates being re-classified as *R. etli*, is commercially available from BASF Corp., USA, as product RhizoStick for dry beans. Particularly suitable strains especially for the legume common bean (*Phaseolus vulgaris*), but also for other crops such as corn and lettuce, are as follows: *R. leguminosarum* bv. *phaseoli* RG-B10 (identical to strain USDA 9041) is commercially available as NODULATOR Dry Bean in Africa, HiStick NT Dry bean in US, and NOUDLATOR Dry Bean in Canada from BASF Corp., USA, or BASF Agricultural Specialties Ltd., Canada, and is known from Int. J. Syst. Bacteriol. 46(1), 240-244, 1996; Int. J. Syst. Evol. Microbiol. 50, 159-170, 2000.

Further *R. l.* bv. *phaseoli* or *R. etli* strains are e. g. known from the above mentioned references and Appl. Environ. Microbiol. 45(3), 737-742, 1983; ibida 54(5), 1280-1283, 1988.

*R. l.* bv. *viciae* P1NP3Cst (also referred to as 1435) is known from New Phytol. 179(1), 224-235, 2008; and e. g. in NODULATOR PL Peat Granule from BASF Corp., USA; or in NODULATOR XL PL from BASF Agricultural Specialties Ltd., Canada). *R. l.* bv. *viciae* RG-P2 (also called P2) is commercially available as inoculant for pean and lentils as RhizUP peat in Canada from BASF Agricultural Specialties Ltd., Canada. *R. l.* bv. *viciae* WSM1455 is commercially available NODULAID for faba beans peat from BASF Agricultural Specialties Pty Ltd, Australia. *R. l.* bv. *viciae* SU303 is commercially available as NODULAID Group E, NODULAID NT peat or NODULATOR granules for peas from BASF Agricultural Specialties Pty Ltd, Australia. *R. l.* bv. *viciae* WSM1455 is commercially available as NODULAID Group F peat, NODULAID NT and NODULATOR granules for faba bean from BASF Agricultural Specialties Pty Ltd, Australia, and is also as inoculant for faba beans as NODULATOR SA faba bean in Canada or as Faba Sterile Peat in Europe or as NODULATOR faba bean granules in Canada from BASF Agricultural Specialties Ltd., Canada.

*Rhizobium leguminosarum* bv. *trifolii* is commercially available from BASF Corp., USA, as product Nodulator or DORMAL true clover. Suitable strains are especially useful for all kind of clovers, are as follows: *R. l.* bv. *trifolii* strains RP113-7 (also called 113-7) and 095 commercially available from BASF Corp., USA; see also Appl. Environ. Microbiol. 44(5), 1096-1101. Suitable strain *R. l.* bv. *trifolii* TA1 obtained from Australia is known from Appl. Environ. Microbiol. 49(1), 127-131, 1985 and commercially available as NODULAID peat for white clover from BASF Agricultural Specialties Pty Ltd, Australia. *R. l.* bv. *trifolii* CC283b is commercially available as NODULAID peat for Caucasian clover from BASF Agricultural Specialties Pty Ltd, Australia. *R. l.* bv. *trifolii* CC1099 is commercially available as NODULAID peat for sainfoin from BASF Agricultural Specialties Pty Ltd, Australia. *R. l.* bv. *trifolii* CC275e is commercially available as NODULAID peat for NZ white clover from BASF Agricultural Specialties Pty Ltd, Australia. *R. l.* bv. *trifolii* CB782 is commercially available as NODULAID peat for Kenya white clover from BASF Agricultural Specialties Pty Ltd, Australia. *R. l.* bv. *trifolii* strain WSM1325 has been collected in 1993 from the Greek Island of Serifos, is commercially available in NODULAID peat for sub clover and NODULATOR granules for sub clover both from BASF Agricultural Specialties Pty Ltd, Australia, for a broad range of annual clovers of Mediterranean origin, and is known from Stand. Genomic Sci. 2(3), 347-356, 2010. *R. l.* bv. *trifolii* strain WSM2304 has been isolated from *Trifolium polymorphum* in Uruguay in 1998 and is known from Stand. Genomic Sci. 2(1), 66-76, 2010, and is particularly suitable to nodulate its clover host in Uruguay.

*R. tropici* is useful for a range of legume crops especially in tropical regions such as Brazil. Suitable strains are especially useful for all kind of clovers, are as follows: *R. tropici* strain SEMIA 4080 (identical to PRF 81; known from Soil Biology & Biochemistry 39, 867-876, 2007; BMC Microbiol. 12, 84, 2012) is commercially available in NITRAFIX FEIJÃO peat for beans from BASF Agricultural Specialties Ltd., Brazil, and has been used as commercial inoculant for applications to common bean crops in Brazil since 1998, and is deposited with FEPAGRO-Fundação Estadual de Pesquisa Agropecuária, Rua Gonçalves Dias, 570, Bairro Menino Deus, Porto Alegre/RS, Brazil. *R. tropici* is useful for a range of legume crops especially in tropical regions such as Brazil. Suitable strains are especially useful for all kind of clovers, are as follows: *R. tropici* strain SEMIA 4077 (identical to CIAT899; Rev. Ciênc. Agron. 44(4) Fortaleza October/December 2013) is commercially available in NITRAFIX FEIJÃO peat for beans from BASF Agricultural Specialties Ltd., Brazil. *R. tropici* strain CC511 is commercially available as NODULAID peat for common bean from BASF Agricultural Specialties Pty Ltd, Australia, and is known from Agronomy, N.Z. 36, 4-35, 2006.

The present invention also relates to mixtures wherein the at least one biopesticide II is selected from *R. leguminosarum* bv. *phaseoli*, *R. l.* bv. *trifolii*, *R. l.* bv. *viciae*, *R. tropici* and *Sinorhizobium meliloti*, and further comprises a compound III, wherein compound III is selected from jasmonic acid or salts or derivatives thereof including cis-jasmone, preferably methyl-jasmonate or cis-jasmone.

According to a further embodiment, the at least one biopesticide II is selected from *Delftia acidovorans*, in particular strain RAY209, especially in soybean and canola.

According to a further embodiment, the at least one biopesticide II is selected from *Lysobacter* spp., preferably selected from *L. antibioticus*, in particular strains 13-1 and HS124, preferably in rice or pepper for control of *Phytophthora* or bacterial leaf blight. According to a further embodiment, the at least one biopesticide II is selected from *L. enzymogenes*, in particular strain 3.1T8.

According to a further embodiment, the at least one biopesticide II is selected from *Pseudomonas* spp., preferably selected from *P. chloraphis* MA 342 and *Pseudomonas* sp. DSM 13134.

According to a further embodiment, the at least one biopesticide II is selected from *Penicillium bilaiae*, more preferably from strains ATCC 18309, ATCC 20851 and ATCC 22348, in particular strain ATCC 22348 (Mycopathologia 127, 19-27, 1994).

According to a further embodiment, the mixture comprise as component 2) a biopesticide from group F'), preferably selected from abscisic acid, aluminium silicate (kaolin), humates, indole-3-acetic acid, *Ascophyllum nodosum* (Norwegian kelp, Brown kelp) extract and *Ecklonia maxima* (kelp) extract.

Preference is also given to mixtures comprising as biopesticide II a biopesticide selected from the isoflavones formonennitin, hesperetin and naringenin.

According to a further embodiment, the mixture comprise as component 2) a biopesticide II selected from *Azospirillum brasilense* Ab-V5, *A. brasilense* Ab-V6, *Bacillus firmus* CNCM I-1582, *B. pumilus* GHA 180 (IDAC 260707-01), *B. subtilis* ssp. *amyloliquefaciens* D747 (FERM BP-8234), *B. subtilis* ssp. *amyloliquefaciens* TJ1000 (ATCC BAA-390), *Burkholderia* sp. A396 (NRRL B-50319), *Coniothyrium minitans* CON/M/91-08 (DSM 9660), *Paecilomyces lilacinus* 251 (AGAL 89/030550), *Pasteuria nishizawa* Pn1, *Penicillium bilaiae*, *Pseudomonas fluoresciens* A506 (ATCC 31948), *Trichoderma harzianum* T-22 (ATCC 20847) and *T. virens* G-41 (ATCC 20906).

The inventive mixtures comprising as biopesticide II a microbial pesticide from groups A'), C') and E') may be formulated as an inoculant for a plant. The term "inoculant" means a preparation that includes an isolated culture of a microbial pesticide and optionally a carrier, which may include a biologically acceptable medium.

The abovementioned microbial pesticides may be isolated or substantially purified. The terms "isolated" or "substantially purified" refers to microbial pesticides that have been removed from a natural environment and have been isolated or separated, and are at least 60% free, preferably at least 75% free, and more preferably at least 90% free, even more preferably at least 95% free, and most preferably at least 100% free from other components with which they were naturally associated. An "isolated culture" refers to a culture of the microbial pesticides that does not include significant amounts of other materials such as other materials which normally are found in natural habitat in which the microbial pesticides grows and/or from which the microbial pesticides normally may be obtained. An "isolated culture" may be a culture that does not include any other biological, microorganism, and/or bacterial species in quantities sufficient to interfere with the replication of the "isolated culture." Isolated cultures of microbial pesticides may be combined to prepare a mixed culture of microbial pesticides.

Herein, microbial pesticides may be supplied in any physiological state such as active or dormant. Dormant microbial pesticides may be supplied for example frozen, dried, or lyophilized or partly desiccated (procedures to produce these partly desiccated organisms are given in WO2008/002371) or in form of spores.

The mixtures and compositions thereof according to the invention can, in the use form as fungicides and/or insecticides, also be present together with other active substances, e. g. with herbicides, insecticides, growth regulators, fungicides or else with fertilizers, as pre-mix or, if appropriate, not until immediately prior to use (tank mix).

Mixing a water-based *Bacillus subtilis* strain FB17, or a cell-free extract thereof or at least one metabolite thereof, and/or a mutant of *Bacillus subtilis* FB17 having all the identifying characteristics thereof or extract of the mutant, and at least one biopesticide II and the compositions comprising them, respectively, in the use form as fungicide with other fungicides results in many cases in an expansion of the fungicidal spectrum of activity or in a prevention of fungicide resistance development. Furthermore, in many cases, synergistic effects are obtained.

Mixing *Bacillus subtilis* strain FB17, or a cell-free extract thereof or at least one metabolite thereof, and/or a mutant of *Bacillus subtilis* FB17 having all the identifying characteristics thereof or extract of the mutant, and at least one biopesticide II and the compositions comprising them, respectively, in the use form as insecticide with other insecticides results in many cases in an expansion of the insecticidal spectrum of activity or in a prevention of insecticide resistance development. Furthermore, in many cases, synergistic effects are obtained.

Accordingly, the present invention furthermore relates to compositions comprising *B. subtilis* FB17 (component 1) and one biopesticide II (component 2), which biopesticide II is selected from the column "Co. 2" of the lines B-1 to B-276 of Table B. Preferably, the compositions described comprise the active components in synergistically effective amounts.

TABLE B

Compositions comprising as active components *Bacillus subtilis* FB17 (I) (in Column Co. 1) and as component 2) (in Column Co. 2) one biopesticide from groups A') to F') [which is coded e. g. as (L.1.1) for *Ampelomyces quisqualis* M-10 as defined above].

| Mixt. | Co. 1 | Co. 2 |
|---|---|---|
| B-1 | (I) | (L.1.1) |
| B-2 | (I) | (L.1.2) |
| B-3 | (I) | (L.1.3) |
| B-4 | (I) | (L.1.4) |
| B-5 | (I) | (L.1.5) |
| B-6 | (I) | (L.1.6) |
| B-7 | (I) | (L.1.7) |
| B-8 | (I) | (L.1.8) |
| B-9 | (I) | (L.1.9) |
| B-10 | (I) | (L.1.10) |
| B-11 | (I) | (L.1.11) |
| B-12 | (I) | (L.1.12) |
| B-13 | (I) | (L.1.13) |
| B-14 | (I) | (L.1.14) |
| B-15 | (I) | (L.1.15) |
| B-16 | (I) | (L.1.16) |
| B-17 | (I) | (L.1.17) |
| B-18 | (I) | (L.1.18) |
| B-19 | (I) | (L.1.19) |
| B-20 | (I) | (L.1.20) |
| B-21 | (I) | (L.1.21) |
| B-22 | (I) | (L.1.22) |
| B-23 | (I) | (L.1.23) |
| B-24 | (I) | (L.1.24) |
| B-25 | (I) | (L.1.25) |
| B-26 | (I) | (L.1.26) |
| B-27 | (I) | (L.1.27) |
| B-28 | (I) | (L.1.28) |
| B-29 | (I) | (L.1.29) |
| B-30 | (I) | (L.1.30) |
| B-31 | (I) | (L.1.31) |
| B-32 | (I) | (L.1.32) |
| B-33 | (I) | (L.1.33) |
| B-34 | (I) | (L.1.34) |
| B-35 | (I) | (L.1.35) |
| B-36 | (I) | (L.1.36) |
| B-37 | (I) | (L.1.37) |
| B-38 | (I) | (L.1.38) |
| B-39 | (I) | (L.1.39) |
| B-40 | (I) | (L.1.40) |
| B-41 | (I) | (L.1.41) |
| B-42 | (I) | (L.1.42) |
| B-43 | (I) | (L.1.43) |
| B-44 | (I) | (L.1.44) |
| B-45 | (I) | (L.1.45) |
| B-46 | (I) | (L.1.46) |
| B-47 | (I) | (L.1.47) |
| B-48 | (I) | (L.1.48) |
| B-49 | (I) | (L.1.49) |
| B-50 | (I) | (L.1.50) |
| B-51 | (I) | (L.1.51) |
| B-52 | (I) | (L.1.52) |
| B-53 | (I) | (L.1.53) |
| B-54 | (I) | (L.1.54) |
| B-55 | (I) | (L.1.55) |
| B-56 | (I) | (L.1.56) |
| B-57 | (I) | (L.1.57) |
| B-58 | (I) | (L.1.58) |
| B-59 | (I) | (L.1.59) |
| B-60 | (I) | (L.1.60) |
| B-61 | (I) | (L.1.61) |
| B-62 | (I) | (L.1.62) |
| B-63 | (I) | (L.1.63) |
| B-64 | (I) | (L.1.64) |
| B-65 | (I) | (L.1.65) |
| B-66 | (I) | (L.1.66) |
| B-67 | (I) | (L.1.67) |
| B-68 | (I) | (L.1.68) |
| B-69 | (I) | (L.1.69) |
| B-70 | (I) | (L.1.70) |
| B-71 | (I) | (L.1.71) |
| B-72 | (I) | (L.1.72) |
| B-73 | (I) | (L.1.73) |
| B-74 | (I) | (L.1.74) |
| B-75 | (I) | (L.1.75) |
| B-76 | (I) | (L.1.76) |
| B-77 | (I) | (L.1.77) |
| B-78 | (I) | (L.2.1) |
| B-79 | (I) | (L.2.2) |
| B-80 | (I) | (L.2.3) |
| B-81 | (I) | (L.2.4) |
| B-82 | (I) | (L.2.5) |
| B-83 | (I) | (L.2.6) |
| B-84 | (I) | (L.2.7) |
| B-85 | (I) | (L.2.8) |
| B-86 | (I) | (L.2.9) |
| B-87 | (I) | (L.2.10) |
| B-88 | (I) | (L.2.11) |
| B-89 | (I) | (L.3.1) |
| B-90 | (I) | (L.3.2) |
| B-91 | (I) | (L.3.3) |
| B-92 | (I) | (L.3.4) |
| B-93 | (I) | (L.3.5) |
| B-94 | (I) | (L.3.6) |
| B-95 | (I) | (L.3.7) |
| B-96 | (I) | (L.3.8) |
| B-97 | (I) | (L.3.9) |
| B-98 | (I) | (L.3.10) |
| B-99 | (I) | (L.3.11) |
| B-100 | (I) | (L.3.12) |
| B-101 | (I) | (L.3.13) |
| B-102 | (I) | (L.3.14) |
| B-103 | (I) | (L.3.15) |
| B-104 | (I) | (L.3.16) |
| B-105 | (I) | (L.3.17) |
| B-106 | (I) | (L.3.18) |
| B-107 | (I) | (L.3.19) |
| B-108 | (I) | (L.3.20) |
| B-109 | (I) | (L.3.21) |
| B-110 | (I) | (L.3.22) |
| B-111 | (I) | (L.3.23) |
| B-112 | (I) | (L.3.24) |
| B-113 | (I) | (L.3.25) |
| B-114 | (I) | (L.3.26) |
| B-115 | (I) | (L.3.27) |
| B-116 | (I) | (L.3.28) |
| B-117 | (I) | (L.3.29) |
| B-118 | (I) | (L.3.30) |
| B-119 | (I) | (L.3.31) |
| B-120 | (I) | (L.3.32) |
| B-121 | (I) | (L.3.33) |
| B-122 | (I) | (L.3.34) |
| B-123 | (I) | (L.3.35) |
| B-124 | (I) | (L.3.36) |
| B-125 | (I) | (L.3.37) |
| B-126 | (I) | (L.3.38) |
| B-127 | (I) | (L.3.39) |
| B-128 | (I) | (L.3.40) |
| B-129 | (I) | (L.3.41) |
| B-130 | (I) | (L.3.42) |
| B-131 | (I) | (L.3.43) |
| B-132 | (I) | (L.3.44) |
| B-133 | (I) | (L.3.45) |
| B-134 | (I) | (L.3.46) |
| B-135 | (I) | (L.3.47) |
| B-136 | (I) | (L.3.48) |
| B-137 | (I) | (L.3.49) |
| B-138 | (I) | (L.3.50) |
| B-139 | (I) | (L.3.51) |
| B-140 | (I) | (L.3.52) |
| B-141 | (I) | (L.3.53) |
| B-142 | (I) | (L.3.54) |
| B-143 | (I) | (L.3.55) |
| B-144 | (I) | (L.3.56) |
| B-145 | (I) | (L.3.57) |
| B-146 | (I) | (L.3.58) |

TABLE B-continued

Compositions comprising as active components *Bacillus subtilis* FB17 (I) (in Column Co. 1) and as component 2) (in Column Co. 2) one biopesticide from groups A') to F') [which is coded e. g. as (L.1.1) for *Ampelomyces quisqualis* M-10 as defined above].

| Mixt. | Co. 1 | Co. 2 |
|---|---|---|
| B-147 | (I) | (L.3.59) |
| B-148 | (I) | (L.3.60) |
| B-149 | (I) | (L.4.1) |
| B-150 | (I) | (L.4.2) |
| B-151 | (I) | (L.4.3) |
| B-152 | (I) | (L.4.4) |
| B-153 | (I) | (L.4.5) |
| B-154 | (I) | (L.4.6) |
| B-155 | (I) | (L.4.7) |
| B-156 | (I) | (L.4.8) |
| B-157 | (I) | (L.4.9) |
| B-158 | (I) | (L.4.10) |
| B-159 | (I) | (L.4.11) |
| B-160 | (I) | (L.4.12) |
| B-161 | (I) | (L.4.13) |
| B-162 | (I) | (L.4.14) |
| B-163 | (I) | (L.4.15) |
| B-164 | (I) | (L.4.16) |
| B-165 | (I) | (L.4.17) |
| B-166 | (I) | (L.4.18) |
| B-167 | (I) | (L.4.19) |
| B-168 | (I) | (L.4.20) |
| B-169 | (I) | (L.4.21) |
| B-170 | (I) | (L.4.22) |
| B-171 | (I) | (L.4.23) |
| B-172 | (I) | (L.4.24) |
| B-173 | (I) | (L.4.25) |
| B-174 | (I) | (L.4.26) |
| B-175 | (I) | (L.4.27) |
| B-176 | (I) | (L.4.28) |
| B-177 | (I) | (L.4.29) |
| B-178 | (I) | (L.4.30) |
| B-179 | (I) | (L.4.31) |
| B-180 | (I) | (L.4.32) |
| B-181 | (I) | (L.4.33) |
| B-182 | (I) | (L.5.1) |
| B-183 | (I) | (L.5.2) |
| B-184 | (I) | (L.5.3) |
| B-185 | (I) | (L.5.4) |
| B-186 | (I) | (L.5.5) |
| B-187 | (I) | (L.5.6) |
| B-188 | (I) | (L.5.7) |
| B-189 | (I) | (L.5.8) |
| B-190 | (I) | (L.5.9) |
| B-191 | (I) | (L.5.10) |
| B-192 | (I) | (L.5.11) |
| B-193 | (I) | (L.5.12) |
| B-194 | (I) | (L.5.13) |
| B-195 | (I) | (L.5.14) |
| B-196 | (I) | (L.5.15) |
| B-197 | (I) | (L.5.16) |
| B-198 | (I) | (L.5.17) |
| B-199 | (I) | (L.5.18) |
| B-200 | (I) | (L.5.19) |
| B-201 | (I) | (L.5.20) |
| B-202 | (I) | (L.5.21) |
| B-203 | (I) | (L.5.22) |
| B-204 | (I) | (L.5.23) |
| B-205 | (I) | (L.5.24) |
| B-206 | (I) | (L.5.25) |
| B-207 | (I) | (L.5.26) |
| B-208 | (I) | (L.5.27) |
| B-209 | (I) | (L.5.28) |
| B-210 | (I) | (L.5.29) |
| B-211 | (I) | (L.5.30) |
| B-212 | (I) | (L.5.31) |
| B-213 | (I) | (L.5.32) |
| B-214 | (I) | (L.5.33) |
| B-215 | (I) | (L.5.34) |
| B-216 | (I) | (L.5.35) |
| B-217 | (I) | (L.5.36) |
| B-218 | (I) | (L.5.37) |
| B-219 | (I) | (L.5.38) |
| B-220 | (I) | (L.5.39) |
| B-221 | (I) | (L.5.40) |
| B-222 | (I) | (L.5.41) |
| B-223 | (I) | (L.5.42) |
| B-224 | (I) | (L.5.43) |
| B-225 | (I) | (L.5.44) |
| B-226 | (I) | (L.5.45) |
| B-227 | (I) | (L.5.46) |
| B-228 | (I) | (L.5.47) |
| B-229 | (I) | (L.5.48) |
| B-230 | (I) | (L.5.49) |
| B-231 | (I) | (L.5.50) |
| B-232 | (I) | (L.5.51) |
| B-233 | (I) | (L.5.52) |
| B-234 | (I) | (L.5.53) |
| B-235 | (I) | (L.5.54) |
| B-236 | (I) | (L.5.55) |
| B-237 | (I) | (L.5.56) |
| B-238 | (I) | (L.5.57) |
| B-239 | (I) | (L.5.58) |
| B-240 | (I) | (L.5.59) |
| B-241 | (I) | (L.5.60) |
| B-242 | (I) | (L.5.60) |
| B-243 | (I) | (L.5.60) |
| B-244 | (I) | (L.5.60) |
| B-245 | (I) | (L.5.60) |
| B-246 | (I) | (L.5.61) |
| B-247 | (I) | (L.5.62) |
| B-248 | (I) | (L.5.63) |
| B-249 | (I) | (L.5.64) |
| B-250 | (I) | (L.5.65) |
| B-251 | (I) | (L.5.66) |
| B-252 | (I) | (L.5.67) |
| B-253 | (I) | (L.5.67) |
| B-254 | (I) | (L.5.67) |
| B-255 | (I) | (L.5.68) |
| B-256 | (I) | (L.5.69) |
| B-257 | (I) | (L.5.70) |
| B-258 | (I) | (L.5.71) |
| B-259 | (I) | (L.5.72) |
| B-260 | (I) | (L.5.73) |
| B-261 | (I) | (L.6.1) |
| B-262 | (I) | (L.6.2) |
| B-263 | (I) | (L.6.3) |
| B-264 | (I) | (L.6.4) |
| B-265 | (I) | (L.6.5) |
| B-266 | (I) | (L.6.6) |
| B-267 | (I) | (L.6.7) |
| B-268 | (I) | (L.6.8) |
| B-269 | (I) | (L.6.9) |
| B-270 | (I) | (L.6.10) |
| B-271 | (I) | (L.6.11) |
| B-272 | (I) | (L.6.12) |
| B-273 | (I) | (L.6.13) |
| B-274 | (I) | (L.6.14) |
| B-275 | (I) | (L.6.15) |
| B-276 | (I) | (L.6.16) |

According to the present invention, it may be preferred that the mixtures comprise besides *Bacillus subtilis* strain FB17, or a cell-free extract thereof or at least one metabolite thereof, and/or a mutant of *Bacillus subtilis* FB17 having all the identifying characteristics thereof or extract of the mutant, and a biopesticide II and the compositions comprising them as component 3) a further active component (i.e. pesticide), preferably in a synergistically effective amount. Another embodiment relates to mixtures wherein the component 3) is a pesticide III selected from groups A) to O), provided that in the specific mixture the biopesticide selected from group L) is different from the respective biopesticide II.

The following list of pesticides, in conjunction with which the mixtures according to the invention can be used, is intended to illustrate the possible combinations but does not limit them:

A) Respiration inhibitors

Inhibitors of complex III at $Q_o$ site (e. g. strobilurins): azoxystrobin, coumethoxystrobin, coumoxystrobin, dimoxystrobin, enestroburin, fenaminstrobin, fenoxystrobin/flufenoxystrobin, fluoxastrobin, kresoxim-methyl, mandestrobine, metominostrobin, orysastrobin, picoxystrobin, pyraclostrobin, pyrametostrobin, pyraoxystrobin, trifloxystrobin and 2-(2-(3-(2,6-dichlorophenyl)-1-methyl-allylideneaminooxymethyl)-phenyl)-2-methoxyimino-N-methyl-acetamide, pyribencarb, triclopyricarb/chlorodincarb, famoxadone, fenamidone;

inhibitors of complex III at $Q_i$ site: cyazofamid, amisulbrom, [(3S,6S,7R,8R)-8-benzyl-3-[(3-acetoxy-4-methoxy-pyridine-2-carbonyl)amino]-6-methyl-4,9-dioxo-1,5-dioxonan-7-yl] 2-methylpropanoate, [(3S,6S,7R,8R)-8-benzyl-3-[[3-(acetoxymethoxy)-4-methoxy-pyridine-2-carbonyl]amino]-6-methyl-4,9-dioxo-1,5-dioxonan-7-yl] 2-methylpropanoate, [(3S,6S,7R,8R)-8-benzyl-3-[(3-isobutoxycarbonyloxy-4-methoxy-pyridine-2-carbonyl)amino]-6-methyl-4,9-dioxo-1,5-dioxonan-7-yl] 2-methylpropanoate, [(3S,6S,7R,8R)-8-benzyl-3-[[3-(1,3-benzodioxol-5-ylmethoxy)-4-methoxy-pyridine-2-carbonyl]amino]-6-methyl-4,9-dioxo-1,5-dioxonan-7-yl] 2-methylpropanoate; (3S,6S,7R,8R)-3-[[(3-hydroxy-4-methoxy-2-pyridinyl)carbonyl]amino]-6-methyl-4,9-dioxo-8-(phenylmethyl)-1,5-dioxonan-7-yl 2-methylpropanoate inhibitors of complex II (e. g. carboxamides): benodanil, benzovindiflupyr, bixafen, boscalid, carboxin, fenfuram, fluopyram, flutolanil, fluxapyroxad, furametpyr, isofetamid, isopyrazam, mepronil, oxycarboxin, penflufen, penthiopyrad, sedaxane, tecloftalam, thifluzamide, N-(4'-trifluoromethylthiobiphenyl-2-yl)-3-difluoromethyl-1-methyl-1H-pyrazole-4-carboxamide, N-(2-(1,3,3-trimethyl-butyl)-phenyl)-1,3-dimethyl-5-fluoro-1H-pyrazole-4-carboxamide, 3-(difluoromethyl)-1-methyl-N-(1,1,3-trimethylindan-4-yl)pyrazole-4-carboxamide, 3-(trifluoromethyl)-1-methyl-N-(1,1,3-trimethylindan-4-yl)pyrazole-4-carboxamide, 1,3-dimethyl-N-(1,1,3-trimethylindan-4-yl)pyrazole-4-carboxamide, 3-(trifluoromethyl)-1,5-dimethyl-N-(1,1,3-trimethylindan-4-yl)pyrazole-4-carboxamide, 1,3,5-trimethyl-N-(1,1,3-trimethylindan-4-yl)pyrazole-4-carboxamide, N-(7-fluoro-1,1,3-trimethyl-indan-4-yl)-1,3-dimethyl-pyrazole-4-carboxamide, N-[2-(2,4-dichlorophenyl)-2-methoxy-1-methyl-ethyl]-3-(difluoromethyl)-1-methyl-pyrazole-4-carboxamide;

other respiration inhibitors (e. g. complex I, uncouplers): diflumetorim, (5,8-difluoroquinazolin-4-yl)-{2-[2-fluoro-4-(4-trifluoromethylpyridin-2-yloxy)-phenyl]-ethyl}-amine; nitrophenyl derivates: binapacryl, dinobuton, dinocap, fluazinam; ferimzone; organometal compounds: fentin salts, such as fentin-acetate, fentin chloride or fentin hydroxide; ametoctradin; and silthiofam;

B) Sterol biosynthesis inhibitors (SBI fungicides)

C14 demethylase inhibitors (DMI fungicides): triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, 1-[rel-(2S;3R)-3-(2-chlorophenyl)-2-(2,4-difluorophenyl)-oxiranylmethyl]-5-thiocyanato-1H-[1,2,4]triazole, 2-[rel-(2S,3R)-3-(2-chlorophenyl)-2-(2,4-difluorophenyl)-oxiranylmethyl]-2H-[1,2,4]triazole-3-thiol, 2-[2-chloro-4-(4-chlorophenoxy)phenyl]-1-(1,2,4-triazol-1-yl)pentan-2-ol, 1-[4-(4-chlorophenoxy)-2-(trifluoromethyl)phenyl]-1-cyclopropyl-2-(1,2,4-triazol-1-yl)ethanol, 2-[4-(4-chlorophenoxy)-2-(trifluoromethyl)phenyl]-1-(1,2,4-triazol-1-yl)butan-2-ol, 2-[2-chloro-4-(4-chlorophenoxy)phenyl]-1-(1,2,4-triazol-1-yl) butan-2-ol, 2-[4-(4-chlorophenoxy)-2-(trifluoromethyl)phenyl]-3-methyl-1-(1,2,4-triazol-1-yl)butan-2-ol, 2-[4-(4-chlorophenoxy)-2-(trifluoromethyl)phenyl]-1-(1,2,4-triazol-1-yl)propan-2-ol, 2-[2-chloro-4-(4-chlorophenoxy)phenyl]-3-methyl-1-(1,2,4-triazol-1-yl)butan-2-ol, 2-[4-(4-chlorophenoxy)-2-(trifluoromethyl)phenyl]-1-(1,2,4-triazol-1-yl)pentan-2-ol, 2-[4-(4-fluorophenoxy)-2-(trifluoromethyl)phenyl]-1-(1,2,4-triazol-1-yl)propan-2-ol, 2-[2-chloro-4-(4-chlorophenoxy)phenyl]-1-(1,2,4-triazol-1-yl)pent-3-yn-2-ol; imidazoles: imazalil, pefurazoate, prochloraz, triflumizol; pyrimidines, pyridines and piperazines: fenarimol, nuarimol, pyrifenox, triforine, [3-(4-chloro-2-fluoro-phenyl)-5-(2,4-difluorophenyl)isoxazol-4-yl]-(3-pyridyl)methanol;

Delta14-reductase inhibitors: aldimorph, dodemorph, dodemorph-acetate, fenpropimorph, tridemorph, fenpropidin, piperalin, spiroxamine;

Inhibitors of 3-keto reductase: fenhexamid;

C) Nucleic acid synthesis inhibitors phenylamides or acyl amino acid fungicides: benalaxyl, benalaxyl-M, kiralaxyl, metalaxyl, metalaxyl-M (mefenoxam), ofurace, oxadixyl;

others: hymexazole, octhilinone, oxolinic acid, bupirimate, 5-fluorocytosine, 5-fluoro-2-(p-tolylmethoxy)pyrimidin-4-amine, 5-fluoro-2-(4-fluorophenyl-methoxy)pyrimidin-4-amine;

D) Inhibitors of cell division and cytoskeleton tubulin inhibitors, such as benzimidazoles, thiophanates: benomyl, carbendazim, fuberidazole, thiabendazole, thiophanate-methyl; triazolopyrimidines: 5-chloro-7-(4-methylpiperidin-1-yl)-6-(2,4,6-trifluorophenyl)-[1,2,4]triazolo[1,5-a]pyrimidine other cell division inhibitors: diethofencarb, ethaboxam, pencycuron, fluopicolide, zoxamide, metrafenone, pyriofenone;

E) Inhibitors of amino acid and protein synthesis methionine synthesis inhibitors (anilino-pyrimidines): cyprodinil, mepanipyrim, pyrimethanil;

protein synthesis inhibitors: blasticidin-S, kasugamycin, kasugamycin hydrochloride-hydrate, mildiomycin, streptomycin, oxytetracyclin, polyoxine, validamycin A;

F) Signal transduction inhibitors

MAP/histidine kinase inhibitors: fluoroimid, iprodione, procymidone, vinclozolin, fenpiclonil, fludioxonil;

G protein inhibitors: quinoxyfen;

G) Lipid and membrane synthesis inhibitors

Phospholipid biosynthesis inhibitors: edifenphos, iprobenfos, pyrazophos, isoprothiolane;

lipid peroxidation: dicloran, quintozene, tecnazene, tolclofos-methyl, biphenyl, chloroneb, etridiazole;

phospholipid biosynthesis and cell wall deposition: dimethomorph, flumorph, mandipropamid, pyrimorph, benthiavalicarb, iprovalicarb, valifenalate and N-(1-(1-(4-cyano-phenyl)ethanesulfonyl)-but-2-yl) carbamic acid-(4-fluorophenyl) ester;

compounds affecting cell membrane permeability and fatty acids: propamocarb, propamocarb-hydrochlorid fatty acid amide hydrolase inhibitors: oxathiapiprolin, 2-{3-[2-(1-{[3,5-bis(difluoromethyl-1H-pyrazol-1-yl]acetyl}piperidin-4-yl)-1,3-thiazol-4-yl]-4,5-dihydro-1,2-oxazol-5-yl}phenyl methanesulfonate, 2-{3-[2-(1-{[3,5-bis(difluoromethyl)-1H-pyrazol-1-yl]acetyl}piperidin-4-yl) 1,3-thiazol-4-yl]-4,5-dihydro-1,2-oxazol-5-yl}-3-chlorophenyl methanesulfonate;

H) Inhibitors with Multi Site Action inorganic active substances: Bordeaux mixture, copper acetate, copper hydroxide, copper oxychloride, basic copper sulfate, sulfur;

thio- and dithiocarbamates: ferbam, mancozeb, maneb, metam, metiram, propineb, thiram, zineb, ziram;

organochlorine compounds (e. g. phthalimides, sulfamides, chloronitriles): anilazine, chlorothalonil, captafol, captan, folpet, dichlofluanid, dichlorophen, hexachlorbenzene, pentachlorphenole and its salts, phthalide, tolylfluanid, N-(4-chloro-2-nitro-phenyl)-N-ethyl-4-methyl-benzenesulfonamide;

guanidines and others: guanidine, dodine, dodine free base, guazatine, guazatine-acetate, iminoctadine, iminoctadine-triacetate, iminoctadine-tris(albesilate), dithianon, 2,6-dimethyl-1H,5H-[1,4]dithiino[2,3-c:5,6-c']dipyrrole-1,3,5,7(2H,6H)-tetraone;

I) Cell wall synthesis inhibitors inhibitors of glucan synthesis: validamycin, polyoxin B;

melanin synthesis inhibitors: pyroquilon, tricyclazole, carpropamid, dicyclomet, fenoxanil;

J) Plant defense inducers acibenzolar-S-methyl, probenazole, isotianil, tiadinil, prohexadione-calcium; phosphonates: fosetyl, fosetyl-aluminum, phosphorous acid and its salts;

K) Unknown mode of action bronopol, chinomethionat, cyflufenamid, cymoxanil, dazomet, debacarb, diclomezine, difenzoquat, difenzoquat-methylsulfate, diphenylamin, fenpyrazamine, flumetover, flusulfamide, flutianil, methasulfocarb, nitrapyrin, nitrothal-isopropyl, oxathiapiprolin, picarbutrazox, tolprocarb, 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, oxin-copper, proquinazid, tebufloquin, tecloftalam, triazoxide, 2-butoxy-6-iodo-3-propylchromen-4-one, N-(cyclopropylmethoxyimino(6-difluoro-methoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-(2-methyl-5-trifluoromethyl-4-(3-trimethylsilanyl-propoxy)-phenyl)-N-ethyl-N-methyl formamidine, N'-(5-difluoromethyl-2-methyl-4-(3-trimethylsilanyl-propoxy)-phenyl)-N-ethyl-N-methyl formamidine, methoxy-acetic acid 6-tert-butyl-8-fluoro-2,3-dimethyl-quinolin-4-yl ester, 3-[5-(4-methylphenyl)-2,3-dimethyl-isoxazolidin-3-yl]-pyridine, 3-[5-(4-chloro-phenyl)-2,3-dimethyl-isoxazolidin-3-yl]-pyridine (pyrisoxazole), N-(6-methoxy-pyridin-3-yl) cyclopropanecarboxylic acid amide, 5-chloro-1-(4,6-dimethoxy-pyrimidin-2-yl)-2-methyl-1H-benzoimidazole, 2-(4-chloro-phenyl)-N-[4-(3,4-dimethoxy-phenyl)-isoxazol-5-yl]-2-prop-2-ynyloxy-acetamide, ethyl (Z)-3-amino-2-cyano-3-phenyl-prop-2-enoate, pentyl N-[6-[[(Z)-[(1-methyltetrazol-5-yl)-phenyl-methylene]amino]oxymethyl]-2-pyridyl]carbamate, 2-[2-[(7,8-difluoro-2-methyl-3-quinolyl)oxy]-6-fluoro-phenyl]propan-2-ol, 2-[2-fluoro-6-[(8-fluoro-2-methyl-3-quinolyl)oxy]phenyl]propan-2-ol, 3-(5-fluoro-3,3,4,4-tetramethyl-3,4-dihydroisoquinolin-1-yl)quinoline, 3-(4,4-difluoro-3,3-dimethyl-3,4-dihydroisoquinolin-1-yl)quinoline, 3-(4,4,5-trifluoro-3,3-dimethyl-3,4-dihydroisoquinolin-1-yl)quinolone, 9-fluoro-2,2-dimethyl-5-(3-quinolyl)-3H-1,4-benzoxazepine;

L) Biopesticides

L1) Microbial pesticides with fungicidal, bactericidal, viricidal and/or plant defense activator activity: *Ampelomyces quisqualis* M-10 (L.1.1), *Aspergillus flavus* NRRL 21882 (L1.2), *Aureobasidium pullulans* DSM 14940 (L1.3), *A. pullulans* DSM 14941 (L.1.4), *Bacillus amyloliquefaciens* AP-136 (NRRL B-50614) (L.1.5), *B. amyloliquefaciens* AP-188 (NRRL B-50615) (L.1.6), *B. amyloliquefaciens* AP-218 (NRRL B-50618) (L.1.7), *B. amyloliquefaciens* AP-219 (NRRL B-50619) (L.1.8), *B. amyloliquefaciens* AP-295 (NRRL B-50620) (L.1.9), *B. amyloliquefaciens* FZB42 (L.1.10), *B. amyloliquefaciens* IN937a (L.1.11), *B. amyloliquefaciens* IT-45 (CNCM I-3800) (L.1.12), *B. amyloliquefaciens* TJ1000 (L.1.75), *B. amyloliquefaciens* ssp. *plantarum* MBI600 (NRRL B-50595) (L.1.13), *B. mojavensis* AP-209 (NRRL B-50616) (L.1.15), *B. pumilus* INR-7 (NRRL B50153; NRRL B-50185) (L.1.14), *B. pumilus* KFP9F (L.1.15), *B. pumilus* QST 2808 (NRRL B-30087) (L.1.16), *B. pumilus* GHA 180 (L.1.17), *B. simplex* ABU 288 (NRRL B-50340) (L.1.18), *B. solisalsi* AP-217 (NRRL B-50617) (L.1.19), *B. subtilis* CX-9060 (L.1.20), *B. subtilis* FB17 (L.1.74), *B. subtilis* GB03 (L.1.21), *B. subtilis* GB07 (L.1.22), *B. subtilis* QST-713 (NRRL B-21661) (L.1.23), *B. subtilis* var. *amyloliquefaciens* FZB24 (L.1.24), *B. subtilis* var. *amyloliquefaciens* D747 (L.1.25), *Candida oleophila* I-82 (L.1.26), *C. oleophila* O (L.1.27), *C. saitoana* (L.1.28), *Clavibacter michiganensis* (bacteriophages) (L.1.29), *Coniothyrium minitans* CON/M/91-08 (L.1.30), *Cryphonectria parasitica* (L.1.31), *Cryptococcus albidus* (L.1.32), *Dilophosphora alopecuri* (L.1.33), *Fusarium oxysporum* (L.1.34), *Clonostachys rosea* f. *catenulata* J1446 (L.1.35), *Gliocladium roseum* 321U (L.1.36), *Metschnikowia fructicola* NRRL Y-30752 (L.1.37), *Microdochium dimerum* (L.1.38), *Microsphaeropsis ochracea* P130A (L.1.39), *Muscodor albus* QST 20799 (L.1.40), *Paenibacillus polymyxa* PKB1 (ATCC 202127) (L.1.41), *Pantoea vagans* C9-1 (L.1.42), *Phlebiopsis gigantea* (L.1.43), *Pichia anomala* WRL-76 (L.1.44), *Pseudozyma flocculosa* PF-A22 UL (L.1.45), *Pythium oligandrum* DV 74 (L.1.46), *Sphaerodes mycoparasitica* IDAC 301008-01 (L.1.47), *Streptomyces griseoviridis* K61 (L.1.48), *S. lydicus* WYEC 108 (L.1.49), *S. violaceusniger* XL-2 (L.1.50), *S. violaceusniger* YCED-9 (L.1.51), *Talaromyces flavus* V117b (L.1.52), *Trichoderma asperellum* T34 (L.1.53), *T. asperellum*

SKT-1 (L.1.54), *T. asperellum* ICC 012 (L.1.55), *T. atroviride* LC52 (L.1.56), *T. atroviride* CNCM I-1237 (L.1.57), *T. fertile* JM41R (L.1.58), *T. gamsii* ICC 080 (L.1.59), *T. harmatum* TH 382 (L.1.60), *T. harzianum* TH-35 (L.1.61), *T. harzianum* T-22 (L.1.62), *T. harzianum* T-39 (L.1.63); mixture of *T. harzianum* ICC012 and *T. viride* ICC080 (L.1.64); mixture of *T. polysporum* and *T. harzianum* (L.1.65); *T. stromaticum* (L.1.66), *T. virens* G1-3 (L.1.76), *T. virens* G-41 (L.1.77), *T. virens* GL-21 (L.1.67), *T. virens* G41 (L.1.68), *T. viride* TV1 (L.1.69), *Typhula phacorrhiza* 94671 (L.1.70), *Ulocladium oudemansii* HRU3 (L.1.71), *Verticillium dahlia* (L.1.72), zucchini yellow mosaic virus (avirulent strain) (L.1.73);

L2) Biochemical pesticides with fungicidal, bactericidal, viricidal and/or plant defense activator activity: chitosan (hydrolysate) (L.2.1), harpin protein (L.2.2), laminarin (L.2.3), Menhaden fish oil (L.2.4), natamycin (L.2.5), Plum pox virus coat protein (L.2.6), potassium bicarbonate (L.2.7), *Reynoutria sachlinensis* extract (L.2.8), salicylic acid (L.2.9), potassium or sodium bicarbonate (L.2.10), tea tree oil (L.2.11);

L3) Microbial pesticides with insecticidal, acaricidal, molluscidal and/or nematicidal activity: *Agrobacterium radiobacter* K1026 (L.3.1), *A. radiobacter* K84 (L.3.2), *Bacillus firmus* I-1582 (L.3.3); *B. thuringiensis* ssp. *aizawai* strains: ABTS-1857 (L.3.4), SAN 401 I (L.3.5), ABG-6305 (L.3.6) and ABG-6346 (L.3.7); *B. t.* ssp. *israelensis* AM65-52 (L.3.8), *B. t.* ssp. *israelensis* SUM-6218 (L.3.9), *B. t.* ssp. *galleriae* SDS-502 (L.3.10), *B. t.* ssp. *kurstaki* EG 2348 (L.3.11), *B. t.* ssp. *kurstaki* SB4 (L.3.12), *B. t.* ssp. *kurstaki* ABTS-351 (HD-1) (L.3.13), *Beauveria bassiana* ATCC 74040 (L.3.14), *B. bassiana* GHA (L.3.15), *B. bassiana* H123 (L.3.16), *B. bassiana* DSM 12256 (L.3.17), *B. bassiana* PPRI 5339 (L.3.18), *B. brongniartii* (L.3.19), *Burkholderia* sp. A396 (L.3.20), *Chromobacterium subtsugae* PRAA4-1 (L.3.21), *Cydia pomonella* granulosis virus V22 (L.3.22), *Cydia pomonella* granulosis virus V1 (L.3.23), *Cryptophlebia leucotreta* granulovirus (CrleGV) (L.3.57), *Flavobacterium* sp. H492 (L.3.60), *Helicoverpa armigera* nucleopolyhedrovirus (HearNPV) (L.3.58), *Isaria fumosorosea* Apopka-97 (L.3.24), *Lecanicillium longisporum* KV42 (L.3.25), *L. longisporum* KV71 (L.3.26), *L. muscarium* KV01 (L.3.27), *Metarhizium anisopliae* FI-985 (L.3.28), *M. anisopliae* FI-1045 (L.3.29), *M. anisopliae* F52 (L.3.30), *M. anisopliae* ICIPE 69 (L.3.31), *M. anisopliae* var. *acridum* IMI 330189 (L.3.32); *Nomuraea rileyi* strains: SA86101 (L.3.33), GU87401 (L.3.34), SR86151 (L.3.35), CG128 (L.3.36) and VA9101 (L.3.37); *Paecilomyces fumosoroseus* FE 9901 (L.3.38), *P. lilacinus* 251 (L.3.39), *P. lilacinus* DSM 15169 (L.3.40), *P. lilacinus* BCP2 (L.3.41), *Paenibacillus popilliae* Dutky-1940 (NRRL B-2309=ATCC 14706) (L.3.42), *P. popilliae* Dutky 1 (L.3.43), *P. popilliae* KLN 3 (L.3.56), *Pasteuria* sp. Ph3 (L.3.44), *Pasteuria* sp. ATCC PTA-9643 (L.3.45), *Pasteuria* sp. ATCC SD-5832 (L.3.46), *P. nishizawae* Pn1 (L.3.46), *P. penetrans* (L.3.47), *P. ramose* (L.3.48), *P. reneformis* Pr-3 (L.3.49), *P. thornea* (L.3.50), *P. usgae* (L.3.51), *Pseudomonas fluorescens* CL 145A (L.3.52), *Spodoptera littoralis* nucleopolyhedrovirus (SpliNPV) (L.3.59), *Steinernema carpocapsae* (L.3.53), *S. feltiae* (L.3.54), *S. kraussei* L137 (L.3.55);

L4) Biochemical pesticides with insecticidal, acaricidal, molluscidal, pheromone and/or nematicidal activity: L-carvone (L.4.1), citral (L.4.2), (E,Z)-7,9-dodecadien-1-yl acetate (L.4.3), ethyl formate (L.4.4), (E,Z)-2,4-ethyl decadienoate (pear ester) (L.4.5), (Z,Z,E)-7,11,13-hexadecatrienal (L.4.6), heptyl butyrate (L.4.7), isopropyl myristate (L.4.8), cis-jasmone (L.4.9), lavanulyl senecioate (L.4.10), 2-methyl 1-butanol (L.4.11), methyl eugenol (L.4.12), methyl jasmonate (L.4.13), (E,Z)-2,13-octadecadien-1-ol (L.4.14), (E,Z)-2,13-octadecadien-1-ol acetate (L.4.15), (E,Z)-3,13-octadecadien-1-ol (L.4.16), R-1-octen-3-ol (L.4.17), pentatermanone (L.4.18), potassium silicate (L.4.19), sorbitol actanoate (L.4.20), (E,Z,Z)-3,8,11-tetradecatrienyl acetate (L.4.21), (Z,E)-9,12-tetradecadien-1-ylacetate (L.4.22), Z-7-tetradecen-2-one (L.4.23), Z-9-tetradecen-1-yl acetate (L.4.24), Z-11-tetradecenal (L.4.25), Z-11-tetradecen-1-ol (L.4.26), *Acacia negra* extract (L.4.27), extract of grapefruit seeds and pulp (L.4.28), extract of *Chenopodium ambrosiodes* (L.4.29), Catnip oil (L.4.30), Neem oil (L.4.31), Quillay extract (L.4.32), Tagetes oil (L.4.33);

L5) Microbial pesticides with plant stress reducing, plant growth regulator, plant growth promoting and/or yield enhancing activity: *Azospirillum amazonense* BR 11140 (SpY2$^T$) (L.5.1), *A. brasilense* strains Ab-V5 and Ab-V6 (L.5.73), *A. brasilense* AZ39 (L.5.2), *A. brasilense* XOH (L.5.3), *A. brasilense* BR 11005 (Sp245) (L.5.4), *A. brasilense* BR 11002 (L.5.5), *A. lipoferum* BR 11646 (Sp31) (L.5.6), *A. irakense* (L.5.7), *A. halopraeferens* (L.5.8), *Bradyrhizobium* sp. PNL01 (L.5.9), *B.* sp. (*Arachis*) CB1015 (L.5.10), *B.* sp. (*Arachis*) USDA 3446 (L.5.11), *B.* sp. (*Arachis*) SEMIA 6144 (L.5.12), *B.* sp. (*Arachis*) SEMIA 6462 (L.5.13), *B.* sp. (*Arachis*) SEMIA 6464 (L.5.14), *B.* sp. (*Vigna*) (L.5.15), *B. elkanii* SEMIA 587 (L.5.16), *B. elkanii* SEMIA 5019 (L.5.17), *B. elkanii* U-1301 (L.5.18), *B. elkanii* U-1302 (L.5.19), *B. elkanii* USDA 74 (L.5.20), *B. elkanii* USDA 76 (L.5.21), *B. elkanii* USDA 94 (L.5.22), *B. elkanii* USDA 3254 (L.5.23), *B. japonicum* 532c (L.5.24), *B. japonicum* CPAC 15 (L.5.25), *B. japonicum* E-109 (L.5.26), *B. japonicum* G49 (L.5.27), *B. japonicum* TA-11 (L.5.28), *B. japonicum* USDA 3 (L.5.29), *B. japonicum* USDA 31 (L.5.30), *B. japonicum* USDA 76 (L.5.31), *B. japonicum* USDA 110 (L.5.32), *B. japonicum* USDA 121 (L.5.33), *B. japonicum* USDA 123 (L.5.34), *B. japonicum* USDA 136 (L.5.35), *B. japonicum* SEMIA 566 (L.5.36), *B. japonicum* SEMIA 5079 (L.5.37), *B. japonicum* SEMIA 5080 (L.5.38), *B. japonicum* WB74 (L.5.39), *B. liaoningense* (L.5.40), *B. lupini* LL13 (L.5.41), *B. lupini* WU425 (L.5.42), *B. lupini* WSM471 (L.5.43), *B. lupini* WSM4024 (L.5.44), *Glomus intraradices* RTI-801 (L.5.45), *Mesorhizobium* sp. WSM1271 (L.5.46), *M.* sp. WSM1497 (L.5.47), *M. ciceri* CC1192 (L.5.48), *M. huakii* (L.5.49), *M. loti* CC829 (L.5.50), *M. loti* SU343 (L.5.51), *Paenibacillus alvei* NAS6G6 (L.5.52), *Penicillium bilaiae* (L.5.53), *Rhizobium leguminosarum* bv. *phaseoli* RG-B10 (L.5.54), *R. l.* bv. *trifolii* RP113-7 (L.5.55), *R. l.* bv. *trifolii* 095 (L.5.63), *R. l.* bv. *trifolii* TA1 (L.5.64), *R. l.* bv. *trifolii* CC283b (L.5.65), *R. l.* bv. *trifolii* CC275e (L.5.66), *R. l.* bv. *trifolii* CB782 (L.5.67), *R. l.* bv. *trifolii* CC1099 (L.5.68), *R. l.* bv. *trifolii* WSM1325 (L.5.69), *R. l.* bv. *viciae* SU303 (L.5.56), *R. l.* bv. *viciae* WSM1455 (L.5.57), *R. l.* bv. *viciae* P1NP3Cst (L.5.58), *R. l.* bv. *viciae* RG-P2 (L.5.70), *R. tropici* SEMIA 4080 (L.5.59), *R. tropici* SEMIA 4077 (L.5.71), *R. tropici* CC511 (L.5.72),

*Sinorhizobium meliloti* MSDJ0848 (L.5.60), *S. meliloti* NRG185 (L.5.61), *S. meliloti* RRI128 (L.5.62);

L6) Biochemical pesticides with plant stress reducing, plant growth regulator and/or plant yield enhancing activity: abscisic acid (L.6.1), aluminium silicate (kaolin) (L.6.2), 3-decen-2-one (L.6.3), formononectin (L.6.4), genistein (L.6.5), hesperetin (L.6.6), homobrassinlide (L.6.7), humates (L.6.8), methyl jasmonate (L.6.9), cis-jasmone (L.6.10), lysophosphatidyl ethanlamine (L.6.11), naringenin (L.6.12), polymeric polyhydroxy acid (L.6.13), salicylic acid (L.6.14), *Ascophyllum nodosum* (Norwegian kelp, Brown kelp) extract (L.6.15) and *Ecklonia maxima* (kelp) extract (L.6.16).

M) Growth regulators abscisic acid, amidochlor, ancymidol, 6-benzylaminopurine, brassinolide, butralin, chlormequat (chlormequat chloride), choline chloride, cyclanilide, daminozide, dikegulac, dimethipin, 2,6-dimethylpuridine, ethephon, flumetralin, flurprimidol, fluthiacet, forchlorfenuron, gibberellic acid, inabenfide, indole-3-acetic acid, maleic hydrazide, mefluidide, mepiquat (mepiquat chloride), naphthaleneacetic acid, N-6-benzyladenine, paclobutrazol, prohexadione (prohexadione-calcium), prohydrojasmon, thidiazuron, triapenthenol, tributyl phosphorotrithioate, 2,3,5-tri-iodobenzoic acid, trinexapac-ethyl and uniconazole;

N) Herbicides acetamides: acetochlor, alachlor, butachlor, dimethachlor, dimethenamid, flufenacet, mefenacet, metolachlor, metazachlor, napropamide, naproanilide, pethoxamid, pretilachlor, propachlor, thenylchlor;

amino acid derivatives: bilanafos, glyphosate, glufosinate, sulfosate;

aryloxyphenoxypropionates: clodinafop, cyhalofop-butyl, fenoxaprop, fluazifop, haloxyfop, metamifop, propaquizafop, quizalofop, quizalofop-P-tefuryl;

Bipyridyls: diquat, paraquat;

(thio)carbamates: asulam, butylate, carbetamide, desmedipham, dimepiperate, eptam (EPTC), esprocarb, molinate, orbencarb, phenmedipham, prosulfocarb, pyributicarb, thiobencarb, triallate;

cyclohexanediones: butroxydim, clethodim, cycloxydim, profoxydim, sethoxydim, tepraloxydim, tralkoxydim;

dinitroanilines: benfluralin, ethalfluralin, oryzalin, pendimethalin, prodiamine, trifluralin;

diphenyl ethers: acifluorfen, aclonifen, bifenox, diclofop, ethoxyfen, fomesafen, lactofen, oxyfluorfen;

hydroxybenzonitriles: bomoxynil, dichlobenil, ioxynil;

imidazolinones: imazamethabenz, imazamox, imazapic, imazapyr, imazaquin, imazethapyr;

phenoxy acetic acids: clomeprop, 2,4-dichlorophenoxyacetic acid (2,4-D), 2,4-DB, dichlorprop, MCPA, MCPA-thioethyl, MCPB, Mecoprop;

pyrazines: chloridazon, flufenpyr-ethyl, fluthiacet, norflurazon, pyridate;

pyridines: aminopyralid, clopyralid, diflufenican, dithiopyr, fluridone, fluroxypyr, picloram, picolinafen, thiazopyr;

sulfonyl ureas: amidosulfuron, azimsulfuron, bensulfuron, chlorimuron-ethyl, chlorsulfuron, cinosulfuron, cyclosulfamuron, ethoxysulfuron, flazasulfuron, flucetosulfuron, flupyrsulfuron, foramsulfuron, halosulfuron, imazosulfuron, iodosulfuron, mesosulfuron, metazosulfuron, metsulfuron-methyl, nicosulfuron, oxasulfuron, primisulfuron, prosulfuron, pyrazosulfuron, rimsulfuron, sulfometuron, sulfosulfuron, thifensulfuron, triasulfuron, tribenuron, trifloxysulfuron, triflusulfuron, tritosulfuron, 1-((2-chloro-6-propylimidazo[1,2-b]pyridazin-3-yl)sulfonyl)-3-(4,6-dimethoxy-pyrimidin-2-yl)urea;

triazines: ametryn, atrazine, cyanazine, dimethametryn, ethiozin, hexazinone, metamitron, metribuzin, prometryn, simazine, terbuthylazine, terbutryn, triaziflam;

ureas: chlorotoluron, daimuron, diuron, fluometuron, isoproturon, linuron, methabenzthiazuron, tebuthiuron;

other acetolactate synthase inhibitors: bispyribac-sodium, cloransulam-methyl, diclosulam, florasulam, flucarbazone, flumetsulam, metosulam, ortho-sulfamuron, penoxsulam, propoxycarbazone, pyribambenz-propyl, pyribenzoxim, pyriftalid, pyriminobac-methyl, pyrimisulfan, pyrithiobac, pyroxasulfone, pyroxsulam;

others: amicarbazone, aminotriazole, anilofos, beflubutamid, benazolin, bencarbazone, benfluresate, benzofenap, bentazone, benzobicyclon, bicyclopyrone, bromacil, bromobutide, butafenacil, butamifos, cafenstrole, carfentrazone, cinidon-ethyl, chlorthal, cinmethylin, clomazone, cumyluron, cyprosulfamide, dicamba, difenzoquat, diflufenzopyr, *Drechslera monoceras*, endothal, ethofumesate, etobenzanid, fenoxasulfone, fentrazamide, flumiclorac-pentyl, flumioxazin, flupoxam, flurochloridone, flurtamone, indanofan, isoxaben, isoxaflutole, lenacil, propanil, propyzamide, quinclorac, quinmerac, mesotrione, methyl arsonic acid, naptalam, oxadiargyl, oxadiazon, oxaziclomefone, pentoxazone, pinoxaden, pyraclonil, pyraflufen-ethyl, pyrasulfotole, pyrazoxyfen, pyrazolynate, quinoclamine, saflufenacil, sulcotrione, sulfentrazone, terbacil, tefuryltrione, tembotrione, thiencarbazone, topramezone, (3-[2-chloro-4-fluoro-5-(3-methyl-2,6-dioxo-4-trifluoromethyl-3,6-dihydro-2H-pyrimidin-1-yl)-phenoxy]-pyridin-2-yloxy)-acetic acid ethyl ester, 6-amino-5-chloro-2-cyclopropyl-pyrimidine-4-carboxylic acid methyl ester, 6-chloro-3-(2-cyclopropyl-6-methyl-phenoxy)-pyridazin-4-ol, 4-amino-3-chloro-6-(4-chloro-phenyl)-5-fluoro-pyridine-2-carboxylic acid, 4-amino-3-chloro-6-(4-chloro-2-fluoro-3-methoxy-phenyl)-pyridine-2-carboxylic acid methyl ester, and 4-amino-3-chloro-6-(4-chloro-3-dimethylamino-2-fluoro-phenyl)-pyridine-2-carboxylic acid methyl ester.

O) Insecticides organo(thio)phosphates: acephate, azamethiphos, azinphos-methyl, chlorpyrifos, chlorpyrifos-methyl, chlorfenvinphos, diazinon, dichlorvos, dicrotophos, dimethoate, disulfoton, ethion, fenitrothion, fenthion, isoxathion, malathion, methamidophos, methidathion, methyl-parathion, mevinphos, monocrotophos, oxydemeton-methyl, paraoxon, parathion, phenthoate, phosalone, phosmet, phosphamidon, phorate, phoxim, pirimiphos-methyl, profenofos, prothiofos, sulprophos, tetrachlorvinphos, terbufos, triazophos, trichlorfon;

carbamates: alanycarb, aldicarb, bendiocarb, benfuracarb, carbaryl, carbofuran, carbosulfan, fenoxycarb, furathiocarb, methiocarb, methomyl, oxamyl, pirimicarb, propoxur, thiodicarb, triazamate;

pyrethroids: allethrin, bifenthrin, cyfluthrin, cyhalothrin, cyphenothrin, cypermethrin, alpha-cypermethrin, beta-cypermethrin, zeta-cypermethrin, deltamethrin, esfenvalerate, etofenprox, fenpropathrin, fenvalerate, imiprothrin, lambda-cyhalothrin, permethrin, prallethrin, pyrethrin I and II, resmethrin, silafluofen, tau-fluvalinate, tefluthrin, tetramethrin, tralomethrin, transfluthrin, profluthrin, dimefluthrin;

insect growth regulators: a) chitin synthesis inhibitors: benzoylureas: chlorfluazuron, cyramazin, diflubenzuron, flucycloxuron, flufenoxuron, hexaflumuron, lufenuron, novaluron, teflubenzuron, triflumuron; buprofezin, diofenolan, hexythiazox, etoxazole, clofentazine; b) ecdysone antagonists: halofenozide, methoxyfenozide, tebufenozide, azadirachtin; c) juvenoids: pyriproxyfen, methoprene, fenoxycarb; d) lipid biosynthesis inhibitors: spirodiclofen, spiromesifen, spirotetramat;

nicotinic receptor agonists/antagonists compounds: clothianidin, dinotefuran, flupyradifurone, imidacloprid, thiamethoxam, nitenpyram, acetamiprid, thiacloprid, 1-2-chloro-thiazol-5-ylmethyl)-2-nitrimino-3,5-dimethyl-[1,3,5]triazinane;

GABA antagonist compounds: endosulfan, ethiprole, fipronil, vaniliprole, pyrafluprole, pyriprole, 5-amino-1-(2,6-dichloro-4-methyl-phenyl)-4-sulfinamoyl-1H-pyrazole-3-carbothioic acid amide;

macrocyclic lactone insecticides: abamectin, emamectin, milbemectin, lepimectin, spinosad, spinetoram;

mitochondrial electron transport inhibitor (METI) I acaricides: fenazaquin, pyridaben, tebufenpyrad, tolfenpyrad, flufenerim;

METI II and III compounds: acequinocyl, fluacyprim, hydramethylnon;

Uncouplers: chlorfenapyr;

oxidative phosphorylation inhibitors: cyhexatin, diafenthiuron, fenbutatin oxide, propargite;

moulting disruptor compounds: cryomazine;

mixed function oxidase inhibitors: piperonyl butoxide;

sodium channel blockers: indoxacarb, metaflumizone;

ryanodine receptor inhibitors: chlorantraniliprole, cyantraniliprole, flubendiamide, N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide; N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; N-[4,6-dichloro-2-[(diethyl-lambda-4-sulfanylidene)carbamoyl]-phenyl]-2-(3-chloro-2-pyridyl)-5-(difluoromethyl)pyrazole-3-carboxamide; N-[4,6-dibromo-2-[(di-2-propyl-lambda-4-sulfanylidene)carbamoyl]-phenyl]-2-(3-chloro-2-pyridyl)-5-(trifluoromethyl) pyrazole-3-carboxamide; N-[4-chloro-2-[(di-2-propyl-lambda-4-sulfanylidene)carbamoyl]-6-cyano-phenyl]-2-(3-chloro-2-pyridyl)-5-(trifluoromethyl)pyrazole-3-carboxamide; N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide;

others: benclothiaz, bifenazate, cartap, flonicamid, pyridalyl, pymetrozine, sulfur, thiocyclam, cyenopyrafen, flupyrazofos, cyflumetofen, amidoflumet, imicyafos, bistrifluron, pyrifluquinazon and 1,1'-[(3S,4R,4aR, 6S,6aS,12R,12aS,12bS)-4-[[(2-cyclopropylacetyl)oxy] methyl]-1,3,4,4a,5,6,6a,12,12a,12b-decahydro-12-hydroxy-4,6a,12b-trimethyl-11-oxo-9-(3-pyridinyl)-2H,11H-naphtho[2,1-b]pyrano[3,4-e]pyran-3,6-diyl] cyclopropaneacetic acid ester.

The compounds III, their preparation and their biological activity e.g. against harmful fungi, pests or weed is known (e.g. http://www.alanwood.net/pesticides/, e-Pesticide Manual V5.2 (ISBN 978 1 901396 85 0) (2008-2011)); many of these substances are commercially available.

The compounds described by IUPAC nomenclature, their preparation and their fungicidal activity are also known (e.g cf. Can. J. Plant Sci. 48(6), 587-94, 1968; EP-A 141 317; EP-A 152 031; EP-A 226 917; EP-A 243 970; EP-A 256 503; EP-A 428 941; EP-A 532 022; EP-A 1 028 125; EP-A 1 035 122; EP-A 1 201 648; EP-A 1 122 244, JP 2002316902; DE 19650197; DE 10021412; DE 102005009458; U.S. Pat. Nos. 3,296,272; 3,325,503; WO 98/46608; WO 99/14187; WO 99/24413; WO 99/27783; WO 00/29404; WO 00/46148; WO 00/65913; WO 01/54501; WO 01/56358; WO 02/22583; WO 02/40431; WO 03/10149; WO 03/11853; WO 03/14103; WO 03/16286; WO 03/53145; WO 03/61388; WO 03/66609; WO 03/74491; WO 04/49804; WO 04/83193; WO 05/120234; WO 05/123689; WO 05/123690; WO 05/63721; WO 05/87772; WO 05/87773; WO 06/15866; WO 06/87325; WO 06/87343; WO 07/82098; WO 07/90624, WO 11/028657, WO 2007/014290, WO 20012/168188; WO 2007/006670, PCT/EP2012/065650 and PCT/EP2012/065651).

It is preferred that the mixtures comprise as compounds III fungicidal compounds that are independently of each other selected from the groups A), B), C), D), E), F), G), H), I), J), K) and L).

According to another embodiment of the invention, mixtures comprise as compound III a herbicidal compound that is selected from the group N).

According to a further embodiment, mixtures comprise as compound III an insecticidal compound that is selected from the group O).

Preference is also given to mixtures comprise as compound III (component 3) at least one active substance selected from group A) and particularly selected from azoxystrobin, dimoxystrobin, fluoxastrobin, kresoxim-methyl, orysastrobin, picoxystrobin, pyraclostrobin, trifloxystrobin; famoxadone, fenamidone; benzovindiflupyr, bixafen, boscalid, fluopyram, fluxapyroxad, isopyrazam, penflufen, penthiopyrad, sedaxane; ametoctradin, cyazofamid, fluazinam, fentin salts, such as fentin acetate.

Preference is also given to mixtures comprise as compound III (component 3) at least one active substance selected from group B) and particularly selected from cyproconazole, difenoconazole, epoxiconazole, fluquinconazole, flusilazole, flutriafol, metconazole, myclobutanil, penconazole, propiconazole, prothioconazole, triadimefon, triadimenol, tebuconazole, tetraconazole, triticonazole, prochloraz, fenarimol, triforine; dodemorph, fenpropimorph, tridemorph, fenpropidin, spiroxamine; fenhexamid.

Preference is also given to mixtures comprise as compound III (component 3) at least one active substance selected from group C) and particularly selected from metalaxyl, (metalaxyl-M) mefenoxam, ofurace.

Preference is also given to mixtures comprise as compound III (component 3) at least one active substance selected from group D) and particularly selected from benomyl, carbendazim, thiophanate-methyl, ethaboxam, fluopicolide, zoxamide, metrafenone, pyriofenone.

Preference is also given to mixtures comprise as compound III (component 3) at least one active substance selected from group E) and particularly selected from cyprodinil, mepanipyrim, pyrimethanil.

Preference is also given to mixtures comprise as compound III (component 3) at least one active substance selected from group F) and particularly selected from iprodione, fludioxonil, vinclozolin, quinoxyfen.

Preference is also given to mixtures comprise as compound III (component 3) at least one active substance selected from group G) and particularly selected from dimethomorph, flumorph, iprovalicarb, benthiavalicarb, mandipropamid, propamocarb.

Preference is also given to mixtures comprise as compound III (component 3) at least one active substance selected from group H) and particularly selected from copper acetate, copper hydroxide, copper oxychloride, copper sulfate, sulfur, mancozeb, metiram, propineb, thiram, captafol, folpet, chlorothalonil, dichlofluanid, dithianon.

Preference is also given to mixtures comprise as compound III (component 3) at least one active substance selected from group I) and particularly selected from carpropamid and fenoxanil.

Preference is also given to mixtures comprise as compound III (component 3) at least one active substance selected from group J) and particularly selected from acibenzolar-S-methyl, probenazole, tiadinil, fosetyl, fosetyl-aluminium, $H_3PO_3$ and salts thereof.

Preference is also given to mixtures comprise as compound III (component 3) at least one active substance selected from group K) and particularly selected from cymoxanil, proquinazid and N-methyl-2-{1-[(5-methyl-3-trifluoromethyl-1H-pyrazol-1-yl)-acetyl]-piperidin-4-yl}-N-[(1R)-1,2,3,4-tetrahydronaphthalen-1-yl]-4-thiazolecarboxamide.

Preference is also given to mixtures comprise as compound III (component 3) at least one active substance selected from group L) and particularly selected from *Bacillus subtilis* strain NRRL No. B-21661, *Bacillus pumilus* strain NRRL No. B-30087 and *Ulocladium oudemansii*.

The mixtures and compositions according to the invention are suitable as fungicides. They are distinguished by an outstanding effectiveness against a broad spectrum of phytopathogenic fungi, including soil-borne fungi, which derive especially from the classes of the Plasmodiophoromycetes, Peronosporomycetes (syn. Oomycetes), Chytridiomycetes, Zygomycetes, Ascomycetes, Basidiomycetes and Deuteromycetes (syn. Fungi imperfecti). Some are systemically effective and they can be used in crop protection as foliar fungicides, fungicides for seed dressing and soil fungicides. Moreover, they are suitable for controlling harmful fungi, which inter alia occur in wood or roots of plants.

The mixtures and compositions according to the invention are particularly important in the control of a multitude of phytopathogenic fungi on various cultivated plants, such as cereals, e. g. wheat, rye, barley, triticale, oats or rice; beet, e. g. sugar beet or fodder beet; fruits, such as pomes, stone fruits or soft fruits, e. g. apples, pears, plums, peaches, almonds, cherries, strawberries, raspberries, blackberries or gooseberries; leguminous plants, such as lentils, peas, alfalfa or soybeans; oil plants, such as rape, mustard, olives, sunflowers, coconut, cocoa beans, castor oil plants, oil palms, ground nuts or soybeans; cucurbits, such as squashes, cucumber or melons; fiber plants, such as cotton, flax, hemp or jute; citrus fruit, such as oranges, lemons, grapefruits or mandarins; vegetables, such as spinach, lettuce, asparagus, cabbages, carrots, onions, tomatoes, potatoes, cucurbits or paprika; lauraceous plants, such as avocados, cinnamon or camphor; energy and raw material plants, such as corn, soybean, rape, sugar cane or oil palm; corn; tobacco; nuts; coffee; tea; bananas; vines (table grapes and grape juice grape vines); hop; turf; natural rubber plants or ornamental and forestry plants, such as flowers, shrubs, broad-leaved trees or evergreens, e. g. conifers; and on the plant propagation material, such as seeds, and the crop material of these plants.

Preferably the inventive mixtures and compositions are used for controlling a multitude of fungi on field crops, such as potatoes sugar beets, tobacco, wheat, rye, barley, oats, rice, corn, cotton, soybeans, rape, legumes, sunflowers, coffee or sugar cane; fruits; vines; ornamentals; or vegetables, such as cucumbers, tomatoes, beans or squashes.

The term "plant propagation material" is to be understood to denote all the generative parts of the plant such as seeds and vegetative plant material such as cuttings and tubers (e. g. potatoes), which can be used for the multiplication of the plant. This includes seeds, roots, fruits, tubers, bulbs, rhizomes, shoots, sprouts and other parts of plants, including seedlings and young plants, which are to be transplanted after germination or after emergence from soil. These young plants may also be protected before transplantation by a total or partial treatment by immersion or pouring.

Preferably, treatment of plant propagation materials with the inventive mixtures and compositions thereof, respectively, is used for controlling a multitude of fungi on cereals, such as wheat, rye, barley and oats; rice, corn, cotton and soybeans.

The term "cultivated plants" is to be understood as including plants which have been modified by breeding, mutagenesis or genetic engineering including but not limiting to agricultural biotech products on the market or in development (cf. http://cera-gmc.org/, see GM crop database therein). Genetically modified plants are plants, which genetic material has been so modified by the use of recombinant DNA techniques that under natural circumstances cannot readily be obtained by cross breeding, mutations or natural recombination. Typically, one or more genes have been integrated into the genetic material of a genetically modified plant in order to improve certain properties of the plant. Such genetic modifications also include but are not limited to targeted post-transitional modification of protein(s), oligo- or polypeptides e. g. by glycosylation or polymer additions such as prenylated, acetylated or farnesylated moieties or PEG moieties.

The inventive mixtures and compositions are particularly suitable for controlling the following plant diseases:

*Albugo* spp. (white rust) on ornamentals, vegetables (e. g. *A. candida*) and sunflowers (e. g. *A. tragopogonis*); *Alternaria* spp. (*Alternaria* leaf spot) on vegetables, rape (*A. brassicola* or *brassicae*), sugar beets (*A. tenuis*), fruits, rice, soybeans, potatoes (e. g. *A. solani* or *A. alternata*), tomatoes (e. g. *A. solani* or *A. alternata*) and wheat; *Aphanomyces* spp. on sugar beets and vegetables; *Ascochyta* spp. on cereals and vegetables, e. g. *A. tritici* (anthracnose) on wheat and *A. hordei* on barley; *Bipolaris* and *Drechslera* spp. (teleomorph: *Cochliobolus* spp.) on corn (e. g. *D. maydis*), cereals (e. g. *B. sorokiniana*: spot blotch), rice (e. g. *B. oryzae*) and turfs; *Blumeria* (formerly *Erysiphe*) *graminis* (powdery mildew) on cereals (e. g. on wheat or barley); *Botrytis cinerea* (teleomorph: *Botryotinia fuckeliana*: grey mold) on fruits and berries (e. g. strawberries), vegetables (e. g. lettuce, carrots, celery and cabbages), rape, flowers, vines, forestry plants and wheat; *Bremia lactucae* (downy mildew) on lettuce;

*Ceratocystis* (syn. *Ophiostoma*) spp. (rot or wilt) on broad-leaved trees and evergreens, e. g. *C. ulmi* (Dutch elm disease) on elms; *Cercospora* spp. (*Cercospora* leaf spots) on corn, rice, sugar beets (e. g. *C. beticola*), sugar cane, vegetables, coffee, soybeans (e. g. *C. sojina* or *C. kikuchii*) and rice; *Cladosporium* spp. on tomatoes (e. g. *C. fulvum*:

leaf mold) and cereals, e. g. *C. herbarum* (black ear) on wheat; *Claviceps purpurea* (ergot) on cereals; *Cochliobolus* (anamorph: *Helminthosporium* of *Bipolaris*) spp. (leaf spots) on corn (*C. carbonum*), cereals (e. g. *C. sativus*, anamorph: *B. sorokiniana*) and rice (e. g. *C. miyabeanus*, anamorph: *H. oryzae*); *Colletotrichum* (teleomorph: *Glomerella*) spp. (anthracnose) on cotton (e. g. *C. gossypii*), corn (e. g. *C. graminicola*), soft fruits, potatoes (e. g. *C. coccodes*: black dot), beans (e. g. *C. lindemuthianum*) and soybeans (e. g. *C. truncatum* or *C. gloeosporiodes*); *Corticium* spp., e. g. *C. sasakii* (sheath blight) on rice; *Corynespora cassiicola* (leaf spots) on soybeans and ornamentals; *Cycloconium* spp., e. g. *C. oleaginum* on olive trees; *Cylindrocarpon* spp. (e. g. fruit tree canker or young vine decline, teleomorph: *Nectria* or *Neonectria* spp.) on fruit trees, vines (e. g. *C. liriodendri*, teleomorph: *Neonectria liriodendri*: Black Foot Disease) and ornamentals; *Dematophora* (teleomorph: *Rosellinia*) necatrix (root and stem rot) on soybeans; *Diaporthe* spp., e. g. *D. phaseolorum* (damping off) on soybeans; *Drechslera* (syn. *Helminthosporium*, teleomorph: *Pyrenophora*) spp. on corn, cereals, such as barley (e. g. *D. teres*, net blotch) and wheat (e. g. *D. tritici-repentis*: tan spot), rice and turf; *Esca* (dieback, apoplexy) on vines, caused by *Formitiporia* (syn. *Phellinus*) *punctata, F. mediterranea, Phaeomoniella chlamydospora* (earlier *Phaeoacremonium chlamydosporum*), *Phaeoacremonium aleophilum* and/or *Botryosphaeria obtusa; Elsinoe* spp. on pome fruits (*E. pyri*), soft fruits (*E. veneta*: anthracnose) and vines (*E. ampelina*: anthracnose); *Entyloma oryzae* (leaf smut) on rice; *Epicoccum* spp. (black mold) on wheat; *Erysiphe* spp. (powdery mildew) on sugar beets (*E. betae*), vegetables (e. g. *E. pisi*), such as cucurbits (e. g. *E. cichoracearum*), cabbages, rape (e. g. *E. cruciferarum*); *Eutypa lata* (Eutypa canker or dieback, anamorph: *Cytosporina lata*, syn. *Libertella blepharis*) on fruit trees, vines and ornamental woods; *Exserohilum* (syn. *Helminthosporium*) spp. on corn (e. g. *E. turcicum*); *Fusarium* (teleomorph: *Gibberella*) spp. (wilt, root or stem rot) on various plants, such as *F. graminearum* or *F. culmorum* (root rot, scab or head blight) on cereals (e. g. wheat or barley), *F. oxysporum* on tomatoes, *F. solani* on soybeans and *F. verticillioides* on corn; *Gaeumannomyces graminis* (take-all) on cereals (e. g. wheat or barley) and corn; *Gibberella* spp. on cereals (e. g. *G. zeae*) and rice (e. g. *G. fujikuroi*: Bakanae disease); *Glomerella angulata* on vines, pome fruits and other plants and *G. gossypii* on cotton; Grainstaining complex on rice; *Guignardia bewellii* (black rot) on vines; *Gymnosporangium* spp. on rosaceous plants and junipers, e. g. *G. sabinae* (rust) on pears; *Helminthosporium* spp. (syn. *Drechslera*, teleomorph: *Cochliobolus*) on corn, cereals and rice; *Hemileia* spp., e. g. *H. vastatix* (coffee leaf rust) on coffee; *Isariopsis clavispora* (syn. *Cladosporium vitis*) on vines; *Macrophomina phaseolina* (syn. *phaseoli*) (root and stem rot) on soybeans and cotton; *Microdochium* (syn. *Fusarium*) *nivale* (pink snow mold) on cereals (e. g. wheat or barley); *Microsphaera diffusa* (powdery mildew) on soybeans; *Mondinia* spp., e. g. *M. laxa, M. fructicola* and *M. fructigena* (bloom and twig blight, brown rot) on stone fruits and other rosaceous plants; *Mycosphaerella* spp. on cereals, bananas, soft fruits and ground nuts, such as e. g. *M. graminicola* (anamorph: *Septoria tritici, Septoria* blotch) on wheat; *Peronospora* spp. (downy mildew) on cabbage (e. g. *P. brassicae*), rape (e. g. *P. parasitica*), onions (e. g. *P. destructor*), tobacco (*P. tabacina*) and soybeans (e. g. *P. manshurica*); *Phakopsora pachyrhizi* and *P. meibomiae* (soybean rust) on soybeans; *Phialophora* spp. e. g. on vines (e. g. *P. tracheiphila* and *P. tetraspora*) and soybeans (e. g. *P. gregata*: stem rot); *Phoma lingam* (root and stem rot) on rape and cabbage and *P. betae* (root rot, leaf spot and damping-off) on sugar beets; *Phomopsis* spp. on sunflowers, vines (e. g. *P. viticola*: can and leaf spot) and soybeans (e. g. stem rot: *P. phaseoli*, teleomorph: *Diaporthe phaseolorum*); *Physoderma maydis* (brown spots) on corn; *Phytophthora* spp. (wilt, root, leaf, fruit and stem rot) on various plants, such as paprika and cucurbits (e. g. *P. capsici*), soybeans (e. g. *P. megasperma*, syn. *P. sojae*), potatoes and tomatoes (e. g. *P. infestans* late blight) and broad-leaved trees (e. g. *P. ramorum*: sudden oak death); *Plasmodiophora brassicae* (club root) on cabbage, rape, radish and other plants; *Plasmopara* spp., e. g. *P. viticola* (grapevine downy mildew) on vines and *P. halstedii* on sunflowers; *Podosphaera* spp. (powdery mildew) on rosaceous plants, hop, pome and soft fruits, e. g. *P. leucotricha* on apples; *Polymyxa* spp., e. g. on cereals, such as barley and wheat (*P. graminis*) and sugar beets (*P. betae*) and thereby transmitted viral diseases; *Pseudocercosporella herpotrichoides* (eyespot, teleomorph: *Tapesia yallundae*) on cereals, e. g. wheat or barley; *Pseudoperonospora* (downy mildew) on various plants, e. g. *P. cubensis* on cucurbits or *P. humili* on hop; *Pseudopezicula tracheiphila* (red fire disease or, rotbrenner', anamorph: *Phialophora*) on vines; *Puccinia* spp. (rusts) on various plants, e. g. *P. triticina* (brown or leaf rust), *P. striiforms* (stripe or yellow rust), *P. hordei* (dwarf rust), *P. graminis* (stem or black rust) or *P. recondita* (brown or leaf rust) on cereals, such as e. g. wheat, barley or rye, and asparagus (e. g. *P. asparagi*); *Pyrenophora* (anamorph: *Drechslera*) *tritici-repentis* (tan spot) on wheat or *P. teres* (net blotch) on barley; *Pyriculana* spp., e. g. *P. oryzae* (teleomorph: *Magnaporthe grisea*, rice blast) on rice and *P. grisea* on turf and cereals; *Pythium* spp. (damping-off) on turf, rice, corn, wheat, cotton, rape, sunflowers, soybeans, sugar beets, vegetables and various other plants (e. g. *P. ultimum* or *P. aphanidermatum*); *Ramulana* spp., e. g. *R. collo-cygni* (Ramularia leaf spots, Physiological leaf spots) on barley and *R. beticola* on sugar beets; *Rhizoctonia* spp. on cotton, rice, potatoes, turf, corn, rape, potatoes, sugar beets, vegetables and various other plants, e. g. *R. solani* (root and stem rot) on soybeans, *R. solani* (sheath blight) on rice or *R. cerealis* (*Rhizoctonia* spring blight) on wheat or barley; *Rhizopus stolonifer* (black mold, soft rot) on strawberries, carrots, cabbage, vines and tomatoes; *Rhynchosporium secalis* (scald) on barley, rye and triticale; *Sarocladium oryzae* and *S. attenuatum* (sheath rot) on rice; *Sclerotinia* spp. (stem rot or white mold) on vegetables and field crops, such as rape, sunflowers (e. g. *S. sclerotiorum*) and soybeans (e. g. *S. rolfsii* or *S. sclerotiorum*); *Septoria* spp. on various plants, e. g. *S. glycines* (brown spot) on soybeans, *S. tritici* (*Septoria* blotch) on wheat and *S.* (syn. *Stagonospora*) *nodorum* (*Stagonospora* blotch) on cereals; *Uncinula* (syn. *Erysiphe*) *necator* (powdery mildew, anamorph: *Odium tuckeri*) on vines; *Setospaeria* spp. (leaf blight) on corn (e. g. *S. turcicum*, syn. *Helminthosporium turcicum*) and turf; *Sphacelotheca* spp. (smut) on corn, (e. g. *S. reiliana*: head smut), sorghum and sugar cane; *Sphaerotheca fuliginea* (powdery mildew) on cucurbits; *Spongospora subterranea* (powdery scab) on potatoes and thereby transmitted viral diseases; *Stagonospora* spp. on cereals, e. g. *S. nodorum* (*Stagonospora* blotch, teleomorph: *Leptosphaeria* [syn. *Phaeosphaeria*] *nodorum*) on wheat; *Synchytrium endobioticum* on potatoes (potato wart disease); *Taphrina* spp., e. g. *T. deformans* (leaf curl disease) on peaches and *T. pruni* (plum pocket) on plums; *Thielaviopsis* spp. (black root rot) on tobacco, pome fruits, vegetables, soybeans and cotton, e. g. *T. basicola* (syn. *Chalara elegans*); *Tilletia* spp. (common bunt or stinking smut) on cereals, such as e. g. *T. tritici* (syn.

*T. caries*, wheat bunt) and *T. controversa* (dwarf bunt) on wheat; *Typhula incarnata* (grey snow mold) on barley or wheat; *Urocystis* spp., e. g. *U. occulta* (stem smut) on rye; *Uromyces* spp. (rust) on vegetables, such as beans (e. g. *U. appendiculatus*, syn. *U. phaseoli*) and sugar beets (e. g. *U. betae*); *Ustilago* spp. (loose smut) on cereals (e. g. *U. nuda* and *U. avaenae*), corn (e. g. *U. maydis*: corn smut) and sugar cane; *Venturia* spp. (scab) on apples (e. g. *V. inaequalis*) and pears; and *Verticillium* spp. (wilt) on various plants, such as fruits and ornamentals, vines, soft fruits, vegetables and field crops, e. g. *V. dahliae* on strawberries, rape, potatoes and tomatoes.

Bacteria pathogenic for plants are responsible for devastating losses in agriculture. The use of antibiotics to control such infections is restricted in many countries due to worries over the evolution and transmission of antibiotic resistance.

The mixtures and compositions according to the invention are also suitable as bactericides. They are distinguished by an outstanding effectiveness against a broad spectrum of phytopathogenic bacteria, including soil-borne bacteria, which derive especially from the genera of *Agrobacterium, Clavibacter, Corynebacterium, Erwinia, Leifsonia, Pectobacterium, Pseudomonas, Ralstonia, Xanthomonas* (e.g. *Xanthomonas oryzae* causing bacterial blight on rice) and *Xylella*; preferably *Erwinia*; even more preferably *Erwinia amylovora* causing fire blight on apples, pears and other member of the family Rosaceae.

In particular, the mixtures and compositions of the present invention are effective against plant pathogens in speciality crops such as vine, fruits, hop, vegetables and tabacco.

The mixtures according to the present invention and compositions thereof, respectively, are also suitable for controlling harmful fungi in the protection of stored products or harvest and in the protection of materials. The term "protection of materials" is to be understood to denote the protection of technical and non-living materials, such as adhesives, glues, wood, paper and paperboard, textiles, leather, paint dispersions, plastics, coiling lubricants, fiber or fabrics, against the infestation and destruction by harmful microorganisms, such as fungi and bacteria. As to the protection of wood and other materials, the particular attention is paid to the following harmful fungi: Ascomycetes such as *Ophiostoma* spp., *Ceratocystis* spp., *Aureobasidium pullulans, Sclerophoma* spp., *Chaetomium* spp., *Humicola* spp., *Petriella* spp., *Trichurus* spp.; Basidiomycetes such as *Coniophora* spp., *Coriolus* spp., *Gloeophyllum* spp., *Lentinus* spp., *Pleurotus* spp., *Poria* spp., *Serpula* spp. and *Tyromyces* spp., Deuteromycetes such as *Aspergillus* spp., *Cladosporium* spp., *Penicillium* spp., *Trichorma* spp., *Alternaria* spp., *Paecilomyces* spp. and Zygomycetes such as *Mucor* spp., and in addition in the protection of stored products and harvest the following yeast fungi are worthy of note: *Candida* spp. and *Saccharomyces cerevisae*.

The mixtures and compositions according to the invention are particularly important in the control of a multitude of phytopathogenic insects or other pests (e.g. lepidopterans, beetles, dipterans, *Thrips*, heteropterans, hemiptera, homoptera, termites, orthopterans, arachnids, and nematodes) on various cultivated plants, such as cereals, e. g. wheat, rye, barley, triticale, oats or rice; beet, e. g. sugar beet or fodder beet; fruits, such as pomes, stone fruits or soft fruits, e. g. apples, pears, plums, peaches, almonds, cherries, strawberries, raspberries, blackberries or gooseberries; leguminous plants, such as lentils, peas, alfalfa or soybeans; oil plants, such as rape, mustard, olives, sunflowers, coconut, cocoa beans, castor oil plants, oil palms, ground nuts or soybeans; cucurbits, such as squashes, cucumber or melons; fiber plants, such as cotton, flax, hemp or jute; citrus fruit, such as oranges, lemons, grapefruits or mandarins; vegetables, such as spinach, lettuce, asparagus, cabbages, carrots, onions, tomatoes, potatoes, cucurbits or paprika; lauraceous plants, such as avocados, cinnamon or camphor; energy and raw material plants, such as corn, soybean, rape, sugar cane or oil palm; corn; tobacco; nuts; coffee; tea; bananas; vines (table grapes and grape juice grape vines); hop; turf; natural rubber plants or ornamental and forestry plants, such as flowers, shrubs, broad-leaved trees or evergreens, e. g. conifers; and on the plant propagation material, such as seeds, and the crop material of these plants.

Preferably the inventive mixtures and compositions are used for controlling a multitude of pests on field crops, such as potatoes sugar beets, tobacco, wheat, rye, barley, oats, rice, corn, cotton, soybeans, rape, legumes, sunflowers, coffee or sugar cane; fruits; vines; ornamentals; or vegetables, such as cucumbers, tomatoes, beans or squashes.

The inventive mixtures and the compositions thereof, respectively, are particularly suitable for controlling the following harmful insects from the order of the lepidopterans (Lepidoptera), for example *Agrotis ypsilon, Agrotis segetum, Alabama argillacea, Anticarsia gemmatalis, Argyresthia conjugella, Autographa gamma, Bupalus piniarius, Cacoecia murinana, Capua reticulana, Cheimatobia brumata, Choristoneura fumiferana, Choristoneura occidentalis, Cirphis unipuncta, Cydia pomonella, Dendrolimus pini, Diaphania nitidalis, Diatraea grandiosella, Earias insulana, Elasmopalpus lignosellus, Eupoecilia ambiguella, Evetria bouliana, Feltia subterranea, Gallena mellonella, Grapholitha funebrana, Grapholitha molesta, Heliothis armigera, Heliothis virescens, Heliothis zea, Hellula undalis, Hibernia defoliaria, Hyphantria cunea, Hyponomeuta malinellus, Keiferia lycopersicella, Lambdina fiscellaria, Laphygma exigua, Leucoptera coffeella, Leucoptera scitella, Lithocolletis blancardella, Lobesia botrana, Loxostege sticticalis, Lymantria dispar, Lymantria monacha, Lyonetia clerkella, Malacosoma neustria, Mamestra brassicae, Orgyia pseudotsugata, Ostrinia nubilalis, Panolis flammea, Pectinophora gossypiella, Peridroma saucia, Phalera bucephala, Phthorimaea operculella, Phyllocnistis citrella, Pieris brassicae, Plathypena scabra, Plutella xylostella, Pseudoplusia includens, Rhyacionia frustrana, Scrobipalpula absoluta, Sitotroga cerealella, Sparganothis pilleriana, Spodoptera frugiperda, Spodoptera littoralis, Spodoptera litura, Thaumatopoea pityocampa, Tortrix vindana, Trichoplusia ni* and *Zeiraphera canadensis,* beetles (Coleoptera), for example *Agrilus sinuatus, Agriotes lineatus, Agriotes obscurus, Amphimallus solstitialis, Anisandrus dispar, Anthonomus grandis, Anthonomus pomorum, Atomaria linearis, Blastophagus piniperda, Blitophaga undata, Bruchus rufimanus, Bruchus pisorum, Bruchus lentis, Byctiscus betulae, Cassida nebulosa, Cerotoma trifurcata, Ceuthorrhynchus assimilis, Ceuthorrhynchus napi, Chaetocnema tibialis, Conoderus vespertinus, Crioceris asparagi, Diabrotica longicornis, Diabrotica speciosa, Diabrotica 12-punctata, Diabrotica virgifera, Diloboderus abderus, Epilachna varivestis, Epitrix hirtipennis, Eutinobothrus brasiliensis, Hylobius abietis, Hypera brunneipennis, Hypera postica, Ips typographus, Lema bilineata, Lema melanopus, Leptinotarsa decemlineata, Limonius californicus, Lissorhoptrus oryzophilus, Melanotus communis, Meligethes aeneus, Melolontha hippocastani, Melolontha melolontha, Oulema oryzae, Ortiorrhynchus sulcatus, Oryzophagus oryzae, Otiorrhynchus ovatus, Phaedon cochleanae, Phyllotreta chrysocephala, Phyllophaga* sp., *Phyl-*

*lophaga cuyabana, Phyllophaga triticophaga, Phyllopertha horticola, Phyllotreta nemorum, Phyllotreta striolata, Popillia japonica, Sitona lineatus* and *Sitophilus granaria*, dipterans (Diptera), for example *Aedes aegypti, Aedes vexans, Anastrepha ludens, Anopheles maculipennis, Ceratitis capitata, Chrysomya bezziana, Chiysomya hominivorax, Chiysomya macellaria, Contannia sorghicola, Cordylobia anthropophaga, Culex pipiens, Dacus cucurbitae, Dacus oleae, Dasineura brassicae, Fannia canicularis, Gasterophilus intestinalis, Glossina morsitans, Haematobia irritans, Haplodiplosis equestris, Hylemyia platura, Hypoderma lineata, Liriomyza sativae, Liriomyza trifolii, Lucilia caprina, Lucilia cuprina, Lucilia sericata, Lycoria pectorals, Mayetiola destructor, Musca domestica, Muscina stabulans, Oestrus ovis, Oscinella frit, Pegomya hysocyami, Phorbia antiqua, Phorbia brassicae, Phorbia coarctata, Rhagoletis cerasi, Rhagoletis pomonella, Tabanus bovinus, Tipula oleracea* and *Tipula paludosa*, trips (Thysanoptera), e.g. *Frankliniella fusca, Frankliniella occidentalis, Frankliniella tritici, Scirtothrips citri, Thrips oryzae, Thrips palmi* and *Thrips tabaci*, hymenopterans (Hymenoptera), e.g. *Acromyrmex ambuguus, Acromyrmex crassispinus, Acromyrmex heiery, Acromyrmex landolti, Acromyrmex subterraneus, Athalia rosae, Atta capiguara, Atta cephalotes, Atta laevigata, Atta robusta, Atta sexdens, Atta texana, Hoplocampa minuta, Hoplocampa testudinea, Monomorium pharaonis, Solenopsis geminata* and *Solenopsis invicta*, heteropterans (Heteroptera), e.g. *Acrosternum hilare, Blissus leucopterus, Cyrtopeltis notatus, Dichelops furcatus, Dysdercus angulatus, Dysdercus intermedius, Euchistos heros, Eurygaster integriceps, Euschistus irnpictiventris, Leptoglossus phyllopus, Lygus lineolaris, Lygus pratensis, Nezara vindula, Piesma quadrata, Piezodorus guildini, Solubea insularis* and *Thyanta perditor*, Hemiptera and Homoptera, e.g. *Acrosternum hilare, Blissus leucopterus, Cyrtopeltis notatus, Diaphorina citri, Dysdercus angulatus, Dysdercus intermedius, Eurygaster integriceps, Euschistus irnpictiventris, Leptoglossus phyllopus, Lygus lineolaris, Lygus pratensis, Nezara vindula, Piesma quadrata, Solubea insularis, Thyanta perditor, Acyrthosiphon onobrychis, Adelges laricis, Aphidula nasturtii, Aphis fabae, Aphis forbesi, Aphis pomi, Aphis gossypi, Aphis grossulanae, Aphis schneideri, Aphis spiraecola, Aphis sambuci, Acyrthosiphon pisum, Aulacorthum solani, Brachycaudus cardui, Brachycaudus helichlysi, Brachycaudus persicae, Brachycaudus prunicola, Brevicolyne brassicae, Capitophorus horni, Cerosipha gossypii, Chaetosiphon fragaefolii, Cryptomyzus ribis, Dreyfusia nordmannianae, Dreyfusia piceae, Dysaphis radicola, Dysaulacorthum pseudosolani, Dysaphis plantaginea, Dysaphis pyri, Empoasca fabae, Hyalopterus pruni, Hyperomyzus lactucae, Macrosiphum avenae, Macrosiphum euphorbiae, Macrosiphon rosae, Megoura viciae, Melanaphis pyrarius, Metopolophium dirhodum, Myzodes persicae, Myzus ascalonicus, Myzus cerasi, Myzus varians, Nasonovia ribis-nign, Nilaparvata lugens, Pemphigus bursarius, Perkinsiella saccharicida, Phorodon humuli, Psylla mali, Psylla piri, Rhopalomyzus ascalonicus, Rhopalosiphum maidis, Rhopalosiphum padi, Rhopalosiphum insertum, Sappaphis mala, Sappaphis mali, Schizaphis graminum, Schizoneura lanuginosa, Sitobion avenae, Trialeurodes vaporariorum, Toxoptera aurantiiand, Viteus vitifolii, Cirnex lectularius, Cimex hempterus, Reduvius senilis, Triatoma* spp., and *Arilus critatus*, termites (Isoptera), e.g. *Calotermes flavicollis, Cornitermes cumulans, Heterotermes tenuis, Leucotermes flavipes, Neocapritemes opacus, Procornitermes triacifer, Reticulitermes lucifugus, Syntermes molestus*, and *Termes natalensis*, orthopterans (Orthoptera), e.g. *Acheta domestica, Blatta orientalis, Blattella germanica, Forficula auricularia, Gryllotalpa gryllotalpa, Locusta migratoria, Melanoplus bivittatus, Melanoplus femur-rubrum, Melanoplus mexicanus, Melanoplus sanguinipes, Melanoplus spretus, Nomadacris septemfasciata, Periplaneta americana, Schistocerca americana, Schistocerca peregrina, Stauronotus maroccanus* and *Tachycines asynamorus*, Arachnoidea, such as arachnids, e.g. of the families Argasidae, Ixodidae and Sarcoptidae, such as *Amblyomma americanum, Amblyomma variegatum, Argas persicus, Boophilus annulatus, Boophilus decoloratus, Boophilus microplus, Dermacentor silivarum, Hyalomma truncatum, Ixodes ricinus, Ixodes rubicundus, Ornithodorus moubata, Otobius megnini, Dermanyssus gallinae, Psoroptes ovis, Rhipicephalus appendiculatus, Rhipicephalus evertsi, Sarcoptes scabiei*, and *Eriophyidae* spp. such as *Aculus schlechtendali, Phyllocoptrata oleivora* and *Eriophyes sheldoni, Tarsonemidae* spp. such as *Phytonemus pallidus* and *Polyphagotarsonemus latus; Tenuipalpidae* spp. such as *Brevipalpus phoenicis; Tetranychidae* spp. such as *Tetranychus cinnabarinus, Tetranychus kanzawai, Tetranychus pacificus, Tetranychus telarius* and *Tetranychus urtibae, Panonychus ulmi, Panonychus citri*, and *Oligonychus pratensis*. In particular, the inventive mixtures are suitable for combating pests of the orders Coleoptera, Lepidoptera, Thysanoptera, Homoptera, Isoptera, and Orthoptera.

They are also suitable for controlling the following plant parasitic nematodes such as root-knot nematodes, *Meloidogyne arenaria, Meloidogyne chitwoodi, Meloidogyne exigua, Meloidogyne hapla, Meloidogyne incognita, Meloidogyne javanica* and other *Meloidogyne* species; cyst nematodes, *Globodera rostochiensis, Globodera pallida, Globodera tabacum* and other *Globodera* species, *Heterodera avenae, Heterodera glycines, Heterodera schachtii, Heterodera trifolii*, and other *Heterodera* species; seed gall nematodes, *Anguina funesta, Anguina tritici* and other *Anguina* species; stem and foliar nematodes, *Aphelenchoides besseyi, Aphelenchoides fragariae, Aphelenchoides ritzemabosi* and other *Aphelenchoides* species; sting nematodes, *Belonolaimus longicaudatus* and other *Belonolaimus* species; pine nematodes, *Bursaphenchus xylophilus* and other *Bursaphelenchus* species; ring nematodes, *Criconema* species, *Criconemella* species, *Criconemoides* species, and *Mesocriconema* species; stem and bulb nematodes, *Ditylenchus destructor, Ditylenchus dipsaci, Ditylenchus myceliophagus* and other *Ditylenchus* species; awl nematodes, *Dolichodorus* species; spiral nematodes, *Helicotylenchus dihystera, Helicotylenchus multicinctus* and other *Helicotylenchus* species, *Rotylenchus robustus* and other *Rotylenchus* species; sheath nematodes, *Hemicycliophora* species and *Hemicriconemoides* species; *Hirshmanniella* species; lance nematodes, *Hoplolaimus columbus, Hoplolaimus galeatus* and other *Hoplolaimus* species; false root-knot nematodes, *Nacobbus aberrans* and other *Nacobbus* species; needle nematodes, *Longidorus elongates* and other *Longidorus* species; pin nematodes, *Paratylenchus* species; lesion nematodes, *Pratylenchus brachyurus, Pratylenchus coffeae, Pratylenchus curvitatus, Pratylenchus goodeyi, Pratylencus neglectus, Pratylenchus penetrans, Pratylenchus scribneri, Pratylenchus vulnus, Pratylenchus zeae* and other *Pratylenchus* species; *Radinaphelenchus cocophilus* and other *Radinaphelenchus* species, burrowing nematodes, *Radopholus similis* and other

*Radopholus* species; reniform nematodes, *Rotylenchulus reniformis* and other *Rotylenchulus* species; *Scutellonema* species; stubby root nematodes, *Trichodorus primitivus* and other *Trichodorus* species; *Paratricodorus minor* and other *Paratrichodorus* species; stunt nematodes, *Tylenchorhynchus claytoni*, *Tylenchorhynchus dubius* and other *Tylenchorhynchus* species and *Merlinius* species; citrus nematodes, *Tylenchulus semipenetrans* and other *Tylenchulus* species; dagger nematodes, *Xiphinema americanum*, *Xiphinema index*, *Xiphinema diversicaudatum* and other *Xiphinema* species; and other plant parasitic nematode species Plant propagation materials may be treated with the mixtures and compositions of the invention prophylactically either at or before planting or transplanting.

In particular, the present invention relates to a method for protection of plant propagation material from pests, wherein the plant propagation material is treated with an effective amount of an inventive mixture.

In a preferred embodiment, the present invention relates to a method for protection of plant propagation material from animal pests (insects, acarids or nematodes), wherein the plant propagation material are treated with an effective amount of an inventive mixture.

In an equally preferred embodiment, the present invention relates to a method for protection of plant propagation material from harmful fungi, wherein the plant propagation material is treated with an effective amount of an inventive mixture.

In general, "pesticidally effective amount" means the amount of the inventive mixtures or of compositions comprising the mixtures needed to achieve an observable effect on growth, including the effects of necrosis, death, retardation, prevention, and removal, destruction, or otherwise diminishing the occurrence and activity of the target organism. The pesticidally effective amount can vary for the various mixtures/compositions used in the invention. A pesticidally effective amount of the mixtures/compositions will also vary according to the prevailing conditions such as desired pesticidal effect and duration, weather, target species, locus, mode of application, and the like.

The term "plant health effective amount" denotes an amount of the inventive mixtures, which is sufficient for achieving plant health effects as defined herein below. More exemplary information about amounts, ways of application and suitable ratios to be used is given below. Anyway, the skilled artisan is well aware of the fact that such an amount can vary in a broad range and is dependent on various factors, e.g. the treated cultivated plant or material and the climatic conditions.

Healthier plants are desirable since they result among others in better yields and/or a better quality of the plants or crops, specifically better quality of the harvested plant parts. Healthier plants also better resist to biotic and/or abiotic stress. A high resistance against biotic stresses in turn allows the person skilled in the art to reduce the quantity of pesticides applied and consequently to slow down the development of resistances against the respective pesticides.

It was therefore an object of the present invention to provide a pesticidal composition which solves the problems outlined above, and which should, in particular, improve the health of plants, in particular the yield of plants.

The term "health of a plant" or "plant health" is defined as a condition of the plant and/or its products which is determined by several aspects alone or in combination with each other such as increased yield, plant vigor, quality of harvested plant parts and tolerance to abiotic and/or biotic stress.

It has to be emphasized that the above mentioned effects of the inventive mixtures, i.e. enhanced health of the plant, are also present when the plant is not under biotic stress and in particular when the plant is not under pest pressure.

For example, for seed treatment applications, it is evident that a plant suffering from fungal or insecticidal attack shows reduced germination and emergence leading to poorer plant or crop establishment and vigor, and consequently, to a reduced yield as compared to a plant propagation material which has been subjected to curative or preventive treatment against the relevant pest and which can grow without the damage caused by the biotic stress factor. However, the methods according to the invention lead to an enhanced plant health even in the absence of any biotic stress. This means that the positive effects of the mixtures of the invention cannot be explained just by the pesticidal activities of the compounds (I) and (II), but are based on further activity profiles. Accordingly, the application of the inventive mixtures can also be carried out in the absence of pest pressure.

In an equally preferred embodiment, the present invention relates to a method for improving the health of plants grown from said plant propagation material, wherein the plant propagation material is treated with an effective amount of an inventive mixture.

The mixtures comprising *Bacillus subtilis* strain FB17, or a cell-free extract thereof or at least one metabolite thereof, and/or a mutant of *Bacillus subtilis* FB17 having all the identifying characteristics thereof or extract of the mutant, and at least one biopesticide II and the compositions thereof, respectively, are also particularly suitable for controlling the following harmful insects from the order of the lepidopterans (Lepidoptera), for example *Agrotis ypsilon, Agrotis segetum, Alabama argillacea, Anticarsia gemmatalis, Argyresthia conjugella, Autographa gamma, Bupalus piniarius, Cacoecia murinana, Capua reticulana, Cheimatobia brumata, Choristoneura fumiferana, Choristoneura occidentalis, Cirphis unipuncta, Cydia pomonella, Dendrolimus pini, Diaphania nitidalis, Diatraea grandiosella, Earias insulana, Elasmopalpus lignosellus, Eupoecilia ambiguella, Evetria bouliana, Feltia subterranea, Gallena mellonella, Grapholitha funebrana, Grapholitha molesta, Heliothis armigera, Heliothis virescens, Heliothis zea, Hellula undalis, Hibernia defoliaria, Hyphantria cunea, Hyponomeuta malinellus, Keiferia lycopersicella, Lambdina fiscellaria, Laphygma exigua, Leucoptera coffeella, Leucoptera scitella, Lithocolletis blancardella, Lobesia botrana, Loxostege sticticalis, Lymantria dispar, Lymantria monacha, Lyonetia clerkella, Malacosoma neustria, Mamestra brassicae, Orgyia pseudotsugata, Ostrinia nubilalis, Panolis flammea, Pectinophora gossypiella, Peridroma saucia, Phalera bucephala, Phthorimaea operculella, Phyllocnistis citrella, Pieris brassicae, Plathypena scabra, Plutella xylostella, Pseudoplusia includens, Rhyacionia frustrana, Scrobipalpula absoluta, Sitotroga cerealella, Sparganothis pilleriana, Spodoptera frugiperda, Spodoptera littoralis, Spodoptera litura, Thaumatopoea pityocampa, Tortrix vindana, Trichoplusia ni* and *Zeiraphera canadensis,* beetles (Coleoptera), for example *Agrilus sinuatus, Agriotes lineatus, Agriotes obscurus, Amphimallus solstitialis, Anisandrus dispar, Anthonomus grandis, Anthonomus pomorum, Atomaria linearis, Blastophagus piniperda, Blitophaga undata, Bruchus rufimanus, Bruchus pisorum, Bruchus lentis, Byctiscus betulae, Cassida nebulosa, Cerotoma trifurcata, Ceuthorrhynchus assimilis, Ceuthorrhynchus napi, Chaetocnema Conoderus vespertinus, Crioceris*

*asparagi, Diabrotica longicornis, Diabrotica speciosa, Diabrotica 12-punctata, Diabrotica virgifera, Diloboderus abderus, Epilachna varivestis, Epitrix hirtipennis, Eutinobothrus brasiliensis, Hylobius abietis, Hypera brunneipennis, Hypera postica, Ips typographus, Lema bilineata, Lema melanopus, Leptinotarsa decemlineata, Limonius californicus, Lissorhoptrus oryzophilus, Melanotus communis, Meligethes aeneus, Melolontha hippocastani, Melolontha melolontha, Oulema oryzae, Ortiorrhynchus sulcatus, Oryazophagus oryzae, Otiorrhynchus ovatus, Phaedon cochleariae, Phyllotreta chrysocephala, Phyllophaga* sp., *Phyllophaga cuyabana, Phyllophaga triticophaga, Phyllopertha horticola, Phyllotreta nemorum, Phyllotreta striolata, Popillia japonica, Sitona lineatus* and *Sitophilus granaria,* dipterans (Diptera), for example *Aedes aegypti, Aedes vexans, Anastrepha ludens, Anopheles maculipennis, Ceratitis capitata, Chrysomya bezziana, Chrysomya hominivorax, Chrysomya macellaria, Contannia sorghicola, Cordylobia anthropophaga, Culex pipiens, Dacus cucurbitae, Dacus oleae, Dasineura brassicae, Fannia canicularis, Gasterophilus intestinalis, Glossina morsitans, Haematobia irritans, Haplodiplosis equestris, Hylemyia platura, Hypoderma lineata, Liriomyza sativae, Liriomyza trifolii, Lucilia caprin, Lucilia cuprina, sericata, Lycona pectoralis, Mayetiola destructor, Musca domestica, Muscina stabulans, Oestrus ovis, Oscinella frit, Pegomya hysocyami, Phorbia antiqua, Phorbia brassicae, Phorbia coarctata, Rhagoletis cerasi, Rhagoletis pomonella, Tabanus bovinus, Tipula oleracea* and *Tipula paludosa,*

Thrips (Thysanoptera), e.g. *Frankliniella fusca, Frankliniella occidentalis, Frankliniella tritici, Scirtothrips citri, Thrips oryzae, Thrips palmi* and *Thrips tabaci,* hymenopterans (Hymenoptera), e.g. *Acromyrmex ambuguus, Acromyrmex crassispinus, Acromyrmex heiery, Acromyrmex landolti, Acromyrmex subterraneus, Athalia rosae, Atta capiguara, Atta cephalotes, Atta laevigata, Atta robusta, Atta sexdens, Atta texana, Hoplocampa minuta, Hoplocampa testudinea, Monomorium pharaonis, Solenopsis geminata* and *Solenopsis invicta,* heteropterans (Heteroptera), e.g. *Acrosternum hilare, Blissus leucopterus, Cyrtopeltis notatus, Dichelops furcatus, Dysdercus angulatus, Dysdercus intermedius, Euchistos heros, Eurygaster integriceps, Euschistus impictiventris, Leptoglossus phyllopus, Lygus lineolaris, Lygus pratensis, Nezara vindula, Piesma quadrata, Piezodorus guildini, Solubea insularis* and *Thyanta perditor,*

Hemiptera and Homoptera, e.g. *Acrosternum hilare, Blissus leucopterus, Cyrtopeltis notatus, Diaphorina citri, Dysdercus angulatus, Dysdercus intermedius, Eurygaster integriceps, Euschistus impictiventris, Leptoglossus phyllopus, Lygus lineolaris, Lygus pratensis, Nezara vindula, Piesma quadrata, Solubea insularis, Thyanta perditor, Acyrthosiphon onobrychis, Adelges laricis, Aphidula nasturtii, Aphis fabae, Aphis forbesi, Aphis pomi, Aphis gossypii, Aphis grossulanae, Aphis schneideri, Aphis spiraecola, Aphis sambuci, Acyrthosiphon pisum, Aulacorthum solani, Brachycaudus cardui, Brachycaudus helichlysi, Brachycaudus persicae, Brachycaudus prunicola, Brevicoryne brassicae, Capitophorus horni, Cerosipha gossypii, Chaetosiphon fragaefolii, Cryptomyzus ribis, Dreyfusia nordmannianae, Dreyfusia piceae, Dysaphis radicola, Dysaulacorthum pseudosolani, Dysaphis plantaginea, Dysaphis pyri, Empoasca fabae, Hyalopterus pruni, Hyperomyzus lactucae, Macrosiphum avenae, Macrosiphum euphorbiae, Macrosiphon rosae, Megoura viciae, Melanaphis pyrarius, Metopolophium dirhodum, Myzodes persicae, Myzus ascalonicus, Myzus cerasi, Myzus varians, Nasonovia ribis-nign, Nilaparvata lugens, Pemphigus bursarius, Perkinsiella saccharicida, Phorodon humuli, Psylla mali, Psylla piri, Rhopalomyzus ascalonicus, Rhopalosiphum maidis, Rhopalosiphum padi, Rhopalosiphum insertum, Sappaphis mala, Sappaphis mali, Schizaphis graminum, Schizoneura lanuginosa, Sitobion avenae, Trialeurodes vaporariorum, Toxoptera aurantiiand, Viteus vitifolii, Cimex lectularius, Cimex hemipterus, Reduvius senilis, Triatoma* spp., and *Ardus critatus,* termites (Isoptera), e.g. *Calotermes flavicollis, Cornitermes cumulans, Heterotermes tenuis, Leucotermes flavipes, Neocapritemes opacus, Procornitermes triacifer; Reticulitermes lucifugus, Syntermes molestus,* and *Termes natalensis,* orthopterans (Orthoptera), e.g. *Acheta domestica, Blatta orientalis, Blattella germanica, Forficula auricularia, Gryllotalpa gryllotalpa, Locusta migratoria, Melanoplus bivittatus, Melanoplus femur-rubrum, Melanoplus mexicanus, Melanoplus sanguinipes, Melanoplus spretus, Nomadacris septemfasciata, Periplaneta americana, Schistocerca americana, Schistocerca peregrina, Stauronotus maroccanus* and *Tachycines asynamorus,*

Arachnoidea, such as arachnids, e.g. of the families Argasidae, Ixodidae and Sarcoptidae, such as *Amblyomma americanum, Amblyomma variegatum, Argas persicus, Boophilus annulatus, Boophilus decoloratus, Boophilus microplus, Dermacentor silvarum, Hyalomma truncatum, Ixodes ricinus, Ixodes rubicundus, Ornithodorus moubata, Otobius megnini, Dermanyssus gallinae, Psoroptes ovis, Rhipicephalus appendiculatus, Rhipicephalus evertsi, Sarcoptes scabiei,* and *Eriophyidae* spp. such as *Aculus schlechtendali, Phyllocoptrata oleivora* and *Eriophyes sheldoni; Tarsonemidae* spp. such as *Phytonemus pallidus* and *Polyphagotarsonemus latus; Tenuipalpidae* spp. such as *Brevipalpus phoenicis; Tetranychidae* spp. such as *Tetranychus cinnabarinus, Tetranychus kanzawai, Tetranychus pacificus, Tetranychus telarius* and *Tetranychus urtibae, Panonychus ulmi, Panonychus citri,* and *Oligonychus pratensis.* In particular, the inventive mixtures are suitable for combating pests of the orders Coleoptera, Lepidoptera, Thysanoptera, Homoptera, Isoptera, and Orthoptera.

The inventive mixtures are also suitable for controlling the following plant parasitic nematodes such as *Meloidogyne, Globodera, Heterodera, Radopholus, Rotylenchulus, Pratylenchus* and other genera. The inventive mixtures are particularly suitable for controlling the following plant parasitic nematodes such as root-knot nematodes *Meloidogyne arenaria, Meloidogyne chitwoodi, Meloidogyne exigua, Meloidogyne hapla, Meloidogyne incognita, Meloidogyne javanica* and other *Meloidogyne* species; cyst nematodes, *Globodera rostochiensis, Globodera pallida, Globodera tabacum* and other *Globodera* species, *Heterodera avenae, Heterodera glycines, Heterodera schachtii, Heterodera trifolii,* and other *Heterodera* species; seed gall nematodes, *Anguina funesta, Anguina tritici* and other *Anguina* species; stem and foliar nematodes, *Aphelenchoides besseyi, Aphelenchoides fragariae, Aphelenchoides ritzemabosi* and other *Aphelenchoides* species; sting nematodes, *Belonolaimus longicaudatus* and other *Belonolaimus* species; pine nematodes, *Bursaphelenchus xylophilus* and other *Bursaphelenchus* species; ring nematodes, *Criconema* species, *Criconemella* species, *Criconemoides* species, and *Mesocriconema* species; stem and bulb nematodes, *Ditylenchus destructor, Ditylenchus dipsaci, Ditylenchus myceliophagus* and other *Ditylenchus* species; awl nematodes, *Dolichodorus* species; spiral nematodes, *Helicotylenchus dihystera, Helicotylenchus multicinctus* and other *Helicotylenchus* species, *Rotylenchus robustus* and other *Rotylenchus* species, sheath nematodes, *Hemicycliophora* species and *Hemicriconemoides* species; *Hirshmanniella* species; lance nematodes, *Hoplolaimus columbus*, *Hoplolaimus galeatus* and other *Hoplolaimus* species; false root-knot nematodes, *Nacobbus aberrans* and other *Nacobbus* species; needle nematodes, *Longidorus elongates* and other *Longidorus* species; pin nematodes, *Paratylenchus* species; lesion nematodes, *Pratylenchus brachyurus*, *Pratylenchus coffeae*, *Pratylenchus curvitatus*, *Pratylenchus goodeyi*, *Pratylencus neglectus*, *Pratylenchus penetrans*, *Pratylenchus scribneri*, *Pratylenchus vulnus*, *Pratylenchus zeae* and other *Pratylenchus* species; *Radinaphelenchus cocophilus* and other *Radinaphelenchus* species, burrowing nematodes, *Radopholus similis* and other *Radopholus* species; reniform nematodes, *Rotylenchulus reniformis* and other *Rotylenchulus* species; *Scutellonema* species; stubby root nematodes, *Trichodorus primitivus* and other *Trichodorus* species; *Paratrichodorus minor* and other *Paratrichodorus* species; stunt nematodes, *Tylenchorhynchus claytoni*, *Tylenchorhynchus dubius* and other *Tylenchorhynchus* species and *Merlinius* species; citrus nematodes, *Tylenchulus semipenetrans* and other *Tylenchulus* species; dagger nematodes, *Xiphinema americanum*, *Xiphinema index*, *Xiphinema diversicaudatum* and other *Xiphinema* species; and other plant parasitic nematode species.

In an equally preferred embodiment, the present invention relates to a method for controlling animal pests (insects, acarids or nematodes), wherein the animal pests (insects, acarids or nematodes), their habitat, breeding grounds, their locus or the plants to be protected against animal pest (insects, acarids or nematodes) attack are treated with an effective amount of an inventive mixture comprising *B. subtilis* FB17 and at least one biopesticide II.

In general, "pesticidally effective amount" means the amount of the inventive mixtures or of compositions comprising the mixtures needed to achieve an observable effect on growth, including the effects of necrosis, death, retardation, prevention, and removal, destruction, or otherwise diminishing the occurrence and activity of the target organism. The pesticidally effective amount can vary for the various mixtures/compositions used in the invention. A pesticidally effective amount of the mixtures/compositions will also vary according to the prevailing conditions such as desired pesticidal effect and duration, weather, target species, locus, mode of application, and the like.

In an equally preferred embodiment, the present invention relates to a method for improving the health of plants, wherein the plants are treated with an effective amount of an inventive mixture.

The term "plant health effective amount" denotes an amount of the inventive mixtures, which is sufficient for achieving plant health effects as defined herein below. More exemplary information about amounts, ways of application and suitable ratios to be used is given below. Anyway, the skilled artisan is well aware of the fact that such an amount can vary in a broad range and is dependent on various factors, e.g. the treated cultivated plant or material and the climatic conditions.

Healthier plants are desirable since they result among others in better yields and/or a better quality of the plants or crops, specifically better quality of the harvested plant parts. Healthier plants also better resist to biotic and/or abiotic stress. A high resistance against biotic stresses in turn allows the person skilled in the art to reduce the quantity of pesticides applied and consequently to slow down the development of resistances against the respective pesticides.

It was therefore an object of the present invention to provide a pesticidal composition which solves the problems outlined above, and which should, in particular, improve the health of plants, in particular the yield of plants.

The term "health of a plant" or "plant health" is defined as a condition of the plant and/or its products which is determined by several aspects alone or in combination with each other such as increased yield, plant vigor, quality of harvested plant parts and tolerance to abiotic and/or biotic stress.

It has to be emphasized that the above mentioned effects of the inventive mixtures, i.e. enhanced health of the plant, are also present when the plant is not under biotic stress and in particular when the plant is not under pest pressure.

For seed treatment e.g. as inoculant and/or foliar application forms, it is evident that a plant suffering from fungal or insecticidal attack produces a smaller biomass and leads to a reduced yield as compared to a plant which has been subjected to curative or preventive treatment against the pathogenic fungus or any other relevant pest and which can grow without the damage caused by the biotic stress factor. However, the methods according to the invention lead to an enhanced plant health even in the absence of any biotic stress. This means that the positive effects of the mixtures of the invention cannot be explained just by the pesticidal activities of the compounds (I) and (II), but are based on further activity profiles. Accordingly, the application of the inventive mixtures can also be carried out in the absence of pest pressure.

Each plant health indicator listed below, which is selected from the groups consisting of yield, plant vigor, quality and tolerance of the plant to abiotic and/or biotic stress, is to be understood as a preferred embodiment of the present invention either each on its own or preferably in combination with each other.

According to the present invention, "increased yield" of a plant means that the yield of a product of the respective plant is increased by a measurable amount over the yield of the same product of the plant produced under the same conditions, but without the application of the inventive mixture.

For seed treatment e.g. as inoculant and/or foliar application forms, increased yield can be characterized, among others, by the following improved properties of the plant: increased plant weight; and/or increased plant height; and/or increased biomass such as higher overall fresh weight (FW); and/or increased number of flowers per plant; and/or higher grain and/or fruit yield; and/or more tillers or side shoots (branches); and/or larger leaves; and/or increased shoot growth; and/or increased protein content; and/or increased oil content; and/or increased starch content; and/or increased pigment content; and/or increased chlorophyll content (chlorophyll content has a positive correlation with the plant's photosynthesis rate and accordingly, the higher the chlorophyll content the higher the yield of a plant) and/or increased quality of a plant.

"Grain" and "fruit" are to be understood as any plant product which is further utilized after harvesting, e.g. fruits in the proper sense, vegetables, nuts, grains, seeds, wood (e.g. in the case of silviculture plants), flowers (e.g. in the case of gardening plants, ornamentals) etc., that is anything of economic value that is produced by the plant.

According to the present invention, the yield is increased by at least 4%. In general, the yield increase may even be higher, for example 5 to 10%, more preferable by 10 to 20%, or even 20 to 30%

According to the present invention, the yield if measured in the absence of pest pressure—is increased by at least 2%

In general, the yield increase may even be higher, for example until 4% to 5% or even more.

Another indicator for the condition of the plant is the plant vigor. The plant vigor becomes manifest in several aspects such as the general visual appearance.

For foliar applications, improved plant vigor can be characterized, among others, by the following improved properties of the plant: improved vitality of the plant; and/or improved plant growth; and/or improved plant development; and/or improved visual appearance; and/or improved plant stand (less plant verse/lodging and/or bigger leaf blade; and/or bigger size; and/or increased plant height; and/or increased tiller number; and/or increased number of side shoots; and/or increased number of flowers per plant; and/or increased shoot growth; and/or enhanced photosynthetic activity (e.g. based on increased stomatal conductance and/or increased CO2 assimilation rate)); and/or earlier flowering; and/or earlier fruiting; and/or earlier grain maturity; and/or less non-productive tillers; and/or less dead basal leaves; and/or less input needed (such as fertilizers or water); and/or greener leaves; and/or complete maturation under shortened vegetation periods; and/or easier harvesting; and/or faster and more uniform ripening; and/or longer shelf-life; and/or longer panicles; and/or delay of senescence; and/or stronger and/or more productive tillers; and/or better extractability of ingredients; and/or improved quality of seeds (for being seeded in the following seasons for seed production); and/or reduced production of ethylene and/or the inhibition of its reception by the plant.

Another indicator for the condition of the plant is the "quality" of a plant and/or its products. According to the present invention, enhanced quality means that certain plant characteristics such as the content or composition of certain ingredients are increased or improved by a measurable or noticeable amount over the same factor of the plant produced under the same conditions, but without the application of the mixtures of the present invention. Enhanced quality can be characterized, among others, by following improved properties of the plant or its product: increased nutrient content; and/or increased protein content; and/or increased oil content; and/or increased starch content; and/or increased content of fatty acids; and/or increased metabolite content; and/or increased carotenoid content; and/or increased sugar content; and/or increased amount of essential amino acids; and/or improved nutrient composition; and/or improved protein composition; and/or improved composition of fatty acids; and/or improved metabolite composition; and/or improved carotenoid composition; and/or improved sugar composition; and/or improved amino acids composition; and/or improved or optimal fruit color; and/or improved leaf color; and/or higher storage capacity; and/or better processability of the harvested products.

Another indicator for the condition of the plant is the plant's tolerance or resistance to biotic and/or abiotic stress factors. Biotic and abiotic stress, especially over longer terms, can have harmful effects on plants.

Biotic stress is caused by living organisms while abiotic stress is caused for example by environmental extremes. According to the present invention, "enhanced tolerance or resistance to biotic and/or abiotic stress factors" means (1.) that certain negative factors caused by biotic and/or abiotic stress are diminished in a measurable or noticeable amount as compared to plants exposed to the same conditions, but without being treated with an inventive mixture and (2.) that the negative effects are not diminished by a direct action of the inventive mixture on the stress factors, e.g. by its fungicidal or insecticidal action which directly destroys the microorganisms or pests, but rather by a stimulation of the plants' own defensive reactions against said stress factors.

Negative factors caused by biotic stress such as pathogens and pests are widely known and are caused by living organisms, such as competing plants (for example weeds), microorganisms (such as phythopathogenic fungi and/or bacteria) and/or viruses.

Negative factors caused by abiotic stress are also well-known and can often be observed as reduced plant vigor (see above), for example:

less yield and/or less vigor, for both effects examples can be burned leaves, less flowers, pre-mature ripening, later crop maturity, reduced nutritional value amongst others.

Abiotic stress can be caused for example by: extremes in temperature such as heat or cold (heat stress/cold stress); and/or strong variations in temperature; and/or temperatures unusual for the specific season; and/or drought (drought stress); and/or extreme wetness; and/or high salinity (salt stress); and/or radiation (for example by increased UV radiation due to the decreasing ozone layer); and/or increased ozone levels (ozone stress); and/or organic pollution (for example by phythotoxic amounts of pesticides); and/or inorganic pollution (for example by heavy metal contaminants).

As a result of biotic and/or abiotic stress factors, the quantity and the quality of the stressed plants decrease. As far as quality (as defined above) is concerned, reproductive development is usually severely affected with consequences on the crops which are important for fruits or seeds. Synthesis, accumulation and storage of proteins are mostly affected by temperature; growth is slowed by almost all types of stress; polysaccharide synthesis, both structural and storage is reduced or modified: these effects result in a decrease in biomass (yield) and in changes in the nutritional value of the product.

As pointed out above, the above identified indicators for the health condition of a plant may be interdependent and may result from each other. For example, an increased resistance to biotic and/or abiotic stress may lead to a better plant vigor, e.g. to better and bigger crops, and thus to an increased yield. Inversely, a more developed root system may result in an increased resistance to biotic and/or abiotic stress. However, these interdependencies and interactions are neither all known nor fully understood and therefore the different indicators are described separately.

In one embodiment the inventive mixtures effectuate an increased yield of a plant or its product. In another embodiment the inventive mixtures effectuate an increased vigor of a plant or its product. In another embodiment the inventive mixtures effectuate in an increased quality of a plant or its product. In yet another embodiment the inventive mixtures effectuate an increased tolerance and/or resistance of a plant or its product against biotic stress. In yet another embodiment the inventive mixtures effectuate an increased tolerance and/or resistance of a plant or its product against abiotic stress.

The invention also relates to agrochemical compositions comprising an auxiliary and *Bacillus subtilis* strain FB17, or a cell-free extract thereof or at least one metabolite thereof, and/or a mutant of *Bacillus subtilis* FB17 having all the identifying characteristics thereof or extract of the mutant, and at least one biopesticide II according to the invention.

An agrochemical composition comprises a fungicidally or insecticidally effective amount of *Bacillus subtilis* strain FB17, or a cell-free extract thereof or at least one metabolite thereof, and/or a mutant of *Bacillus subtilis* FB17 having all the identifying characteristics thereof or extract of the mutant, and at least one biopesticide II. The term "effective amount" denotes an amount of the composition or of *Bacillus subtilis* strain FB17, or a cell-free extract thereof or at least one metabolite thereof, and/or a mutant of *Bacillus subtilis* FB17 having all the identifying characteristics thereof or extract of the mutant, and at least one biopesticide II, which is sufficient for promoting plant health, controlling harmful fungi or harmful pests on cultivated plants or in the protection of materials and which does not result in a substantial damage to the treated plants or materials. Such an amount can vary in a broad range and is dependent on various factors, such as the fungal or pest species to be controlled, the treated cultivated plant or material, the climatic conditions.

The *Bacillus subtilis* strain FB17, or a cell-free extract thereof or at least one metabolite thereof, and/or a mutant of *Bacillus subtilis* FB17 having all the identifying characteristics thereof or extract of the mutant, and at least one biopesticide II can be converted into customary types of agrochemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Monograph No. 2, $6^{th}$ Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compound I on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones. Suitable anti-freezing agents are ethylene glycol, propylene glycol, urea and glycerin. Suitable anti-foaming agents are silicones, long chain alcohols, and salts of fatty acids. Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants). Suitable tackifiers or binders are polyvinylpyrrolidons, polyvinylacetates, polyvinyl alcohols, polyacrylates, biological or synthetic waxes, and cellulose ethers.

Herein, it has to be taken into account that each formulation type or choice of auxiliary should not influence the viability of the microorganism, if finally applied to the plant or plant propagation material. As referenced above, a suitable formulation of component 1) is referenced in WO 2008/002371.

Examples for composition types and their preparation are:
i) Water-Soluble Concentrates (SL, LS)

10-60 wt % of a compound I and 5-15 wt % wetting agent (e.g. alcohol alkoxylates) are dissolved in water and/or in a water-soluble solvent (e.g. alcohols) ad 100 wt %. The active substance dissolves upon dilution with water.

ii) Dispersible Concentrates (DC)

5-25 wt % of a compound I and 1-10 wt % dispersant (e. g. polyvinylpyrrolidone) are dissolved in organic solvent (e.g. cyclohexanone) ad 100 wt %. Dilution with water gives a dispersion.

iii) Emulsifiable Concentrates (EC)

15-70 wt % of a compound I and 5-10 wt % emulsifiers (e.g. calcium dodecylbenzenesulfonate and castor oil ethoxylate) are dissolved in water-insoluble organic solvent (e.g. aromatic hydrocarbon) ad 100 wt %. Dilution with water gives an emulsion.

iv) Emulsions (EW, EO, ES)

5-40 wt % of a compound I and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into water ad 100 wt % by means of an emulsifying machine and made into a homogeneous emulsion. Dilution with water gives an emulsion.

v) Suspensions (SC, OD, FS)

In an agitated ball mill, 20-60 wt % of a compound I are comminuted with addition of 2-10 wt % dispersants and wetting agents (e.g. sodium lignosulfonate and alcohol ethoxylate), 0.1-2 wt % thickener (e.g. xanthan gum) and water ad 100 wt % to give a fine active substance suspension. Dilution with water gives a stable suspension of the active substance. For FS type composition up to 40 wt % binder (e.g. polyvinylalcohol) is added.

vi) Water-Dispersible Granules and Water-Soluble Granules (WG, SG)

50-80 wt % of a compound I are ground finely with addition of dispersants and wetting agents (e.g. sodium lignosulfonate and alcohol ethoxylate) ad 100 wt % and prepared as water-dispersible or water-soluble granules by means of technical appliances (e. g. extrusion, spray tower, fluidized bed). Dilution with water gives a stable dispersion or solution of the active substance.

vii) Water-Dispersible Powders and Water-Soluble Powders (WP, SP, WS)

50-80 wt % of a compound I are ground in a rotor-stator mill with addition of 1-5 wt % dispersants (e.g. sodium lignosulfonate), 1-3 wt % wetting agents (e.g. alcohol ethoxylate) and solid carrier (e.g. silica gel) ad 100 wt %. Dilution with water gives a stable dispersion or solution of the active substance.

viii) Gel (GW, GF)

In an agitated ball mill, 5-25 wt % of a compound I are comminuted with addition of 3-10 wt % dispersants (e.g. sodium lignosulfonate), l-5 wt % thickener (e.g. carboxymethylcellulose) and water ad 100 wt % to give a fine suspension of the active substance. Dilution with water gives a stable suspension of the active substance.

ix) Microemulsion (ME)

5-20 wt % of a compound I are added to 5-30 wt % organic solvent blend (e.g. fatty acid dimethylamide and cyclohexanone), 10-25 wt % surfactant blend (e.g. alcohol ethoxylate and arylphenol ethoxylate), and water ad 100%. This mixture is stirred for 1 h to produce spontaneously a thermodynamically stable microemulsion.

x) Microcapsules (CS)

An oil phase comprising 5-50 wt % of a compound I, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a compound I according to the invention, 0-40 wt % water insoluble organic solvent (e.g. aromatic hydrocarbon), and an isocyanate monomer (e.g. diphenylmethene-4, 4'-diisocyanatae) are dispersed into an aqueous solution of a protective colloid (e.g. polyvinyl alcohol). The addition of a polyamine (e.g. hexamethylenediamine) results in the formation of polyurea microcapsules. The monomers amount to 1-10 wt %. The wt % relate to the total CS composition.

xi) Dustable Powders (DP, DS)

1-10 wt % of a compound I are ground finely and mixed intimately with solid carrier (e.g. finely divided kaolin) ad 100 wt %.

xii) Granules (GR, FG)

0.5-30 wt % of a compound I is ground finely and associated with solid carrier (e.g. silicate) ad 100 wt %. Granulation is achieved by extrusion, spray-drying or fluidized bed.

xiii) Ultra-Low Volume Liquids (UL)

1-50 wt % of a compound I are dissolved in organic solvent (e.g. aromatic hydrocarbon) ad 100 wt %.

The compositions types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The compositions types i) to vii) may optionally comprise further auxiliaries, such as 0.1-1 wt % bactericides, 5-15 wt % anti-freezing agents, 0.1-1 wt % anti-foaming agents, 0.1-80% stabilizers or nutrients, 0.1-10% UV protectants and 0.1-1 wt % colorants.

The compositions types i) to xi) may optionally comprise further auxiliaries, such as 0.1-1 wt % bactericides, 5-15 wt % anti-freezing agents, 0.1-1 wt % anti-foaming agents, and 0.1-1 wt % colorants.

Microbial pesticides comprising (entomopathogenic) nematodes can be mass prepared as for use as biopesticides using in vivo or in vitro methods (Shapiro-Ilan and Gaugler 2002). In vivo production (culture in live insect hosts) requires a low level of technology, has low startup costs, and resulting nematode quality is generally high, yet cost efficiency is low. The approach can be considered ideal for small markets. In vivo production may be improved through innovations in mechanization and streamlining. A novel alternative approach to in vivo methodology is production and application of nematodes in infected host cadavers; the cadavers (with nematodes developing inside) are distributed directly to the target site and pest suppression is subsequently achieved by the infective juveniles that emerge. In vitro solid culture, i.e., growing the nematodes on crumbled polyurethane foam, offers an intermediate level of technology and costs. In vitro liquid culture is the most cost-efficient production method but requires the largest startup capital. Liquid culture may be improved through progress in media development, nematode recovery, and bioreactor design. A variety of formulations have been developed to facilitate nematode storage and application including activated charcoal, alginate and polyacrylamide gels, baits, clay, paste, peat, polyurethane sponge, vermiculite, and water-dispersible granules. Depending on the formulation and nematode species, successful storage under refrigeration ranges from one to seven months. Optimum storage temperature for formulated nematodes varies according to species; generally, steinernematids tend to store best at 4-8° C. whereas heterorhabditids persist better at 10-15° C. Nematodes are formulated and applied as infective juveniles, the only free-living and therefore environmentally tolerant stage. Infective juveniles range from 0.4 to 1.5 mm in length and can be observed with a hand lens or microscope after separation from formulation materials. Disturbed nematodes move actively, however sedentary ambusher species (e.g. *Steinernema carpocapsae, S. scapterisci*) in water soon revert to a characteristic "J"-shaped resting position. Low temperature or oxygen levels will inhibit movement of even active cruiser species (e.g., *S. glaseri, Heterorhabditis bacteriophora*). In short, lack of movement is not always a sign of mortality; nematodes may have to be stimulated (e.g., probes, acetic acid, gentle heat) to move before assessing viability. Good quality nematodes tend to possess high lipid levels that provide a dense appearance, whereas nearly transparent nematodes are often active but possess low powers of infection. Infective juveniles are compatible with most but not all agricultural chemicals under field conditions. Compatibility has been tested with well over 100 different chemical pesticides. Entomopathogenic nematodes are compatible (e.g., may be tank-mixed) with most chemical herbicides and fungicides as well as many insecticides (such as bacterial or fungal products) (Koppenhöfer and Grewal, 2005).

According to the invention, the solid material (dry matter) of the Quillay extract and the biopesticides (with the exception of oils such as Neem oil, Tagetes oil, etc.) are considered as active components (e.g. to be obtained after drying or evaporation of the extraction medium or the suspension medium in case of liquid formulations of the microbial pesticides).

In accordance with the present invention, the weight ratios and percentages used herein for biological extract such as Quillay extract are based on the total weight of the dry content (solid material) of the respective extract(s).

For microbial pesticides II selected from groups A'), C') and E') and for the *Bacillus subtilis* strain FB 17, weight ratios and/or percentages refer to the total weight of a preparation of the respective biopesticide II with at least $1 \times 10^6$ CFU/g ("colony forming units per gram total weight"), preferably with at least $1 \times 10^8$ CFU/g, even more preferably from $1 \times 10^8$ to $1 \times 10^{12}$ CFU/g dry matter. Colony forming unit is measure of viable microbial cells, in particular fungal and bacterial cells. In addition, here CFU may also be understood as number of (juvenile) individual nematodes in case of (entomopathogenic) nematode biopesticides, such as *Steinernema feltiae*.

In the binary mixtures and compositions according to the invention the weight ratio of the component 1) and the component 2) generally depends from the properties of the active components used, usually it is in the range of from 1:100 to 100:1, regularly in the range of from 1:50 to 50:1, preferably in the range of from 1:20 to 20:1, more preferably in the range of from 1:10 to 10:1, even more preferably in the range of from 1:4 to 4:1 and in particular in the range of from 1:2 to 2:1.

According to further embodiments of the binary mixtures and compositions, the weight ratio of the component 1) and the component 2) usually is in the range of from 100:1 to 1:1, regularly in the range of from 50:1 to 1:1, preferably in the range of from 20:1 to 1:1, more preferably in the range of from 10:1 to 1:1, even more preferably in the range of from 4:1 to 1:1 and in particular in the range of from 2:1 to 1:1.

According to further embodiments of the binary mixtures and compositions, the weight ratio of the component 1) and the component 2) usually is in the range of from 1:1 to 1:100, regularly in the range of from 1:1 to 1:50, preferably in the range of from 1:1 to 1:20, more preferably in the range of from 1:1 to 1:10, even more preferably in the range of from 1:1 to 1:4 and in particular in the range of from 1:1 to 1:2.

These ratios are suitable for inventive mixtures applied by seed treatment.

Herein, microbial pesticides II selected from groups A'), C') and E') and the *Bacillus subtilis* strain FB 17 may be supplied in any physiological state such as active or dormant. Such dormant active component may be supplied for example frozen, dried, or lyophilized or partly desiccated (procedures to produce these partly desiccated organisms are given in WO2008/002371) or in form of spores.

Microbial pesticides II selected from groups A'), C') and E') and the *Bacillus subtilis* strain FB 17 used as organism in an active state can be delivered in a growth medium without any additional additives or materials or in combination with suitable nutrient mixtures.

*Bacillus subtilis* FB17 is preferably delivered and formulated in a dormant stage, more preferably in form of spores.

In the ternary mixtures, i.e. compositions according to the invention comprising the component 1) and component 2) and a compound III (component 3), the weight ratio of component 1) and component 2) depends from the properties of the active substances used, usually it is in the range of from 1:100 to 100:1, regularly in the range of from 1:50 to 50:1, preferably in the range of from 1:20 to 20:1, more preferably in the range of from 1:10 to 10:1 and in particular in the range of from 1:4 to 4:1, and the weight ratio of component 1) and component 3) usually it is in the range of from 1:100 to 100:1, regularly in the range of from 1:50 to 50:1, preferably in the range of from 1:20 to 20:1, more preferably in the range of from 1:10 to 10:1 and in particular in the range of from 1:4 to 4:1.

Any further active components are, if desired, added in a ratio of from 20:1 to 1:20 to the component 1).

In the mixtures and compositions, the compound ratios are advantageously chosen so as to produce a synergistic effect.

The total weight ratios of compositions wherein component 2) is selected from groups A'), C'), or E') can be determined based on the total weight of the solid material (dry matter) of component 1) and using the amount of CFU of component 2) to calculate the total weight of component 2) with the following equation that $1 \times 10^9$ CFU equals one gram of total weight of component 2).

The agrochemical compositions generally are characterized in that they contain an effective quantity of the active components as defined above. Generally, they contain between 0.01 and 95%, preferably between 0.1 and 90%, and in particular between 0.5 and 75%, by weight of active components.

According to one embodiment, the compositions, wherein component 2) is selected from groups A'), C') and E'), comprise between 0.01 and 90% (w/w) of dry matter (solid material) of component 1) and from $1 \times 10^5$ CFU to $1 \times 10^{12}$ CFU of component 2) per gram total weight of the composition.

According to another embodiment, the compositions, wherein component 2) is selected from groups A'), C') and E'), comprise between 5 and 70% (w/w) of dry matter (solid material) of component 1) and from $1 \times 10^6$ CFU to $1 \times 10^{10}$ CFU of component 2) per gram total weight of the composition.

According to another embodiment, the compositions, wherein component 2) is selected from groups A'), C') and E'), comprise between 25 and 70% (w/w) of dry matter (solid material) of component 1) and from $1 \times 10^7$ CFU to $1 \times 10^9$ CFU of component 2) per gram total weight of the composition.

Solutions for seed treatment (LS), suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds.

Preferred examples of seed treatment formulation types or soil application for pre-mix compositions are of WS, LS, ES, FS, WG or CS-type.

The compositions in question give, after two-to-tenfold dilution, active components concentrations of from 0.01 to 60% by weight, preferably from 0.1 to 40%, in the ready-to-use preparations. Application can be carried out before or during sowing. Methods for applying or treating *B. subtilis* FB17 and biopesticide II and compositions thereof, respectively, on to plant propagation material, especially seeds include dressing, coating, pelleting, dusting, soaking and in-furrow application methods of the propagation material. Preferably, *B. subtilis* FB17 and biopesticide II or the compositions thereof, respectively, are applied on to the plant propagation material by a method such that germination is not induced, e. g. by seed dressing, pelleting, coating and dusting.

Typically, a pre-mix formulation for seed treatment application comprises 0.5 to 99.9 percent, especially 1 to 95 percent, of the desired ingredients, and 99.5 to 0.1 percent, especially 99 to 5 percent, of a solid or liquid adjuvant (including, for example, a solvent such as water), where the auxiliaries can be a surfactant in an amount of 0 to 50 percent, especially 0.5 to 40 percent, based on the pre-mix formulation. Whereas commercial products will preferably be formulated as concentrates (e.g., pre-mix composition (formulation)), the end user will normally employ dilute formulations (e.g., tank mix composition).

Seed treatment methods for applying or treating inventive mixtures and compositions thereof to plant propagation material, especially seeds, are known in the art, and include dressing, coating, filmcoating, pelleting and soaking application methods of the propagation material. Such methods are also applicable to the combinations according to the invention. In a preferred embodiment, the inventive mixture is applied or treated on to the plant propagation material by a method such that the germination is not negatively impacted. Accordingly, examples of suitable methods for applying (or treating) a plant propagation material, such as a seed, is seed dressing, seed coating or seed pelleting and alike.

It is preferred that the plant propagation material is a seed, seed piece (i.e. stalk) or seed bulb.

Although it is believed that the present method can be applied to a seed in any physiological state, it is preferred that the seed be in a sufficiently durable state that it incurs no damage during the treatment process. Typically, the seed would be a seed that had been harvested from the field; removed from the plant; and separated from any cob, stalk, outer husk, and surrounding pulp or other non-seed plant material. The seed would preferably also be biologically stable to the extent that the treatment would cause no biological damage to the seed. It is believed that the treatment can be applied to the seed at any time between harvest of the seed and sowing of the seed or during the sowing process (seed directed applications). The seed may also be primed either before or after the treatment.

Even distribution of the ingredients in inventive mixtures and adherence thereof to the seeds is desired during propagation material treatment. Treatment could vary from a thin film (dressing) of the formulation containing the combination, for example, a mixture of active ingredient(s), on a plant propagation material, such as a seed, where the original size and/or shape are recognizable to an intermediary state (such as a coating) and then to a thicker film (such as pelleting with many layers of different materials (such as carriers, for example, clays; different formulations, such as of other active ingredients; polymers; and colourants) where the original shape and/or size of the seed is no longer recognizable.

An aspect of the present invention includes application of the inventive mixtures onto the plant propagation material in a targeted fashion, including positioning the ingredients in the combination onto the entire plant propagation material or on only parts thereof, including on only a single side or a portion of a single side. One of ordinary skill in the art would understand these application methods from the description provided in EP 954213 B1 and WO 06/112700.

The inventive mixtures can also be used in form of a "pill" or "pellet" or a suitable substrate and placing, or sowing, the treated pill, or substrate, next to a plant propagation material. Such techniques are known in the art, particularly in EP 1124414, WO 07/67042, and WO 07/67044. Application of the combinations described herein onto plant propagation material also includes protecting the plant propagation material treated with the combination of the present invention by placing one or more pesticide-containing particles next to a pesticide-treated seed, wherein the amount of pesticide is such that the pesticide-treated seed and the pesticide-containing particles together contain an Effective Dose of the pesticide and the pesticide dose contained in the pesticide-treated seed is less than or equal to the Maximal Non-Phytotoxic Dose of the pesticide. Such techniques are known in the art, particularly in WO 2005/120226.

Application of the combinations onto the seed also includes controlled release coatings on the seeds, wherein the ingredients of the combinations are incorporated into materials that release the ingredients over time. Examples of controlled release seed treatment technologies are generally known in the art and include polymer films, waxes, or other seed coatings, wherein the ingredients may be incorporated into the controlled release material or applied between layers of materials, or both.

Seed can be treated by applying thereto the compound s present in the inventive mixtures in any desired sequence or simultaneously.

The seed treatment occurs to an unsown seed, and the term "unsown seed" is meant to include seed at any period between the harvest of the seed and the sowing of the seed in the ground for the purpose of germination and growth of the plant.

Treatment to an unsown seed is not meant to include those practices in which the active ingredient is applied to the soil but would include any application practice that would target the seed during the planting process.

Preferably, the treatment occurs before sowing of the seed so that the sown seed has been pre-treated with the combination. In particular, seed coating or seed pelleting are preferred in the treatment of the combinations according to the invention. As a result of the treatment, the ingredients in each combination are adhered on to the seed and therefore available for pest control.

The treated seeds can be stored, handled, sowed and tilled in the same manner as any other active ingredient treated seed.

When employed in plant protection, the total amounts of active components applied are, depending on the kind of effect desired, from 0.001 to 10 kg per ha, preferably from 0.005 to 2 kg per ha, more preferably from 0.05 to 0.9 kg per ha, in particular from 0.1 to 0.75 kg per ha. In the case of Bacillus strain FB 17 and microbial pesticides II, the application rates preferably range from about $1 \times 10^6$ to $5 \times 10^{15}$ (or more) CFU/ha. Preferably, the spore concentration is about $1 \times 10^7$ to about $1 \times 10^{11}$ CFU/ha. In the case of (entomopathogenic) nematodes as microbial pesticides (e.g. *Steinernema feltiae*), the application rates preferably range inform about $1 \times 10^5$ to $1 \times 10^{12}$ (or more), more preferably from $1 \times 10^8$ to $1 \times 10^{11}$, even more preferably from $5 \times 10^8$ to $1 \times 10^{10}$ individuals (e.g. in the form of eggs, juvenile or any other live stages, preferably in an infective juvenile stage) per ha.

When employed in plant protection by seed treatment, the amount of the inventive mixtures (based on total weight of active components) is in the range from 0.01-10 kg, preferably from 0.1-1000 g, more preferably from 1-100 g per 100 kilogram of plant propagation material (preferably seeds). In the case of *Bacillus subtilis* FB17 and microbial pesticides II, the application rates with respect to plant propagation material preferably range from about $1 \times 10^6$ to $1 \times 10^{12}$ (or more) CFU/seed. Preferably, the concentration is about $1 \times 10^6$ to about $1 \times 10^{11}$ CFU/seed. In the case of *Bacillus subtilis* FB17 and microbial pesticides II, the application rates with respect to plant propagation material also preferably range from about $1 \times 10^7$ to $1 \times 10^{14}$ (or more) CFU per 100 kg of seed, preferably from $1 \times 10^9$ to about $1 \times 10^{11}$ CFU per 100 kg of seed.

When used in the protection of materials or stored products, the amount of active components applied depends on the kind of application area and on the desired effect. Amounts customarily applied in the protection of materials are 0.001 g to 2 kg, preferably 0.005 g to 1 kg, of active components per cubic meter of treated material.

Various types of oils, wetters, adjuvants, fertilizer, or micronutrients, and further pesticides (e.g. herbicides, insecticides, fungicides, growth regulators, safeners) may be added to the mixtures or the compositions comprising them as premix or, if appropriate not until immediately prior to use (tank mix). These agents can be admixed with the compositions according to the invention in a weight ratio of 1:100 to 100:1, preferably 1:10 to 10:1.

These further useful active compounds can be fertilizers or micronutrient donors (such as Mo, Zn and/or Co), especially when applied to plant propagation materials.

According to one embodiment, a polyether polymethylsiloxane copolymer may be added to the composition according to the invention, preferably in a weight ratio of 1:100 to 100:1, more preferably in a weight ratio of 1:10 to 10:1, in particular in a weight ratio of 1:5 to 5:1 based on the total weight of the component 1) and the component 2).

According to a further embodiment, a mineral oil or a vegetable oil may be added to the composition according to the invention, preferably in a weight ratio of 1:100 to 100:1, more preferably in a weight ratio of 1:10 to 10:1, in particular in a weight ratio of 1:5 to 5:1 based on the total weight of the dry content of *Bacillus subtilis* strain FB17, or a cell-free extract thereof or at least one metabolite thereof, and/or a mutant of *Bacillus subtilis* FB17 having all the identifying characteristics thereof or extract of the mutant, and at least one biopesticide II together.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank and further auxiliaries may be added, if appropriate.

The term "synergstic effect" is understood to refer in particular to that defined by Colby's formula (Colby, S. R., "Calculating synergistic and antagonistic responses of herbicide combinations", Weeds, 15, pp. 20-22, 1967).

The term "synergistic effect" is also understood to refer to that defined by application of the Tammes method, (Tammes, P. M. L., "Isoboles, a graphic representation of synergism in pesticides", Netherl. J. Plant Pathol. 70, 1964).

The fungicidal action of the mixtures according to the invention can be shown by the tests described below.

A) Microtiter Plate Tests

If applicable, the chemical pesticides were formulated separately as a stock solution having a concentration of 10000 ppm in dimethyl sulfoxide. The stock solutions of the chemical pesticides were mixed according to the ratio, diluted to the stated concentrations and pipetted onto a filter micro titer plate (MTP).

A spore suspension of the pathogen (e.g. *Botrytis cinerea, Septoria tritici*, etc.) in e.g. aqueous biomalt solution was added as well as different concentrations of spores or cells of the respective biopesticide II and/or *Bacillus subtilis* FB17. The plates were incubated at optimal temperature depending on the pathogen and further processed 1-7 days after incubation. The supernatant was removed using CaptiVac Vacuum Collar and a vacuum filter pump. The remaining cell pellet was resolved in water and DNA was extracted. The growth of the pathogen was quantified via quantitative Real Time PCR using species- or strain-specific primers. To assess synergistic effects growth of the fungal pathogens was calculated in comparison to the different controls containing either the chemical pesticide or the microbial pesticide alone.

The measured parameters were compared to the growth of the active component-free control variant (100%) and the fungus-free and active compound-free blank value to determine the relative growth in % of the pathogens in the respective active compounds.

The expected efficacies of active compound combinations were determined using Colby's formula (Colby, S. R., Calculating synergistic and antagonistic responses of herbicide combinations, Weeds, 15, pp. 20-22, 1967) and compared with the observed efficacies.

$$E=x+y-x\cdot y/100 \quad \text{Colby's formula:}$$

E expected efficacy, expressed in % of the untreated control, when using the mixture of the active component A (*B. subtilis* FB17) and B (e.g. biopesticide II) at the concentrations a and b x efficacy, expressed in % of the untreated control, when using the active component A at the concentration a y efficacy, expressed in % of the untreated control, when using the active component B at the concentration b.

USE EXAMPLE FM-1

Activity Against *Septoria tritici*, the Causal Agent of Leaf Blotch on Wheat

A spore suspension of *Septoria tritici* in an aqueous biomalt solution was used. The plates were placed in a water vapor-saturated chamber at a temperature of 18° C.
B) Greenhouse Tests If applicable, the chemical pesticides (e.g. compounds III) were formulated separately or together as a stock solution comprising 25 mg of active substance which was made up to 10 ml using a mixture of acetone and/or dimethyl sulfoxide (DMSO) and the emulsifier Wettol EM 31 (wetting agent having emulsifying and dispersing action based on ethoxylated alkylphenols) in a volume ratio of solvent/emulsifier of 99 to 1. This solution was then made up to 100 ml using water. This stock solution was diluted with the solvent/emulsifier/water mixture described to the active substance concentration given below. The microbial pesticides (e.g. biopesticide II and *B. subtilis* FB17) were cultivated as described herein and was diluted with water to the concentration given below.

USE EXAMPLE FG-1

Activity Against Early Blight on Tomatoes Caused by *Phytophthora infestans* with Protective Application Young seedlings of tomato plants were grown in pots. The plants were sprayed to runoff with an aqueous suspension containing the concentration of chemical pesticide stated below. Simultaneously or up to 6 hours later, the plants were sprayed with an aqueous suspension containing the concentration of the microbial pesticide (e.g. biopesticide II and/or *B. subtilis* FB17) stated below. The next day, the treated plants were inoculated with an aqueous suspension of sporangia of *Phytophthora infestans*. After inoculation, the trial plants were immediately transferred to a humid chamber. After 6 days at 18 to 20° C. and a relative humidity close to 100%, the extent of fungal attack on the leaves was visually assessed as % diseased leaf area.

The plant health effect of the compositions according to the invention can be shown by the experiment described below.

USE EXAMPLE H-1

Action Against Drought Stress

Drought stress tolerance can be tested e.g. on duckweed plants grown in 24-well microplates according to the method disclosed J. Plant Growth Regul. 30, 504-511 (2011).

The measured parameters were compared to the growth of the active compound-free control variant under drought stress (e.g. PEG treatment) (0%) and the active compound-free blank value without drought stress (e.g. PEG-fee) (100%) to determine the relative growth in % in the respective active compounds. The expected efficacies of active compound combinations were determined using Colby's formula as described above.

USE EXAMPLE H-2

Action to Improve Yield

In field trials in Canada, *Bacillus subtilis* FB17 was tested in lentils for plant health effects as solo product and in combination with a rhizobial strain *Rhizobium leguminosarum* bv. *viciae* P1NP3Cst (also referred to as strain 1435).

The Canadian lentil trials were executed in 2013 at Asquith (SK), Saskatoon (SK), Pike Lake (SK), Grandora (SK), Lethbridge (AB), Medicine Hat (AB), as a randomized block design in plots with a size of 10.5 m² (1.5 m×7 m) using normal trial equipment for field trials. The used variety is cultivar CDC Maxim pre-treated with a standard chemical seed treatment and for each treatment 6 replications were made.

On about September 5$^{th}$, or thereabouts, the trials were harvested and the grain yield was measured in bushels per acre as an indicator for the plant health effect.

In the seed dressing application, *R. leguminosarum* bv. *viciae* was applied as commercial product either as Nodulator XL Liquid (about 7.5×10⁸ viable cells per ml; BASF Agricultural Specialties Ltd., Canada) at 7.5 litres per 100 bushels of seeds. *Bacillus subtilis* FB17 was applied as SC formulation to achieve 2.2×10⁵ cfu/seed (44 mL/100 kg seed). The application of the different products was done as a seed treatment (seed and product treated in a Ziploc bag) prior to planter box seeding. The seeds were treated by members of the field research group AgQuest Inc. (Minto, Manitoba) for studies conducted in Saskatchewan, and by Farming Smarter (Lethbridge, Alberta) for studies conducted in Alberta.

The measured yield was normalized on the basis of the control treatment (check) set to 100% resulting in relative yield. The relative yield difference was determined by subtracting relative yield of the control treatment (check).

The expected relative yield differences of active component combinations were determined using Colby's formula (Colby, S. R. "Calculating synergistic and antagonistic responses of herbicide combinations", Weeds 15, pp. 20-22, 1967) and compared with the observed yield.

$$E_{Colby}=P_A+P_B-P_A*P_B/100 \quad \text{Colby's formula:}$$

$E_{Colby}$ expected yield difference, expressed in % of the untreated control, when using the mixture of the active compounds A and B at the concentrations a and b $P_A$ yield difference, expressed in % of the untreated control (0%), when using the active compound A at the concentration a $P_B$ yield difference, expressed in % of the untreated control (0%), when using the active compound B at the concentration b.

TABLE 1

Relative grain yield of lentil with liquid seed treatment (2013)

| Product/Mix | Product rate per 100 bushels seeds | Observed relative yield difference | Calculated relative yield difference acc. to Colby |
|---|---|---|---|
| check | — | 0 (23.4 bushels/acre) | |
| Nodulator XL Liquid | 7.5 l | 13 | |
| B. subtilis FB17 | 400 ml | 5 | |
| Nodulator XL Liquid + B. subtilis FB17 | 7.5 l + 400 ml | 19 | 17 |

We claim:

1. A mixture comprising, as active components:
   1) *Bacillus subtilis* strain FB17;
   and
   2) at least one biopesticide II selected from the groups A') and E'):
      A') Microbial pesticides with fungicidal, bactericidal, viricidal and/or plant defense activator activity: *Bacillus amyloliquefaciens* ssp. *plantarum* MBI600;
      E') Microbial pesticides with plant stress reducing, plant growth regulator, plant growth promoting and/or yield enhancing activity: *Rhizobium leguminosarum* bv. *viciae*, which are present in a synergistically effective amount.

2. The mixture according to claim 1, wherein component 1) and component 2) are present in a total weight ratio of from 100:1 to 1:100 wherein the total weight of component 1) and component 2) are based on the amount of the solid material (dry matter) of component 1) and component 2) provided that component 2) is not an oil.

3. The mixture according to claim 1, wherein component 2) is selected from groups A') and E'), wherein component 1) and component 2) are present in a total weight ratio of from 100:1 to 1:100 wherein the total weight of component 1) is based on the amount of the solid material (dry matter) of component 1) and wherein the total weight of component 1) and component 2) are calculated on the basis of CFU, wherein $1 \times 10^9$ CFU equals one gram of total weight of component 2).

4. The mixture according to claim 1, wherein component 1) is *Bacillus subtilis* FB17 in form of spores.

5. The mixture according to claim 1, wherein component 2) is selected from group E').

6. An agrochemical composition, comprising an auxiliary and a mixture as defined in claim 1.

7. The agrochemical composition according to claim 6, further comprising as component 3) a further active component that is a pesticide III selected from groups A) to O):
   A) Respiration inhibitors
      Inhibitors of complex III at $Q_o$ site: azoxystrobin, coumethoxystrobin, coumoxystrobin, dimoxystrobin, enestroburin, fenaminstrobin, fenoxystrobin/flufenoxystrobin, fluoxastrobin, kresoxim-methyl, mandestrobine, metominostrobin, orysastrobin, picoxystrobin, pyraclostrobin, pyrametostrobin, pyraoxystrobin, trifloxystrobin and 2-(2-(3-(2,6-dichlorophenyl)-1-methyl-allylideneaminooxymethyl)-phenyl)-2-methoxyimino-N-methyl-acetamide, pyribencarb, triclopyricarb/chlorodincarb, famoxadone, fenamidone;
      inhibitors of complex III at $Q_i$ site: cyazofamid, amisulbrom, [(3S,6S,7R,8R)-8-benzyl-3-[(3-acetoxy-4-methoxy-pyridine-2-carbonyl)amino]-6-methyl-4,9-dioxo-1,5-dioxonan-7-yl] 2-methylpropanoate, [(3S,6S,7R,8R)-8-benzyl-3-[[3-(acetoxymethoxy)-4-methoxy-pyridine-2-carbonyl]amino]-6-methyl-4,9-dioxo-1,5-dioxonan-7-yl] 2-methylpropanoate, [(3S,6S,7R,8R)-8-benzyl-3-[(3-isobutoxycarbonyloxy-4-methoxy-pyridine-2-carbonyl)amino]-6-methyl-4,9-dioxo-1,5-dioxonan-7-yl] 2-methylpropanoate, [(3S,6S,7R,8R)-8-benzyl-3-[[3-1,3-benzodioxol-5-ylmethoxy)-4-methoxy-pyridine-2-carbonyl] amino]-6-methyl-4,9-dioxo-1,5-dioxonan-7-yl] 2-methylpropanoate; (3S,6S,7R,8R)-3-[[3-hydroxy-4-methoxy-2-pyridinyl)carbonyl]amino]-6-methyl-4,9-dioxo-8-(phenylmethyl)-1,5-dioxonan-7-yl 2-methylpropanoate
      inhibitors of complex II: benodanil, benzovindiflupyr, bixafen, boscalid, carboxin, fenfuram, fluopyram, flutolanil, fluxapyroxad, furametpyr, isofetamid, isopyrazam, mepronil, oxycarboxin, penflufen, penthiopyrad, sedaxane, tecloftalam, thifluzamide, N-(4'-trifluoromethylthiobiphenyl-2-yl)-3-difluoromethyl-1-methyl-1H-pyrazole-4-carboxamide, N-(2-(1,3,3-trimethyl-butyl)-phenyl)-1,3-dimethyl-5-fluoro-1H-pyrazole-4-carboxamide, 3-(difluoromethyl)-1-methyl-N-(1,1,3-trimethylindan-4-yl)pyrazole-4-carboxamide, 3-(trifluoromethyl)-1-methyl-N-(1,1,3-trimethylindan-4-yl)pyrazole-4-carboxamide, 1,3-dimethyl-N-(1,1,3-trimethylindan-4-yl)pyrazole-4-carboxamide, 3-(trifluoromethyl)-1,5-dimethyl-N-(1,1,3-trimethylindan-4-yl)pyrazole-4-carboxamide, 1,3,5-trimethyl-N-(1,1,3-trimethylindan-4-yl)pyrazole-4-carboxamide, N-(7-fluoro-1,1,3-trimethyl-indan-4-yl)-1,3-dimethyl-pyrazole-4-carboxamide, N-[2-(2,4-dichlorophenyl)-2-methoxy-1-methyl-ethyl]-3-(difluoromethyl)-1-methyl-pyrazole-4-carboxamide;
      other respiration inhibitors: diflumetorim, (5,8-difluoroquinazolin-4-yl)-{2-[2-fluoro-4-(4-trifluoromethylpyridin-2-yloxy)-phenyl]-ethyl}-amine; nitrophenyl derivates: binapacryl, dinobuton, dinocap, fluazinam; ferimzone; organometal compounds: fentin salts, fentin-acetate, fentin chloride or fentin hydroxide; ametoctradin; and silthiofam;
   B) Sterol biosynthesis inhibitors (SBI fungicides)
      C14 demethylase inhibitors (DMI fungicides): triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, 1-[rel-(2S;3R)-3-(2-chlorophenyl)-2-(2,4-difluorophenyl)-oxiranylmethyl]-5-thio-cyanato-1H-[1,2,4]triazole, 2-[rel-(2S;3R)-3-(2-chlorophenyl)-2-(2,4-difluorophenyl)-oxiranylmethyl]-2H-[1,2,4]triazole-3-thiol, 2-[2-chloro-4-(4-chlorophenoxy)phenyl]-1-(1,2,4-triazol-1-yl)pentan-2-ol, 1-[4-(4-chlorophenoxy)-2-(trifluoromethyl)phenyl]-1-cyclopropyl-2-(1,2,4-triazol-1-yl)ethanol, 2-[4-(4-chlorophenoxy)-2-(trifluoromethyl)phenyl]-1-(1,2,4-triazol-1-yl) butan-2-ol, 2-[2-chloro-4-(4-chlorophenoxy) phenyl]-1-(1,2,4-triazol-1-yl)butan-2-ol, 2-[4-(4-chlorophenoxy)-2-(trifluoromethyl)phenyl]-3-methyl-1-(1,2,4-triazol-1-yl)butan-2-ol, 2-[4-(4- chlorophenoxy)-2-(trifluoromethyl)phenyl]-1-(1,2,4-triazol-1-yl)propan-2-ol, 2-[2-chloro-4-(4-chlorophenoxy)phenyl]-3-methyl-1-(1,2,4-triazol-1-yl) butan-2-ol, 2-[4-(4-chlorophenoxy)-2-(trifluoromethyl)phenyl]-1-(1,2,4-triazol-1-yl) pentan-2-ol, 2-[4-(4-fluorophenoxy)-2-(trifluoromethyl)phenyl]-1-(1,2,4-triazol-1-yl) propan-2-ol, 2-[2-chloro-4-(4-chlorophenoxy) phenyl]-1-(1,2,4-triazol-1-yl)pent-3-yn-2-ol;

imidazoles: imazalil, pefurazoate, prochloraz, triflumizol; pyrimidines, pyridines and piperazines: fenarimol, nuarimol, pyrifenox, triforine, [3-(4-chloro-2-fluoro-phenyl)-5-(2,4-difluorophenyl)isoxazol-4-yl]-(3-pyridyl)methanol;

Delta14-reductase inhibitors: aldimorph, dodemorph, dodemorph-acetate, fenpropimorph, tridemorph, fenpropidin, piperalin, spiroxamine;

Inhibitors of 3-keto reductase: fenhexamid;

C) Nucleic acid synthesis inhibitors phenylamides or acyl amino acid fungicides: benalaxyl, benalaxyl-M, kiralaxyl, metalaxyl, metalaxyl-M (mefenoxam), ofurace, oxadixyl;

others: hymexazole, octhilinone, oxolinic acid, bupirimate, 5-fluorocytosine, 5-fluoro-2-(p-tolylmethoxy) pyrimidin-4-amine, 5-fluoro-2-(4-fluorophenyl-methoxy)pyrimidin-4-amine;

D) Inhibitors of cell division and cytoskeleton tubulin inhibitors, benzimidazoles, thiophanates: benomyl, carbendazim, fuberidazole, thiabendazole, thiophanate-methyl; triazolopyrimidines: 5-chloro-7-(4-methylpiperidin-1-yl)-6-(2,4,6-trifluorophenyl)-[1,2,4]triazolo[1,5-a]pyrimidine other cell division inhibitors: diethofencarb, ethaboxam, pencycuron, fluopicolide, zoxamide, metrafenone, pyriofenone;

E) Inhibitors of amino acid and protein synthesis methionine synthesis inhibitors (anilino-pyrimidines): cyprodinil, mepanipyrim, pyrimethanil;

protein synthesis inhibitors: blasticidin-S, kasugamycin, kasugamycin hydrochloride-hydrate, mildiomycin, streptomycin, oxytetracyclin, polyoxine, validamycin A;

F) Signal transduction inhibitors

MAP/histidine kinase inhibitors: fluoroimid, iprodione, procymidone, vinclozolin, fenpiclonil, fludioxonil;

G protein inhibitors: quinoxyfen;

G) Lipid and membrane synthesis inhibitors

Phospholipid biosynthesis inhibitors: edifenphos, iprobenfos, pyrazophos, isoprothiolane;

lipid peroxidation: dicloran, quintozene, tecnazene, tolclofos-methyl, biphenyl, chloroneb, etridiazole;

phospholipid biosynthesis and cell wall deposition: dimethomorph, flumorph, mandipropamid, pyrimorph, benthiavalicarb, iprovalicarb, valifenalate and N-(1-(1-(4-cyano-phenyl)ethanesulfonyl)-but-2-yl) carbamic acid-(4-fluorophenyl) ester;

compounds affecting cell membrane permeability and fatty acids: propamocarb, propamocarb-hydrochlorid fatty acid amide hydrolase inhibitors: oxathiapiprolin, 2-{3-[2-(1-{[3,5-bis(di-fluoromethyl-1H-pyrazol-1-yl]acetyl}piperidin-4-yl)-,3-thiazol-4-yl]-4,5-dihydro-1,2-oxazol-5-yl}phenyl methanesulfonate, 2-{3-[2-(1-{[3,5-bis(difluoromethyl)-1H-pyrazol-1-yl]acetyl}piperidin-4-yl) 1,3-thiazol-4-yl]-4,5-dihydro-1,2-oxazol-5-yl}-3-chlorophenyl methanesulfonate;

H) Inhibitors with Multi Site Action inorganic active substances: Bordeaux mixture, copper acetate, copper hydroxide, copper oxychloride, basic copper sulfate, sulfur;

thio- and dithiocarbamates: ferbam, mancozeb, maneb, metam, metiram, propineb, thiram, zineb, ziram;

organochlorine compounds: anilazine, chlorothalonil, captafol, captan, folpet, dichlofluanid, dichlorophen, hexachlorobenzene, pentachlorphenole and its salts, phthalide, tolylfluanid, N-(4-chloro-2-nitro-phenyl)-N-ethyl-4-methyl-benzenesulfonamide;

guanidines and others: guanidine, dodine, dodine free base, guazatine, guazatine-acetate, iminoctadine, iminoctadine-triacetate, iminoctadine-tris(albesilate), dithianon, 2,6-dimethyl-1H,5H-[1,4]dithiino[2,3-c:5,6-c']dipyrrole-1,3,5,7(2H,6H)-tetraone;

I) Cell wall synthesis inhibitors inhibitors of glucan synthesis: validamycin, polyoxin B; melanin synthesis inhibitors: pyroquilon, tricyclazole, carpropamid, dicyclomet, fenoxanil;

J) Plant defence inducers acibenzolar-S-methyl, probenazole, isotianil, tiadinil, prohexadione-calcium;

phosphonates: fosetyl, fosetyl-aluminum, phosphorous acid and its salts;

K) Unknown mode of action bronopol, chinomethionat, cyflufenamid, cymoxanil, dazomet, debacarb, diclomezine, difenzoquat, difenzoquat-methyl sulfate, diphenylamin, fenpyrazamine, flumetover, flusulfamide, flutianil, methasulfocarb, nitrapyrin, nitrothal-isopropyl, oxathiapiprolin, picarbutrazox, tolprocarb, 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, oxin-copper, proquinazid, tebufloquin, tecloftalam, triazoxide, 2-butoxy-6-iodo-3-propylchromen-4-one, N-(cyclopropylmethoxyimino-(6-difluoro-methoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-(2-methyl-5-trifluoromethyl-4-(3-trimethylsilanyl-propoxy)-phenyl)-N-ethyl-N-methyl formamidine, N'-(5-difluoromethyl-2-methyl-4-(3-trimethylsilanyl-propoxy)-phenyl)-N-ethyl-N-methyl formamidine, methoxy-acetic acid 6-tert-butyl-8-fluoro-2,3-dimethyl-quinolin-4-yl ester, 3-[5-(4-methylphenyl)-2,3-dimethyl-isoxazolidin-3-yl]-pyridine, 3-[5-(4-chloro-phenyl)-2,3-dimethyl-isoxazolidin-3-yl]-pyridine (pyrisoxazole), N-(6-methoxy-pyridin-3-yl) cyclopropanecarboxylic acid amide, 5-chloro-1-(4,6-dimethoxy-pyrimidin-2-yl)-2-methyl-1H-benzoimidazole, 2-(4-chloro-phenyl)-N-[4-(3,4-dimethoxy-phenyl)-isoxazol-5-yl]-2-prop-2-ynyloxy-acetamide, ethyl (Z)-3-amino-2-cyano-3-phenyl-prop-2-enoate, pentyl N-[6-[[(Z)-[(1-methyltetrazol-5-yl)-phenyl-methylene]amino]oxymethyl]-2-pyridyl]carbamate, 2-[2-[(7,8-difluoro-2-methyl-3- quinolyl)oxy]-6-fluoro-phenyl]propan-2-ol, 2-[2-fluoro-6-[(8-fluoro-2-methyl-3-quinolyl)oxy]phenyl]propan-2-ol, 3-(5-fluoro-3,3,4,4-tetramethyl-3,4-dihydroisoquinolin-1-yl)quinoline, 3-(4,4-difluoro-3,3-dimethyl-3,4-dihydroisoquinolin-1-yl) quinoline, 3-(4,4,5-trifluoro-3,3-dimethyl-3,4-dihydroisoquinolin-1-yl)quinolone, 9-fluoro-2,2-dimethyl-5-(3-quinolyl)-3H-1,4-benzoxazepine;

L) Biopesticides

L1) Microbial pesticides with fungicidal, bactericidal, viricidal and/or plant defense activator activity: *Ampelomyces quisqualis* M-10 (L.1.1), *Aspergillus flavus* NRRL 21882 (L1.2), *Aureobasidium pullulans* DSM 14940 (L1.3), *A. pullulans* DSM 14941 (L.1.4), *Bacillus amyloliquefaciens* AP-136 (NRRL B-50614) (L.1.5), *B. amyloliquefaciens* AP-188 (NRRL B-50615) (L.1.6), *B. amyloliquefaciens* AP-218 (NRRL B-50618) (L.1.7), *B. amyloliquefaciens* AP-219 (NRRL B-50619) (L.1.8), *B. amyloliquefaciens* AP-295 (NRRL B-50620) (L.1.9), *B. amyloliquefaciens* FZB42 (L.1.10), *B. amyloliquefaciens* IN937a (L.1.11), *B. amyloliquefaciens* IT-45 (CNCM I-3800) (L.1.12), *B. amyloliquefaciens* TJ1000 (L.1.75), *B. amyloliquefaciens* ssp. *plantarum* MBI600 (NRRL B-50595) (L.1.13), *B. mojavensis* AP-209 (NRRL B-50616) (L.1.15), *B. pumilus* INR-7 (NRRL B-50153; NRRL B-50185) (L.1.14), *B. pumilus* KFP9F (L.1.15), *B. pumilus* QST 2808 (NRRL B-30087) (L.1.16), *B. pumilus* GHA 180 (L.1.17), *B. simplex* ABU 288 (NRRL B-50340) (L.1.18), *B. solisalsi* AP-217 (NRRL B-50617) (L.1.19), *B. subtilis* CX-9060 (L.1.20), *B. subtilis* FB17 (L.1.74), *B. subtilis* GB03 (L.1.21), *B. subtilis* GB07 (L.1.22), *B. subtilis* QST-713 (NRRL B-21661) (L.1.23), *B. subtilis* var. *amyloliquefaciens* FZB24 (L.1.24), *B. subtilis* var. *amyloliquefaciens* D747 (L.1.25), *Candida oleophila* 1-82 (L.1.26), *C. oleophila* O (L.1.27), *C. saitoana* (L.1.28), *Clavibacter michiganensis* (bacteriophages) (L.1.29), *Coniothyrium minitans* CON/M/91-08 (L.1.30), *Cryphonectria parasitica* (L.1.31), *Cryptococcus albidus* (L.1.32), *Dilophosphora alopecuri* (L.1.33), *Fusarium oxysporum* (L.1.34), *Clonostachys rosea* f. *catenulata* J1446 (L.1.35), *Gliocladium roseum* 321U (L.1.36), *Metschnikowia fructicola* NRRL Y-30752 (L.1.37), *Microdochium dimerum* (L.1.38), *Microsphaeropsis ochracea* P130A (L.1.39), *Muscodor albus* QST 20799 (L.1.40), *Paenibacillus polymyxa* PKB1 (ATCC 202127) (L.1.41), *Pantoea vagans* C9-1 (L.1.42), *Phlebiopsis gigantea* (L.1.43), *Pichia anomala* WRL-76 (L.1.44), *Pseudozyma flocculosa* PF-A22 UL (L.1.45), *Pythium oligandrum* DV 74 (L.1.46), *Sphaerodes mycoparasitica* IDAC 301008-01 (L.1.47), *Streptomyces griseoviridis* K61 (L.1.48), *S. lydicus* WYEC 108 (L.1.49), *S. violaceusniger* XL-2 (L.1.50), *S. violaceusniger* YCED-9 (L.1.51), *Talaromyces flavus* V117b (L.1.52), *Trichoderma asperellum* T34 (L.1.53), *T. asperellum* SKT-1 (L.1.54), *T. asperellum* ICC 012 (L.1.55), *T. atroviride* LC52 (L.1.56), *T. atroviride* CNCM I-1237 (L.1.57), *T. fertile* JM41R (L.1.58), *T. gamsii* ICC 080 (L.1.59), *T. harmatum* TH 382 (L.1.60), *T. harzianum* TH-35 (L.1.61), *T. harzianum* T-22 (L.1.62), *T. harzianum* T-39 (L.1.63); mixture of *T. harzianum* ICC012 and *T. viride* ICC080 (L.1.64); mixture of *T. polysporum* and *T. harzianum* (L.1.65); *T. stromaticum* (L.1.66), *T. virens* G1-3 (L.1.76), *T. virens* G-41 (L.1.77), *T. virens* GL-21 (L.1.67), *T. virens* G41 (L.1.68), *T. viride* TV1 (L.1.69), *Typhula phacorrhiza* 94671 (L.1.70), *Ulocladium oudemansii* HRU3 (L.1.71), *Verticillium dahlia* (L.1.72), zucchini yellow mosaic virus (avirulent strain) (L.1.73);

L2) Biochemical pesticides with fungicidal, bactericidal, viricidal and/or plant defense activator activity: chitosan (hydrolysate) (L.2.1), harpin protein (L.2.2), laminarin (L.2.3), Menhaden fish oil (L.2.4), natamycin (L.2.5), Plum pox virus coat protein (L.2.6), potassium bicarbonate (L.2.7), *Reynoutria sachlinensis* extract (L.2.8), salicylic acid (L.2.9), potassium or sodium bicarbonate (L.2.10), tea tree oil (L.2.11);

L3) Microbial pesticides with insecticidal, acaricidal, molluscidal and/or nematicidal activity: *Agrobacterium radiobacter* K1026 (L.3.1), *A. radiobacter* K84 (L.3.2), *Bacillus firmus* I-1582 (L.3.3); *B. thuringiensis* ssp. *aizawai* strains: ABTS-1857 (L.3.4), SAN 401 I (L.3.5), ABG-6305 (L.3.6) and ABG-6346 (L.3.7); *B. t.* ssp. *israelensis* AM65-52 (L.3.8), *B. t.* ssp. *israelensis* SUM-6218 (L.3.9), *B. t.* ssp. *galleriae* SDS-502 (L.3.10), *B. t.* ssp. *kurstaki* EG 2348 (L.3.11), *B. t.* ssp. *kurstaki* SB4 (L.3.12), *B. t.* ssp. *kurstaki* ABTS-351 (HD-1) (L.3.13), *Beauveria bassiana* ATCC 74040 (L.3.14), *B. bassiana* GHA (L.3.15), *B. bassiana* H123 (L.3.16), *B. bassiana* DSM 12256 (L.3.17), *B. bassiana* PPRI 5339 (L.3.18), *B. brongniartii* (L.3.19), *Burkholderia* sp. A396 (L.3.20), *Chromobacterium subtsugae* PRAA4-1 (L.3.21), *Cydia pomonella* granulosis virus V22 (L.3.22), *Cydia pomonella* granulosis virus V1 (L.3.23), *Cryptophlebia leucotreta* granulovirus (CrleGV) (L.3.57), *Flavobacterium* sp. H492 (L.3.60), *Helicoverpa armigera* nucleopolyhedrovirus (HearNPV) (L.3.58), *Isaria fumosorosea* Apopka-97 (L.3.24), *Lecanicillium longisporum* KV42 (L.3.25), *L. longisporum* KV71 (L.3.26), *L. muscarium* KV01 (L.3.27), *Metarhizium anisopliae* FI-985 (L.3.28), *M. anisopliae* FI-1045 (L.3.29), *M. anisopliae* F52 (L.3.30), *M. anisopliae* ICIPE 69 (L.3.31), *M. anisopliae* var. *acridum* IMI 330189 (L.3.32); *Nomuraea rileyi* strains: SA86101 (L.3.33), GU87401 (L.3.34), SR86151 (L.3.35), CG128 (L.3.36) and VA9101 (L.3.37); *Paecilomyces fumosoroseus* FE 9901 (L.3.38), *P. lilacinus* 251 (L.3.39), *P. lilacinus* DSM 15169 (L.3.40), *P. lilacinus* BCP2 (L.3.41), *Paenibacillus popilliae* Dutky-1940 (NRRL B-2309=ATCC 14706) (L.3.42), *P. popilliae* Dutky 1 (L.3.43), *P. popilliae* KLN 3 (L.3.56), *Pasteuria* sp. Ph3 (L.3.44), *Pasteuria* sp. ATCC PTA-9643 (L.3.45), *Pasteuria* sp. ATCC SD-5832 (L.3.46), *P. nishizawae* Pn1 (L.3.46), *P. penetrans* (L.3.47), *P. ramose* (L.3.48), *P. reneformis* Pr-3 (L.3.49), *P. thornea* (L.3.50), *P. usgae* (L.3.51), *Pseudomonas fluorescens* CL 145A (L.3.52), *Spodoptera littoralis* nucleopolyhedrovirus (SpliNPV) (L.3.59), *Steinernema carpocapsae* (L.3.53), *S. feltiae* (L.3.54), *S. kraussei* L137 (L.3.55);

L4) Biochemical pesticides with insecticidal, acaricidal, molluscidal, pheromone and/or nematicidal activity: L-carvone (L.4.1), citral (L.4.2), (E,Z)-7,9-dodecadien-1-yl acetate (L.4.3), ethyl formate (L.4.4), (E,Z)-2,4-ethyl decadienoate (pear ester) (L.4.5), (Z,Z,E)-7,11,13-hexadecatrienal (L.4.6), heptyl butyrate (L.4.7), isopropyl myristate (L.4.8), cis-jasmone (L.4.9), lavanulyl senecioate (L.4.10), 2-methyl 1-butanol (L.4.11), methyl eugenol (L.4.12), methyl jasmonate (L.4.13), (E,Z)-2,13-octadecadien-1-ol (L.4.14), (E,Z)-

2,13-octadecadien-1-ol acetate (L.4.15), (E,Z)-3,13-octadecadien-1-ol (L.4.16), R-1-octen-3-ol (L.4.17), pentatermanone (L.4.18), potassium silicate (L.4.19), sorbitol actanoate (L.4.20), (E,Z,Z)-3,8,11-tetradecatrienyl acetate (L.4.21), (Z,E)-9,12-tetradecadien-1-yl acetate (L.4.22), Z-7-tetradecen-2-one (L.4.23), Z-9-tetradecen-1-yl acetate (L.4.24), Z-11-tetradecenal (L.4.25), Z-11-tetradecen-1-ol (L.4.26), *Acacia negra* extract (L.4.27), extract of grapefruit seeds and pulp (L.4.28), extract of *Chenopodium ambrosiodes* (L.4.29), Catnip oil (L.4.30), Neem oil (L.4.31), Quillay extract (L.4.32), Tagetes oil (L.4.33);

L5) Microbial pesticides with plant stress reducing, plant growth regulator, plant growth promoting and/or yield enhancing activity: *Azospirillum amazonense* BR 11140 (SpY2$^T$) (L.5.1), *A. brasilense* strains Ab-V5 and Ab-V6 (L.5.73), *A. brasilense* AZ39 (L.5.2), *A. brasilense* XOH (L.5.3), *A. brasilense* BR 11005 (Sp245) (L.5.4), *A. brasilense* BR 11002 (L.5.5), *A. lipoferum* BR 11646 (Sp31) (L.5.6), *A. irakense* (L.5.7), *A. halopraeferens* (L.5.8), *Bradyrhizobium* sp. PNL01 (L.5.9), *B.* sp. (*Arachis*) CB1015 (L.5.10), *B.* sp. (*Arachis*) USDA 3446 (L.5.11), *B.* sp. (*Arachis*) SEMIA 6144 (L.5.12), *B.* sp. (*Arachis*) SEMIA 6462 (L.5.13), *B.* sp. (*Arachis*) SEMIA 6464 (L.5.14), *B.* sp. (*Vigna*) (L.5.15), *B. elkanii* SEMIA 587 (L.5.16), *B. elkanii* SEMIA 5019 (L.5.17), *B. elkanii* U-1301 (L.5.18), *B. elkanii* U-1302 (L.5.19), *B. elkanii* USDA 74 (L.5.20), *B. elkanii* USDA 76 (L.5.21), *B. elkanii* USDA 94 (L.5.22), *B. elkanii* USDA 3254 (L.5.23), *B. japonicum* 532c (L.5.24), *B. japonicum* CPAC 15 (L.5.25), *B. japonicum* E-109 (L.5.26), *B. japonicum* G49 (L.5.27), *B. japonicum* TA-11 (L.5.28), *B. japonicum* USDA 3 (L.5.29), *B. japonicum* USDA 31 (L.5.30), *B. japonicum* USDA 76 (L.5.31), *B. japonicum* USDA 110 (L.5.32), *B. japonicum* USDA 121 (L.5.33), *B. japonicum* USDA 123 (L.5.34), *B. japonicum* USDA 136 (L.5.35), *B. japonicum* SEMIA 566 (L.5.36), *B. japonicum* SEMIA 5079 (L.5.37), *B. japonicum* SEMIA 5080 (L.5.38), *B. japonicum* WB74 (L.5.39), *B. liaoningense* (L.5.40), *B. lupini* LL13 (L.5.41), *B. lupini* WU425 (L.5.42), *B. lupini* WSM471 (L.5.43), *B. lupini* WSM4024 (L.5.44), *Glomus intraradices* RTI-801 (L.5.45), *Mesorhizobium* sp. WSM1271 (L.5.46), *M.* sp. WSM1497 (L.5.47), *M. ciceri* CC1192 (L.5.48), *M. huakii* (L.5.49), *M. loti* CC829 (L.5.50), *M. loti* SU343 (L.5.51), *Paenibacillus alvei* NAS6G6 (L.5.52), *Penicillium bilaiae* (L.5.53), *Rhizobium leguminosarum* bv. *phaseoli* RG-B10 (L.5.54), *R. l.* bv. *trifolii* RP113-7 (L.5.55), *R. l.* bv. *trifolii* 095 (L.5.63), *R. l.* bv. *trifolii* TA1 (L.5.64), *R. l.* bv. *trifolii* CC283b (L.5.65), *R. l.* bv. *trifolii* CC275e (L.5.66), *R. l.* bv. *trifolii* CB782 (L.5.67), *R. l.* bv. *trifolii* CC1099 (L.5.68), *R. l.* bv. *trifolii* WSM1325 (L.5.69), *R. l.* bv. *viciae* SU303 (L.5.56), *R. l.* bv. *viciae* WSM1455 (L.5.57), *R. l.* bv. *viciae* P1NP3Cst (L.5.58), *R. l.* bv. *viciae* RG-P2 (L.5.70), *R. tropici* SEMIA 4080 (L.5.59), *R. tropici* SEMIA 4077 (L.5.71), *R. tropici* CC511 (L.5.72), *Sinorhizobium meliloti* MSDJ0848 (L.5.60), *S. meliloti* NRG185 (L.5.61), *S. meliloti* RRI128 (L.5.62);

L6) Biochemical pesticides with plant stress reducing, plant growth regulator and/or plant yield enhancing activity: abscisic acid (L.6.1), aluminium silicate (kaolin) (L.6.2), 3-decen-2-one (L.6.3), formononectin (L.6.4), genistein (L.6.5), hesperetin (L.6.6), homobrassinlide (L.6.7), humates (L.6.8), methyl jasmonate (L.6.9), cis-jasmone (L.6.10), lysophatidyl ethanlamine (L.6.11), naringenin (L.6.12), polymeric polyhydroxy acid (L.6.13), salicylic acid (L.6.14), *Ascophyllum nodosum* (Norwegian kelp, Brown kelp) extract (L.6.15) and *Ecklonia maxima* (kelp) extract (L.6.16).

M) Growth regulators abscisic acid, amidochlor, ancymidol, 6-benzylaminopurine, brassinolide, butralin, chlormequat (chlormequat chloride), choline chloride, cyclanilide, daminozide, dikegulac, dimethipin, 2,6-dimethylpuridine, ethephon, flumetralin, flurprimidol, fluthiacet, forchlorfenuron, gibberellic acid, inabenfide, indole-3-acetic acid, maleic hydrazide, mefluidide, mepiquat (mepiquat chloride), naphthaleneacetic acid, N-6-benzyladenine, paclobutrazol, prohexadione (prohexadione-calcium), prohydrojasmon, thidiazuron, triapenthenol, tributyl phosphorotrithioate, 2,3,5-tri-iodobenzoic acid, trinexapac-ethyl and uniconazole;

N) Herbicides acetamides: acetochlor, alachlor, butachlor, dimethachlor, dimethenamid, flufenacet, mefenacet, metolachlor, metazachlor, napropamide, naproanilide, pethoxamid, pretilachlor, propachlor, thenylchlor;

amino acid derivatives: bilanafos, glyphosate, glufosinate, sulfosate;

aryloxyphenoxypropionates: clodinafop, cyhalofop-butyl, fenoxaprop, fluazifop, haloxyfop, metamifop, propaquizafop, quizalofop, quizalofop-P-tefuryl;

Bipyridyls: diquat, paraquat;

(thio)carbamates: asulam, butylate, carbetamide, desmedipham, dimepiperate, eptam (EPTC), esprocarb, molinate, orbencarb, phenmedipham, prosulfocarb, pyributicarb, thiobencarb, triallate;

cyclohexanediones: butroxydim, clethodim, cycloxydim, profoxydim, sethoxydim, tepraloxydim, tralkoxydim;

dinitroanilines: benfluralin, ethalfluralin, oryzalin, pendimethalin, prodiamine, trifluralin;

diphenyl ethers: acifluorfen, aclonifen, bifenox, diclofop, ethoxyfen, fomesafen, lactofen, oxyfluorfen;

hydroxybenzonitriles: bomoxynil, dichlobenil, ioxynil;

imidazolinones: imazamethabenz, imazamox, imazapic, imazapyr, imazaquin, imazethapyr;

phenoxy acetic acids: clomeprop, 2,4-dichlorophenoxyacetic acid (2,4-D), 2,4-DB, dichlorprop, MCPA, MCPA-thioethyl, MCPB, Mecoprop;

pyrazines: chloridazon, flufenpyr-ethyl, fluthiacet, norflurazon, pyridate;

pyridines: aminopyralid, clopyralid, diflufenican, dithiopyr, fluridone, fluroxypyr, picloram, picolinafen, thiazopyr;

sulfonyl ureas: amidosulfuron, azimsulfuron, bensulfuron, chlorimuron-ethyl, chlorsulfuron, cinosulfuron, cyclosulfamuron, ethoxysulfuron, flazasulfuron, flucetosulfuron, flupyrsulfuron, foramsulfuron, halosulfuron, imazosulfuron, iodosulfuron, mesosulfuron, metazosulfuron, metsulfuron-methyl, nicosulfuron, oxasulfuron, primisulfuron, prosulfuron, pyrazosulfuron, rimsulfuron, sulfometuron, sulfosulfuron, thifensulfuron, triasulfuron, tribenuron, trifloxysulfuron, triflusulfuron, tritosulfuron, 1-((2-chloro-6-propyl-imidazo[1,2-b]pyridazin-3-yl)sulfonyl)-3-(4,6-dimethoxy-pyrimidin-2-yl)urea;

triazines: ametryn, atrazine, cyanazine, dimethametryn, ethiozin, hexazinone, metamitron, metribuzin, prometryn, simazine, terbuthylazine, terbutryn, triaziflam;

ureas: chlorotoluron, daimuron, diuron, fluometuron, isoproturon, linuron, methabenzthiazuron, tebuthiuron;

other acetolactate synthase inhibitors: bispyribac-sodium, cloransulam-methyl, diclosulam, florasulam, flucarbazone, flumetsulam, metosulam, ortho-sulfamuron, penoxsulam, propoxycarbazone, pyribambenz-propyl, pyribenzoxim, pyriftalid, pyriminobac-methyl, pyrimisulfan, pyrithiobac, pyroxasulfone, pyroxsulam;

others: amicarbazone, aminotriazole, anilofos, beflubutamid, benazolin, bencarbazone, benfluresate, benzofenap, bentazone, benzobicyclon, bicyclopyrone, bromacil, bromobutide, butafenacil, butamifos, cafenstrole, carfentrazone, cinidon-ethyl, chlorthal, cinmethylin, clomazone, cumyluron, cyprosulfamide, dicamba, difenzoquat, diflufenzopyr, *Drechslera monoceras*, endothal, ethofumesate, etobenzanid, fenoxasulfone, fentrazamide, flumiclorac-pentyl, flumioxazin, flupoxam, flurochloridone, flurtamone, indanofan, isoxaben, isoxaflutole, lenacil, propanil, propyzamide, quinclorac, quinmerac, mesotrione, methyl arsonic acid, naptalam, oxadiargyl, oxadiazon, oxaziclomefone, pentoxazone, pinoxaden, pyraclonil, pyraflufen-ethyl, pyrasulfotole, pyrazoxyfen, pyrazolynate, quinoclamine, saflufenacil, sulcotrione, sulfentrazone, terbacil, tefuryltrione, tembotrione, thiencarbazone, topramezone, (3-[2-chloro-4-fluoro-5-(3-methyl-2,6-dioxo-4-trifluoromethyl-3,6-dihydro-2H-pyrimidin-1-yl)-phenoxy]-pyridin-2-yloxy)-acetic acid ethyl ester, 6-amino-5-chloro-2-cyclopropyl-pyrimidine-4-carboxylic acid methyl ester, 6-chloro-3-(2-cyclopropyl-6-methyl-phenoxy)-pyridazin-4-ol, 4-amino-3-chloro-6-(4-chloro-phenyl)-5-fluoro-pyridine-2-carboxylic acid, 4-amino-3-chloro-6-(4-chloro-2-fluoro-3-methoxy-phenyl)-pyridine-2-carboxylic acid methyl ester, and 4-amino-3-chloro-6-(4-chloro-3-dimethylamino-2-fluoro-phenyl)-pyridine-2-carboxylic acid methyl ester.

O) Insecticides organo(thio)phosphates: acephate, azamethiphos, azinphos-methyl, chlorpyrifos, chlorpyrifos-methyl, chlorfenvinphos, diazinon, dichlorvos, dicrotophos, dimethoate, disulfoton, ethion, fenitrothion, fenthion, isoxathion, malathion, methamidophos, methidathion, methyl-parathion, mevinphos, monocrotophos, oxydemeton-methyl, paraoxon, parathion, phenthoate, phosalone, phosmet, phosphamidon, phorate, phoxim, pirimiphos-methyl, profenofos, prothiofos, sulprophos, tetrachlorvinphos, terbufos, triazophos, trichlorfon;

carbamates: alanycarb, aldicarb, bendiocarb, benfuracarb, carbaryl, carbofuran, carbosulfan, fenoxycarb, furathiocarb, methiocarb, methomyl, oxamyl, pirimicarb, propoxur, thiodicarb, triazamate;

pyrethroids: allethrin, bifenthrin, cyfluthrin, cyhalothrin, cyphenothrin, cypermethrin, alpha-cypermethrin, beta-cypermethrin, zeta-cypermethrin, deltamethrin, esfenvalerate, etofenprox, fenpropathrin, fenvalerate, imiprothrin, lambda-cyhalothrin, permethrin, prallethrin, pyrethrin I and II, resmethrin, silafluofen, tau-fluvalinate, tefluthrin, tetramethrin, tralomethrin, transfluthrin, profluthrin, dimefluthrin;

insect growth regulators: a) chitin synthesis inhibitors: benzoylureas: chlorfluazuron, cyramazin, diflubenzuron, flucycloxuron, flufenoxuron, hexaflumuron, lufenuron, novaluron, teflubenzuron, triflumuron; buprofezin, diofenolan, hexythiazox, etoxazole, clofentazine; b) ecdysone antagonists: halofenozide, methoxyfenozide, tebufenozide, azadirachtin; c) juvenoids: pyriproxyfen, methoprene, fenoxycarb; d) lipid biosynthesis inhibitors: spirodiclofen, spiromesifen, spirotetramat;

nicotinic receptor agonists/antagonists compounds: clothianidin, dinotefuran, flupyradifurone, imidacloprid, thiamethoxam, nitenpyram, acetamiprid, thiacloprid, 1-2-chloro-thiazol-5-ylmethyl)-2-nitrimino-3,5-dimethyl-[1,3,5]triazinane;

GABA antagonist compounds: endosulfan, ethiprole, fipronil, vaniliprole, pyrafluprole, pyriprole, 5-amino-1-(2,6-dichloro-4-methyl-phenyl)-4-sulfinamoyl-1H-pyrazole-3-carbothioic acid amide;

macrocyclic lactone insecticides: abamectin, emamectin, milbemectin, lepimectin, spinosad, spinetoram;

mitochondrial electron transport inhibitor (METI) I acaricides: fenazaquin, pyridaben, tebufenpyrad, tolfenpyrad, flufenerim;

METI II and III compounds: acequinocyl, fluacyprim, hydramethylnon;

Uncouplers: chlorfenapyr;

oxidative phosphorylation inhibitors: cyhexatin, diafenthiuron, fenbutatin oxide, propargite;

moulting disruptor compounds: cryomazine;

mixed function oxidase inhibitors: piperonyl butoxide;

sodium channel blockers: indoxacarb, metaflumizone;

ryanodine receptor inhibitors: chlorantraniliprole, cyantraniliprole, flubendiamide, N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide; N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; N-[4,6-dichloro-2-[(diethyl-lambda-4-sulfanylidene)carbamoyl]-phenyl]-2-(3-chloro-2-pyridyl)-5-(difluoromethyl)pyrazole-3-carboxamide; N-[4,6-dibromo-2-[(di-2-propyl-lambda-4-sulfanylidene)carbamoyl]-phenyl]-2-(3-chloro-2-pyridyl)-5-(trifluoromethyl)pyrazole-3-carboxamide; N-[4-chloro-2-[(di-2-propyl-lambda-4-sulfanylidene)carbamoyl]-6-cyano-phenyl]-2-(3-chloro-2-pyridyl)-5-(trifluoromethyl)pyrazole-3-carboxamide; N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide;

others: benclothiaz, bifenazate, cartap, flonicamid, pyridalyl, pymetrozine, sulfur, thiocyclam, cyenopyrafen, flupyrazofos, cyflumetofen, amidoflumet, imicyafos, bistrifluron, pyrifluquinazon and 1,1'-[(3S,4R,4aR,6S,6aS,12R,12aS,12bS)-4-[[(2-cyclopropylacetyl)oxy]methyl]-1,3,4,4a,5,6,6a,12,12a,12b-decahydro-12-hydroxy-4,6a,12b-trimethyl-11-oxo-9-(3-pyridinyl)-2H,11H-naphtho[2,1-b]pyrano[3,4-e]pyran-3,6-diyl] cyclopropaneacetic acid ester.

8. A method for controlling phytopathogenic fungi, insects or other pests and/or improving the health of plants and/or regulating plant growth, comprising treating the plants, the plant seed or the soil with an effective amount of the mixture of claim 1.

9. A method for protection of plant propagation material from pests and/or improving the health of plants grown from said plant propagation material, wherein the plant propagation material are treated with an effective amount of the mixture of claim 1.

10. A plant propagation material, comprising the mixture of claim 1 in an amount of from 0.01 g to 10000 g per 100 kg of plant propagation material.

11. A method for controlling phytopathogenic fungi, insects or other pests and/or improving the health of plants and/or regulating plant growth, comprising treating the plants, the plant seed or the soil with an effective amount of the composition of claim 6.

12. A method for protection of plant propagation material from pests and/or improving the health of plants grown from said plant propagation material, wherein the plant propagation material are treated with an effective amount of the composition of claim 6.

13. A plant propagation material, comprising the composition of claim 6 in an amount of from 0.01 g to 10000 g per 100 kg of plant propagation material.

\* \* \* \* \*